(12) United States Patent
Pitre et al.

(10) Patent No.: US 10,705,823 B2
(45) Date of Patent: Jul. 7, 2020

(54) APPLICATION TEMPLATES AND UPGRADE FRAMEWORK FOR A MULTI-TENANT IDENTITY CLOUD SERVICE

(71) Applicant: Oracle International Corporation, Redwood Shores, CA (US)

(72) Inventors: Ashutosh Pitre, Dublin, CA (US); Zheang Li, Sunnyvale, CA (US); Gary P. Cole, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/118,612

(22) Filed: Aug. 31, 2018

(65) Prior Publication Data

US 2019/0102162 A1  Apr. 4, 2019

Related U.S. Application Data

(60) Provisional application No. 62/565,922, filed on Sep. 29, 2017.

(51) Int. Cl.
*G06F 8/65* (2018.01)
*H04L 12/24* (2006.01)
(Continued)

(52) U.S. Cl.
CPC ............ *G06F 8/65* (2013.01); *H04L 41/0893* (2013.01); *H04L 41/5048* (2013.01);
(Continued)

(58) Field of Classification Search
USPC ........................................................ 717/168
See application file for complete search history.

(56) References Cited

U.S. PATENT DOCUMENTS 5,550,971 A   8/1996 Brunner et al.
6,097,382 A   8/2000 Rosen et al.
(Continued)

FOREIGN PATENT DOCUMENTS

CN   101399813 A   4/2009
CN   103780635 A   5/2014
(Continued)

OTHER PUBLICATIONS

Ryan O'Leary; "Accelerate Code Development with Cloud Application Templates"; Flexera website [full url in ref.]; Aug. 25, 2016 (Year: 2016).*

(Continued)

*Primary Examiner* — Qing Chen
*Assistant Examiner* — Clint Thatcher
(74) *Attorney, Agent, or Firm* — Potomac Law Group, PLLC

(57) ABSTRACT

A system manages tenant application updates in a multi-tenant cloud-based identity and access management (IAM) system by defining one or more application templates; creating one or more applications for one or more tenants of the multi-tenant cloud-based IAM system using the one or more application templates; applying a change to at least one of the one or more application templates; determining whether the one or more applications need to be updated in an automatic mode, a semi-automatic mode, or a manual mode, to incorporate the change; and updating at least one of the one or more applications in an applicable one of the automatic mode, the semi-automatic mode, or the manual mode, based on the outcome of the determining.

20 Claims, 21 Drawing Sheets

(51) Int. Cl.
*H04L 29/06* (2006.01)
*H04L 29/08* (2006.01)

(52) U.S. Cl.
CPC ...... *H04L 41/5054* (2013.01); *H04L 63/0815* (2013.01); *H04L 63/10* (2013.01); *H04L 63/102* (2013.01); *H04L 63/104* (2013.01); *H04L 67/10* (2013.01); *H04L 41/0896* (2013.01); *H04L 41/5096* (2013.01)

(56) References Cited

U.S. PATENT DOCUMENTS

| | | |
|---|---|---|
| 6,266,058 B1 | 7/2001 | Meyer |
| 6,353,834 B1 | 3/2002 | Wong et al. |
| 6,578,068 B1 | 6/2003 | Bowman-Amuah |
| 6,606,663 B1 | 8/2003 | Liao et al. |
| 6,631,497 B1 | 10/2003 | Jamshidi et al. |
| 6,631,519 B1 | 10/2003 | Nicholson et al. |
| 6,978,305 B1 | 12/2005 | Nainani et al. |
| 6,990,653 B1 | 1/2006 | Burd et al. |
| 7,062,502 B1 | 6/2006 | Kesler |
| 7,111,307 B1 | 9/2006 | Wang |
| 7,116,310 B1 | 10/2006 | Evans et al. |
| 7,203,678 B1 | 4/2007 | Petropoulos et al. |
| 7,337,434 B2 | 2/2008 | Nichols et al. |
| 7,395,355 B2 | 7/2008 | Afergan et al. |
| 7,428,725 B2 | 9/2008 | Niyogi et al. |
| 7,430,732 B2 | 9/2008 | Cwalina et al. |
| 7,464,297 B2 | 12/2008 | Potter et al. |
| 7,487,248 B2 | 2/2009 | Moran et al. |
| 7,529,825 B1 | 5/2009 | Freskos et al. |
| 7,546,576 B2 | 6/2009 | Egli |
| 7,546,602 B2 | 6/2009 | Hejlsberg et al. |
| 7,577,909 B2 | 8/2009 | Harriger et al. |
| 7,577,934 B2 | 8/2009 | Anonsen et al. |
| 7,610,575 B2 | 10/2009 | Sproule |
| 7,650,594 B2 | 1/2010 | Nattinger |
| 7,685,430 B1 | 3/2010 | Masurkar |
| 7,703,128 B2 | 4/2010 | Cross et al. |
| 7,707,553 B2 | 4/2010 | Roques et al. |
| 7,720,864 B1 | 5/2010 | Muth et al. |
| 7,730,427 B2 | 6/2010 | Peters |
| 7,735,068 B2 | 6/2010 | Siddaramappa et al. |
| 7,757,177 B1 | 7/2010 | Bohm et al. |
| 7,757,207 B2 | 7/2010 | Yan et al. |
| 7,779,383 B2 | 8/2010 | Bornhoevd et al. |
| 7,827,256 B2 | 11/2010 | Phillips et al. |
| 7,849,447 B1 | 12/2010 | Karis et al. |
| 7,861,121 B2 | 12/2010 | Wang |
| 7,913,246 B2 * | 3/2011 | Hammond ............... G06F 8/65 340/538 |
| 7,917,888 B2 | 3/2011 | Chong et al. |
| 7,926,027 B2 | 4/2011 | Chen et al. |
| 8,032,634 B1 | 10/2011 | Eppstein et al. |
| 8,099,766 B1 | 1/2012 | Corbett |
| 8,166,387 B2 | 4/2012 | Morrison et al. |
| 8,209,491 B2 | 6/2012 | Mobarak et al. |
| 8,219,970 B2 | 7/2012 | Neil et al. |
| 8,245,037 B1 | 8/2012 | Durgin et al. |
| 8,364,968 B2 | 1/2013 | Corcoran et al. |
| 8,417,728 B1 | 4/2013 | Anders et al. |
| 8,452,567 B1 | 5/2013 | Sullivan et al. |
| 8,464,063 B2 | 6/2013 | Agarwal et al. |
| 8,473,951 B2 | 6/2013 | Sharon et al. |
| 8,554,846 B2 | 10/2013 | Brail |
| 8,578,282 B2 | 11/2013 | Boillot |
| 8,607,322 B2 | 12/2013 | Hinton et al. |
| 8,612,599 B2 | 12/2013 | Tung et al. |
| 8,676,723 B2 | 3/2014 | Jung |
| 8,732,182 B2 | 5/2014 | Bethlehem et al. |
| 8,732,665 B2 | 5/2014 | Vedula et al. |
| 8,745,641 B1 | 6/2014 | Coker |
| 8,782,632 B1 | 7/2014 | Chigurapati et al. |
| 8,799,641 B1 | 8/2014 | Seidenberg et al. |
| 8,812,627 B2 | 8/2014 | Donahue et al. |
| 8,813,028 B2 | 8/2014 | Farooqi |
| 8,824,274 B1 | 9/2014 | Medved et al. |
| 8,863,111 B2 | 10/2014 | Selitser et al. |
| 8,873,401 B2 | 10/2014 | Ashwood-Smith et al. |
| 8,938,540 B2 | 1/2015 | Biljon et al. |
| 8,949,776 B2 | 2/2015 | Feber |
| 8,954,732 B1 | 2/2015 | Watsen et al. |
| 8,955,081 B2 | 2/2015 | Metke et al. |
| 8,959,063 B2 | 2/2015 | Haeberle et al. |
| 8,972,929 B2 | 3/2015 | Fahmy |
| 8,977,693 B2 | 3/2015 | Gidugu |
| 8,978,114 B1 | 3/2015 | Kaushik et al. |
| 8,984,581 B2 | 3/2015 | Luna et al. |
| 8,990,765 B2 | 3/2015 | Kulkarni et al. |
| 9,009,858 B2 | 4/2015 | Kevin et al. |
| 9,037,723 B2 | 5/2015 | Morgan |
| 9,047,166 B2 | 6/2015 | Nishio et al. |
| 9,047,404 B1 | 6/2015 | Jibaly et al. |
| 9,047,414 B1 | 6/2015 | Matyjek |
| 9,069,599 B2 * | 6/2015 | Martinez ............... G06F 9/455 |
| 9,069,979 B2 | 6/2015 | Srinivasan et al. |
| 9,077,770 B2 | 7/2015 | Redpath |
| 9,105,046 B1 | 8/2015 | Dias et al. |
| 9,118,657 B1 | 8/2015 | Shetty |
| 9,158,518 B2 | 10/2015 | Brown et al. |
| 9,183,321 B2 | 11/2015 | Murthy |
| 9,223,684 B2 | 12/2015 | Gittelman et al. |
| 9,246,840 B2 | 1/2016 | Anderson et al. |
| 9,258,668 B2 | 2/2016 | Mall et al. |
| 9,258,669 B2 | 2/2016 | Nyisztor et al. |
| 9,292,502 B2 | 3/2016 | Karlsen |
| 9,311,413 B1 | 4/2016 | Franklin et al. |
| 9,369,457 B2 | 6/2016 | Grajek et al. |
| 9,413,750 B2 | 8/2016 | Akula et al. |
| 9,432,457 B2 | 8/2016 | Marano et al. |
| 9,448,790 B2 | 9/2016 | Collison et al. |
| 9,483,491 B2 | 11/2016 | Wijayaratne et al. |
| 9,544,293 B2 | 1/2017 | Mathew et al. |
| 9,648,007 B1 | 5/2017 | Sterling et al. |
| 9,715,534 B2 | 7/2017 | Beausoleil et al. |
| 9,729,539 B1 | 8/2017 | Agrawal et al. |
| 9,772,822 B2 | 9/2017 | Narayanan et al. |
| 9,826,045 B2 | 11/2017 | Straub et al. |
| 9,886,524 B1 | 2/2018 | Richardson et al. |
| 10,013,364 B1 | 7/2018 | O'Brien et al. |
| 10,148,493 B1 | 12/2018 | Ennis, Jr. et al. |
| 10,263,947 B2 | 4/2019 | Vats et al. |
| 10,505,941 B2 | 12/2019 | Vats et al. |
| 2001/0007128 A1 | 7/2001 | Lambert et al. |
| 2001/0020274 A1 | 9/2001 | Shambroom |
| 2002/0116441 A1 | 8/2002 | Ding et al. |
| 2002/0129264 A1 | 9/2002 | Rowland et al. |
| 2002/0174010 A1 | 11/2002 | Rice |
| 2003/0028583 A1 | 2/2003 | Flores et al. |
| 2003/0115341 A1 | 6/2003 | Sinha et al. |
| 2003/0149717 A1 | 8/2003 | Heinzman |
| 2004/0010621 A1 | 1/2004 | Afergan et al. |
| 2004/0028212 A1 | 2/2004 | Lok et al. |
| 2004/0031030 A1 | 2/2004 | Kidder et al. |
| 2004/0046789 A1 | 3/2004 | Inanoria |
| 2004/0128546 A1 | 7/2004 | Blakley et al. |
| 2004/0250257 A1 | 12/2004 | Koutyrine et al. |
| 2005/0055631 A1 | 3/2005 | Scardina et al. |
| 2005/0091539 A1 | 4/2005 | Wang et al. |
| 2005/0171872 A1 | 8/2005 | Burch et al. |
| 2005/0172261 A1 | 8/2005 | Yuknewicz et al. |
| 2005/0183059 A1 | 8/2005 | Loksh et al. |
| 2006/0064582 A1 | 3/2006 | Teal et al. |
| 2006/0075398 A1 | 4/2006 | Bennett et al. |
| 2006/0143359 A1 | 6/2006 | Dostert et al. |
| 2006/0173873 A1 | 8/2006 | Prompt et al. |
| 2006/0176901 A1 | 8/2006 | Terai et al. |
| 2006/0185004 A1 | 8/2006 | Song et al. |
| 2006/0230363 A1 | 10/2006 | Rapp |
| 2006/0291398 A1 | 12/2006 | Potter et al. |
| 2007/0016804 A1 | 1/2007 | Kemshall |
| 2007/0078887 A1 | 4/2007 | Harvey et al. |
| 2007/0112574 A1 | 5/2007 | Greene |
| 2007/0124443 A1 | 5/2007 | Nanda et al. |

(56) References Cited

U.S. PATENT DOCUMENTS

| | | |
|---|---|---|
| 2007/0174290 A1 | 7/2007 | Narang et al. |
| 2007/0219956 A1 | 9/2007 | Milton |
| 2007/0240127 A1 | 10/2007 | Roques et al. |
| 2007/0255764 A1 | 11/2007 | Sonnier et al. |
| 2008/0049779 A1 | 2/2008 | Hopmann et al. |
| 2008/0077809 A1 | 3/2008 | Hayler et al. |
| 2008/0112620 A1 | 5/2008 | Jiang |
| 2008/0222238 A1 | 9/2008 | Ivanov et al. |
| 2008/0256026 A1 | 10/2008 | Hays |
| 2008/0256280 A1 | 10/2008 | Ma |
| 2008/0256554 A1 | 10/2008 | Yassin |
| 2008/0276224 A1 | 11/2008 | Gyure et al. |
| 2008/0288644 A1 | 11/2008 | Gilfix et al. |
| 2009/0006538 A1 | 1/2009 | Risney et al. |
| 2009/0019533 A1 | 1/2009 | Hazlewood et al. |
| 2009/0064001 A1 | 3/2009 | Robbins |
| 2009/0086726 A1 | 4/2009 | Savage et al. |
| 2009/0106234 A1 | 4/2009 | Siedlecki et al. |
| 2009/0119763 A1 | 5/2009 | Park et al. |
| 2009/0125595 A1 | 5/2009 | Maes |
| 2009/0157811 A1 | 6/2009 | Bailor et al. |
| 2009/0164571 A1 | 6/2009 | Potter et al. |
| 2009/0178129 A1 | 7/2009 | Cross et al. |
| 2009/0183072 A1 | 7/2009 | Stephenson et al. |
| 2010/0017812 A1 | 1/2010 | Nigam |
| 2010/0042869 A1 | 2/2010 | Szabo et al. |
| 2010/0070230 A1 | 3/2010 | Kumar et al. |
| 2010/0083386 A1 | 4/2010 | Kline et al. |
| 2010/0088519 A1 | 4/2010 | Tsuruoka et al. |
| 2010/0107241 A1 | 4/2010 | Jaber et al. |
| 2010/0169640 A1 | 7/2010 | Smith et al. |
| 2010/0251352 A1 | 9/2010 | Zarchy et al. |
| 2010/0257513 A1 | 10/2010 | Thirumalai et al. |
| 2010/0281475 A1 | 11/2010 | Jain et al. |
| 2010/0286992 A1 | 11/2010 | Tkatch et al. |
| 2010/0293080 A1 | 11/2010 | Shah |
| 2011/0010394 A1 | 1/2011 | Carew et al. |
| 2011/0022812 A1 | 1/2011 | Linden et al. |
| 2011/0078675 A1 | 3/2011 | Camp et al. |
| 2011/0107196 A1 | 5/2011 | Foster |
| 2011/0123973 A1 | 5/2011 | Singh |
| 2011/0125448 A1 | 5/2011 | Jung |
| 2011/0138034 A1 | 6/2011 | Brookbanks et al. |
| 2011/0153667 A1 | 6/2011 | Parmenter et al. |
| 2011/0209140 A1 | 8/2011 | Scheidel et al. |
| 2011/0213756 A1 | 9/2011 | Chen et al. |
| 2011/0213870 A1 | 9/2011 | Cai et al. |
| 2011/0246964 A1 | 10/2011 | Cox et al. |
| 2011/0265077 A1 | 10/2011 | Collison et al. |
| 2011/0302398 A1 | 12/2011 | Ureche et al. |
| 2011/0302516 A1 | 12/2011 | White et al. |
| 2011/0314159 A1 | 12/2011 | Murphy et al. |
| 2011/0321033 A1 | 12/2011 | Kelkar et al. |
| 2011/0321150 A1 | 12/2011 | Gluck |
| 2012/0011578 A1 | 1/2012 | Hinton et al. |
| 2012/0036125 A1 | 2/2012 | Al-Kofahi et al. |
| 2012/0090021 A1 | 4/2012 | Luh et al. |
| 2012/0096521 A1 | 4/2012 | Peddada |
| 2012/0102451 A1 | 4/2012 | Kulkarni et al. |
| 2012/0110650 A1 | 5/2012 | Van Biljon et al. |
| 2012/0144501 A1 | 6/2012 | Vangpat et al. |
| 2012/0151063 A1 | 6/2012 | Yang et al. |
| 2012/0151568 A1 | 6/2012 | Pieczul et al. |
| 2012/0166488 A1 | 6/2012 | Kaushik et al. |
| 2012/0170751 A1 | 7/2012 | Wurm |
| 2012/0215582 A1 | 8/2012 | Petri et al. |
| 2012/0252405 A1 | 10/2012 | Lortz et al. |
| 2012/0297016 A1 | 11/2012 | Iyer et al. |
| 2012/0317172 A1 | 12/2012 | Redpath |
| 2012/0317233 A1 | 12/2012 | Redpath |
| 2012/0323553 A1 | 12/2012 | Aslam et al. |
| 2012/0328105 A1 | 12/2012 | Mukkara et al. |
| 2013/0007845 A1 | 1/2013 | Chang et al. |
| 2013/0019015 A1 | 1/2013 | Devarakonda et al. |
| 2013/0019242 A1 | 1/2013 | Chen et al. |
| 2013/0024695 A1 | 1/2013 | Kandrasheu et al. |
| 2013/0031136 A1 | 1/2013 | Shah |
| 2013/0071087 A1 | 3/2013 | Motiwala et al. |
| 2013/0086645 A1 | 4/2013 | Srinivasan et al. |
| 2013/0151848 A1 | 6/2013 | Baumann et al. |
| 2013/0152047 A1 | 6/2013 | Moorthi et al. |
| 2013/0173712 A1 | 7/2013 | Llorente et al. |
| 2013/0179961 A1 | 7/2013 | Abe |
| 2013/0191339 A1 | 7/2013 | Von Haden et al. |
| 2013/0191481 A1 | 7/2013 | Prevost et al. |
| 2013/0198236 A1 | 8/2013 | Lissack et al. |
| 2013/0232179 A1 | 9/2013 | Chhaunker et al. |
| 2013/0239192 A1 | 9/2013 | Linga et al. |
| 2013/0254262 A1 | 9/2013 | Udall |
| 2013/0262626 A1 | 10/2013 | Bozek et al. |
| 2013/0312067 A1 | 11/2013 | Ogura et al. |
| 2013/0312117 A1 | 11/2013 | Sapp et al. |
| 2014/0006465 A1 | 1/2014 | Davis et al. |
| 2014/0007205 A1 | 1/2014 | Oikonomou |
| 2014/0013109 A1 | 1/2014 | Yin |
| 2014/0013400 A1 | 1/2014 | Warshavsky et al. |
| 2014/0032531 A1 | 1/2014 | Ravi et al. |
| 2014/0040920 A1 | 2/2014 | Wu et al. |
| 2014/0050317 A1 | 2/2014 | Sabin |
| 2014/0053056 A1 | 2/2014 | Weber et al. |
| 2014/0053126 A1 | 2/2014 | Watson et al. |
| 2014/0075032 A1 | 3/2014 | Vasudevan et al. |
| 2014/0075501 A1 | 3/2014 | Srinivasan et al. |
| 2014/0075513 A1 | 3/2014 | Trammel et al. |
| 2014/0089674 A1 | 3/2014 | Buehl |
| 2014/0090037 A1 | 3/2014 | Singh |
| 2014/0109072 A1 | 4/2014 | Lang et al. |
| 2014/0109078 A1 | 4/2014 | Lang et al. |
| 2014/0114707 A1 | 4/2014 | Rope et al. |
| 2014/0164318 A1 | 6/2014 | Tsai et al. |
| 2014/0172486 A1 | 6/2014 | Kwan et al. |
| 2014/0173454 A1 | 6/2014 | Sanchez |
| 2014/0245389 A1 | 8/2014 | Oberheide et al. |
| 2014/0280771 A1 | 9/2014 | Bosworth et al. |
| 2014/0280931 A1 | 9/2014 | Braun et al. |
| 2014/0280943 A1 | 9/2014 | Bobrov et al. |
| 2014/0280948 A1 | 9/2014 | Schmidt et al. |
| 2014/0281943 A1 | 9/2014 | Prilepov et al. |
| 2014/0282398 A1 | 9/2014 | Podolyak et al. |
| 2014/0282399 A1 | 9/2014 | Gorelik et al. |
| 2014/0282889 A1 | 9/2014 | Ishaya et al. |
| 2014/0298293 A1 | 10/2014 | Nishio et al. |
| 2014/0304507 A1 | 10/2014 | Coppola et al. |
| 2014/0304700 A1 | 10/2014 | Kim et al. |
| 2014/0310243 A1 | 10/2014 | McGee et al. |
| 2014/0324911 A1 | 10/2014 | De et al. |
| 2014/0330869 A1 | 11/2014 | Factor et al. |
| 2014/0337914 A1 | 11/2014 | Canning et al. |
| 2015/0007274 A1 | 1/2015 | Chang et al. |
| 2015/0039732 A1 | 2/2015 | Mall et al. |
| 2015/0040104 A1 | 2/2015 | Mall et al. |
| 2015/0040201 A1 | 2/2015 | Nyisztor et al. |
| 2015/0067135 A1 | 3/2015 | Wang et al. |
| 2015/0082035 A1 | 3/2015 | Medvinsky |
| 2015/0088806 A1 | 3/2015 | Lotan et al. |
| 2015/0089340 A1 | 3/2015 | Logan et al. |
| 2015/0089341 A1 | 3/2015 | Davis et al. |
| 2015/0089342 A1 | 3/2015 | Davis et al. |
| 2015/0089351 A1 | 3/2015 | Logan et al. |
| 2015/0089569 A1 | 3/2015 | Sondhi et al. |
| 2015/0089604 A1 | 3/2015 | Mathew et al. |
| 2015/0121462 A1 | 4/2015 | Courage et al. |
| 2015/0128063 A1 | 5/2015 | Jones |
| 2015/0128106 A1 | 5/2015 | Halley et al. |
| 2015/0154415 A1 | 6/2015 | Wu et al. |
| 2015/0195182 A1 | 7/2015 | Mathur et al. |
| 2015/0213284 A1 | 7/2015 | Birkel et al. |
| 2015/0229638 A1 | 8/2015 | Loo |
| 2015/0256530 A1 | 9/2015 | Semba |
| 2015/0295844 A1 | 10/2015 | Perreira et al. |
| 2015/0304446 A1 | 10/2015 | Kato |
| 2015/0319185 A1 | 11/2015 | Kirti et al. |
| 2015/0319252 A1 | 11/2015 | Momchilov et al. |
| 2015/0332596 A1 | 11/2015 | Applehans |

(56) References Cited

U.S. PATENT DOCUMENTS

| | | |
|---|---|---|
| 2015/0350186 A1 | 12/2015 | Chan et al. |
| 2015/0350338 A1 | 12/2015 | Barnett et al. |
| 2016/0004668 A1 | 1/2016 | Rowles et al. |
| 2016/0048848 A1 | 2/2016 | Diggs et al. |
| 2016/0080360 A1 | 3/2016 | Child et al. |
| 2016/0085666 A1 | 3/2016 | Jordan |
| 2016/0085735 A1 | 3/2016 | Davis et al. |
| 2016/0092176 A1 | 3/2016 | Straub et al. |
| 2016/0092179 A1 | 3/2016 | Straub |
| 2016/0092180 A1 | 3/2016 | Straub |
| 2016/0092339 A1 | 3/2016 | Straub et al. |
| 2016/0092348 A1 | 3/2016 | Straub et al. |
| 2016/0092425 A1 | 3/2016 | Shah et al. |
| 2016/0092540 A1 | 3/2016 | Bihani et al. |
| 2016/0105393 A1 | 4/2016 | Thakkar et al. |
| 2016/0112475 A1 | 4/2016 | Lawson et al. |
| 2016/0124742 A1 | 5/2016 | Rangasamy et al. |
| 2016/0125490 A1 | 5/2016 | Angal et al. |
| 2016/0127199 A1 | 5/2016 | Ding et al. |
| 2016/0127254 A1 | 5/2016 | Kumar et al. |
| 2016/0127349 A1 | 5/2016 | Nakajima et al. |
| 2016/0127454 A1 | 5/2016 | Maheshwari et al. |
| 2016/0132214 A1 | 5/2016 | Koushik et al. |
| 2016/0149882 A1 | 5/2016 | Srivastava |
| 2016/0154629 A1 | 6/2016 | Noens et al. |
| 2016/0182328 A1 | 6/2016 | Bhasin et al. |
| 2016/0182588 A1 | 6/2016 | Luo et al. |
| 2016/0202007 A1 | 7/2016 | Hatch et al. |
| 2016/0203087 A1 | 7/2016 | Nam et al. |
| 2016/0248860 A1 | 8/2016 | Dunbar et al. |
| 2016/0248866 A1 | 8/2016 | Garas |
| 2016/0267170 A1 | 9/2016 | Hastings et al. |
| 2016/0269343 A1 | 9/2016 | Li et al. |
| 2016/0285795 A1 | 9/2016 | Beausoleil et al. |
| 2016/0292694 A1 | 10/2016 | Goldschlag et al. |
| 2016/0294870 A1 | 10/2016 | Banerjee et al. |
| 2016/0314460 A1 | 10/2016 | Subramanian et al. |
| 2016/0337329 A1 | 11/2016 | Sood et al. |
| 2016/0344561 A1 | 11/2016 | Grajek |
| 2016/0352746 A1 | 12/2016 | Anderson et al. |
| 2016/0359861 A1 | 12/2016 | Manov et al. |
| 2016/0364231 A1 | 12/2016 | Tati et al. |
| 2016/0378436 A1 | 12/2016 | Jensen et al. |
| 2016/0378439 A1 | 12/2016 | Straub et al. |
| 2017/0010870 A1 | 1/2017 | Davis et al. |
| 2017/0046134 A1 | 2/2017 | Straub |
| 2017/0046235 A1 | 2/2017 | Straub et al. |
| 2017/0046254 A1 | 2/2017 | Buege |
| 2017/0048215 A1 | 2/2017 | Straub |
| 2017/0048252 A1 | 2/2017 | Straub et al. |
| 2017/0048319 A1 | 2/2017 | Straub |
| 2017/0048339 A1 | 2/2017 | Straub |
| 2017/0063833 A1 | 3/2017 | Colle et al. |
| 2017/0063989 A1 | 3/2017 | Langouev et al. |
| 2017/0083293 A1 | 3/2017 | Jao et al. |
| 2017/0083503 A1 | 3/2017 | Davis et al. |
| 2017/0141916 A1 | 5/2017 | Zhang |
| 2017/0142094 A1 | 5/2017 | Doitch et al. |
| 2017/0155686 A1 | 6/2017 | Yanacek et al. |
| 2017/0168797 A1* | 6/2017 | Pogrebinsky ............ G06F 8/65 |
| 2017/0187785 A1 | 6/2017 | Johnson et al. |
| 2017/0187818 A1 | 6/2017 | Haswell et al. |
| 2017/0214696 A1 | 7/2017 | Cleaver et al. |
| 2017/0244613 A1 | 8/2017 | Vasudevan et al. |
| 2017/0295184 A1 | 10/2017 | Kurian et al. |
| 2018/0032534 A1 | 2/2018 | Koerner et al. |
| 2018/0041467 A1 | 2/2018 | Vats et al. |
| 2018/0041516 A1 | 2/2018 | Vats et al. |
| 2018/0041598 A1 | 2/2018 | Vats et al. |
| 2018/0063258 A1 | 3/2018 | Wang et al. |
| 2018/0083915 A1 | 3/2018 | Medam et al. |
| 2018/0083944 A1 | 3/2018 | Vats et al. |
| 2018/0191700 A1 | 7/2018 | Kong et al. |
| 2018/0329981 A1 | 11/2018 | Gupte et al. |
| 2019/0102156 A1* | 4/2019 | Kennedy ............ G06F 11/3664 |

FOREIGN PATENT DOCUMENTS

| | | |
|---|---|---|
| CN | 105515759 A | 4/2016 |
| EP | 3361700 A1 | 8/2018 |
| JP | 2008027043 A | 2/2008 |
| JP | 2013025405 A | 2/2013 |
| JP | 2013182310 A | 9/2013 |
| JP | 2015527681 A | 9/2015 |
| JP | 2015529366 A | 10/2015 |
| JP | 2016009299 A | 1/2016 |
| WO | 2005001620 A2 | 1/2005 |
| WO | 2013071087 A1 | 5/2013 |
| WO | 2013186070 A1 | 12/2013 |
| WO | 2014039918 A1 | 3/2014 |
| WO | 2014046857 A1 | 3/2014 |
| WO | 2014151839 A1 | 9/2014 |
| WO | 2014176363 A1 | 10/2014 |
| WO | 2016049626 A1 | 3/2016 |
| WO | 2016065080 A1 | 4/2016 |

OTHER PUBLICATIONS

"AWS Identity and Access Management (IAM)"; Amazon AWS website [full url in ref.] as captured by the Wayback Machine Internet Archive (archive.org) on Jul. 27, 2017 (Year: 2017).*

"Custom App Development or Template Applications? Here's How You Know"; Applt Ventures website [full url in ref.); Jun. 1, 2016 (Year: 2016).*

"Create a Template for an Application"; OutSystems.com website [full url in ref.] as captured by the Wayback Machine Internet Archive (archive.org) on Sep. 18, 2017 (Year: 2017).*

R. Fielding; REST API Tutorial; 2017.

"Citrix XenServer Workload Balancing (WLB)"; Jan. 22, 2015;https://www.citrix.com/blogs/2015/01/22/citrix-xenserver-workload-balancing-wlb-why-xendesktop-and-xenapp-customers-really-should-take-note/.

"Cross-Device Single Sign-On Session Transfer", retrieved from https://www.egiz.gv.at/en/projekte/160-sso_session_transfer on Sep. 7, 2017.

"Explore Microsoft Azure monitoring and diagnostics", youtube,Sep. 28, 2016 (Sep. 28, 2016), p. 1 pp.•XP054977701,Retrieved from the Internet: URL:https://www.youtube.com/watch?v=wUf4sm 8aA w[retrieved on Sep. 5, 2017].

Anonymous, "DaaS—Diagnostics as a Service for Azure Web Sites: Blog: Microsoft Azure", Jul. 8, 2014 (Jul. 8, 2014), XP055403199, Retrieved from the Internet: URL:https://azure.microsoft.com/en-gb/blog/daas/ [retrieved on Sep. 1, 2017].

Anonymous, Gluu Server Overview : The Gluu Server for SSO, WAM, & 2FA : Gluu, website, , Aug. 29, 2016 (Aug. 29, 2016), XP055417541, Retrieved from the Internet on Oct. 20, 2017, https://web.archive.org/web/20160829102122/https://www.gluu.org/gluu-server/overview/.

Application Note—"Implementing Single Sign-On Using SAML 2.0 on Juniper Networks Mag Series Junos Pulse Gateways", Juniper Networks, Inc., 2013, 22 pages.

Author Unknown, "Oracle Access Management—Complete, Integrated, Scalable Access Management Solution", Oracle White Paper, Retrieved Fromhttp://www.oracle.com/technetwork/middleware/id-mgmt/overview/complete-and-scalable-access-mgmt-1697349.pdf, Published May 2015.

Author Unknown, SCIM Directory Services, Oracle Corporation, Sep. 2012, https://tools.ietf.org/id/draft-hunt-scim-directory-00.html#rfc.section.2.2, visited Jun. 26, 2017.

Author Unknown, UnboundID Identity Proxy Product Description Version 4.5, UnboundID Corp., Austin TX, 2015 , https://cdn2.hubspot.net/hub/405650/file-2157336753-pdf/Resources/Data_Sheets/UnboundID_Identity_Proxy_v4.5PD.pdf?t=1458081481415, visited Jun. 26, 2017.

Brockallen: "Single sign-out and IdentityServer3: brockallen",Feb. 8, 2016, XP055417951, Retrieved from the Internet on Nov. 20, 2017, URL:https://brockallen.com/2016/02/08/single-sign-out-and-identityserver3/.

(56) References Cited

OTHER PUBLICATIONS

Gluu: "Diagram Gluu Software Architecture", Dec. 3, 2013 (Dec. 3, 2013), XP055417597, Retrieved from the Internet: URL:https://www.gluu.org/blog/wp-content/uploads/2013/12/idea_asimba.png [retrieved on Oct. 20, 2017].
Gluu: "Use Case for Asimba as SAML Proxy: Gluu : Blog", Dec. 3, 2013 (Dec. 3, 2013), XP055417606, Retrieved from the Internet:URL:https://www.gluu.org/blog/use-case-for-asimba-as-saml-proxy/ [retrieved on Oct. 20, 2017].
Gluu:"Shibboleth Plugin released to enable simultaneous OpenID Connect and SAML sessions: Gluu", Mar. 25, 2013 (Mar. 25, 2013), XP055417498,Retrieved from the Internet: URL:https://www.gluu.org/press-releases/2013/gluu-releases-shibboleth-plugin-for-ox-to-enable-simultaneous-openid-connect-and-saml-sessions/ [retrieved on Oct. 19, 2017].
Gregg Browinski: "SAML Single Logout—What You Need to Know",Jun. 20, 2016 (Jun. 20, 2016), XP055417923, Retrieved from the Internet: URL:https://www.portalguard.com/blog/2016/06/20/saml-single-logout-need-to-know/ [retrieved on Oct. 23, 2017].
Grossman et al., "ToolClips: An Investigation of Contextual Video Assistance for Functionality Understanding, CHI 2010: Looking with Video", Apr. 10-15, 2010, pp. 1515-1524.
Hudli et al., "An Evaluation Framework for Selection of Mobile App Development Platform", ACM, pp. 13-16, 2015.
Jones et al., RFC 7519 JSON Web Tokens (JWT), May 2015, IETF, pp. 1-30.
Sairam Pappu et al., "Integrate Oracle E-Business Suite Using Oracle E-Business Suite AccessGate with Oracle Access Manager Using Multiple Data Stores", Retrieved From http://www.oracle.com/technetwork/middleware/id-mgmt/oamebsintegrationwhi-tepaper-2152856.pdf, Published Feb. 2014.
Unknown, "SAML Authorization Assertion", Oct. 31, 2014, Oracle, pp. 1-2, Retrieved from docs.oracle.com.
Wikipedia: "Security Assertion Markup Language—Wikipedia",Aug. 28, 2016 (Aug. 28, 2016), XP055417859, Retrieved from the Internet:URL:https://en.wlkipedia.org/w/index.php?title=Security_Assertion_Markup_Language&oldid=736544308 [retrieved on Oct. 23, 2017].
Claycomb et al., "Detecting Insider Activity Using Enhanced Directory Virtualization", Oct. 2010, Proceedings of the 2010 ACM workshop on Insider threats, p. 29-36.
Larsson, "A Cast Study: Implementing Novell Identity Management at Drew University", Nov. 2005, Proceedings of the 33rd annual ACM SIGUCCS conference on user services, p. 165-170.
"TaskscheduleR: R Package to Schedule R Scripts with the Windows Task Manager", Bnosac, Feb. 8, 2017, https://web.archive.org/web/20170208221949/http://www.bnosac.be/index.php/blog/50-taskscheduler-r-package-to-schedule-r-scripts-with-the-windows-task-manager-2.
Peyrott, "What is and how does Single Sign on Authentication work", Blog Series, Sep. 23, 2015.
Yang et al., "Design-Role Based Multi-Tenancy Access Control Scheme for Cloud Service", 2003, International Symposium on Biometrics and Security Technologies, Date of Conference: Jul. 2-5 (Year: 2013).
Coan et al., "Using Distributed Topology Update and Preplanned Configurations to Achieve Trunk Network Survivability", Oct. 1991, IEEE, vol. 40, No. 4 (Year: 1991).
Konstantinou et al., "An Architecture for Virtual Solution Composition and Deployment in Infrastructure Clouds", Jun. 2009, ACM (Year: 2009).
Oliveira et al., "Delivering software with agility and quality in a cloud environment", Mar. 2016, IBM, vol. 60 No. 2/3 Paper 10 (Year: 2016).
Rasti et al., "On the Long-Term Evolution of the Two-Tier Gnutella Overlay", Apr. 2007, IEEE (Year: 2007).
Rokonuzzaman et al., "A Cross-layer Approach for Qos Topology Control in Wireless Ad Hoc Networks", 2009. IEEE (Year: 2009).
Alguliev et al., "identity management based security architecture of cloud computing on multi-agent systems", Nov. 2013, Third International Conference on Innovative Computing Technology (INTECH 2013), pp. 1-4.

\* cited by examiner

APPLICATION TEMPLATES AND UPGRADE FRAMEWORK FOR A MULTI-TENANT IDENTITY CLOUD SERVICE

CROSS-REFERENCE TO RELATED APPLICATIONS

This application claims the benefit of priority to U.S. Provisional Application 62/565,922, filed Sep. 29, 2017, which is incorporated herein by reference in its entirety.

FIELD

One embodiment is directed generally to identity and access management, and in particular, to identity and access management in a cloud system.

BACKGROUND INFORMATION

Generally, the use of cloud-based applications (e.g., enterprise public cloud applications, third-party cloud applications, etc.) is soaring, with access coming from a variety of devices (e.g., desktop and mobile devices) and a variety of users (e.g., employees, partners, customers, etc.). The abundant diversity and accessibility of cloud-based applications has led identity management and access security to become a central concern. Typical security concerns in a cloud environment are unauthorized access, account hijacking, malicious insiders, etc. Accordingly, there is a need for secure access to cloud-based applications, or applications located anywhere, regardless of from what device type or by what user type the applications are accessed.

SUMMARY

One embodiment is a system manages tenant application updates in a multi-tenant cloud-based identity and access management (IAM) system by defining one or more application templates; creating one or more applications for one or more tenants of the multi-tenant cloud-based IAM system using the one or more application templates; applying a change to at least one of the one or more application templates; determining whether the one or more applications need to be updated in an automatic mode, a semi-automatic mode, or a manual mode, to incorporate the change; and updating at least one of the one or more applications in an applicable one of the automatic mode, the semi-automatic mode, or the manual mode, based on the outcome of the determining.

DETAILED DESCRIPTION

Figure 1:
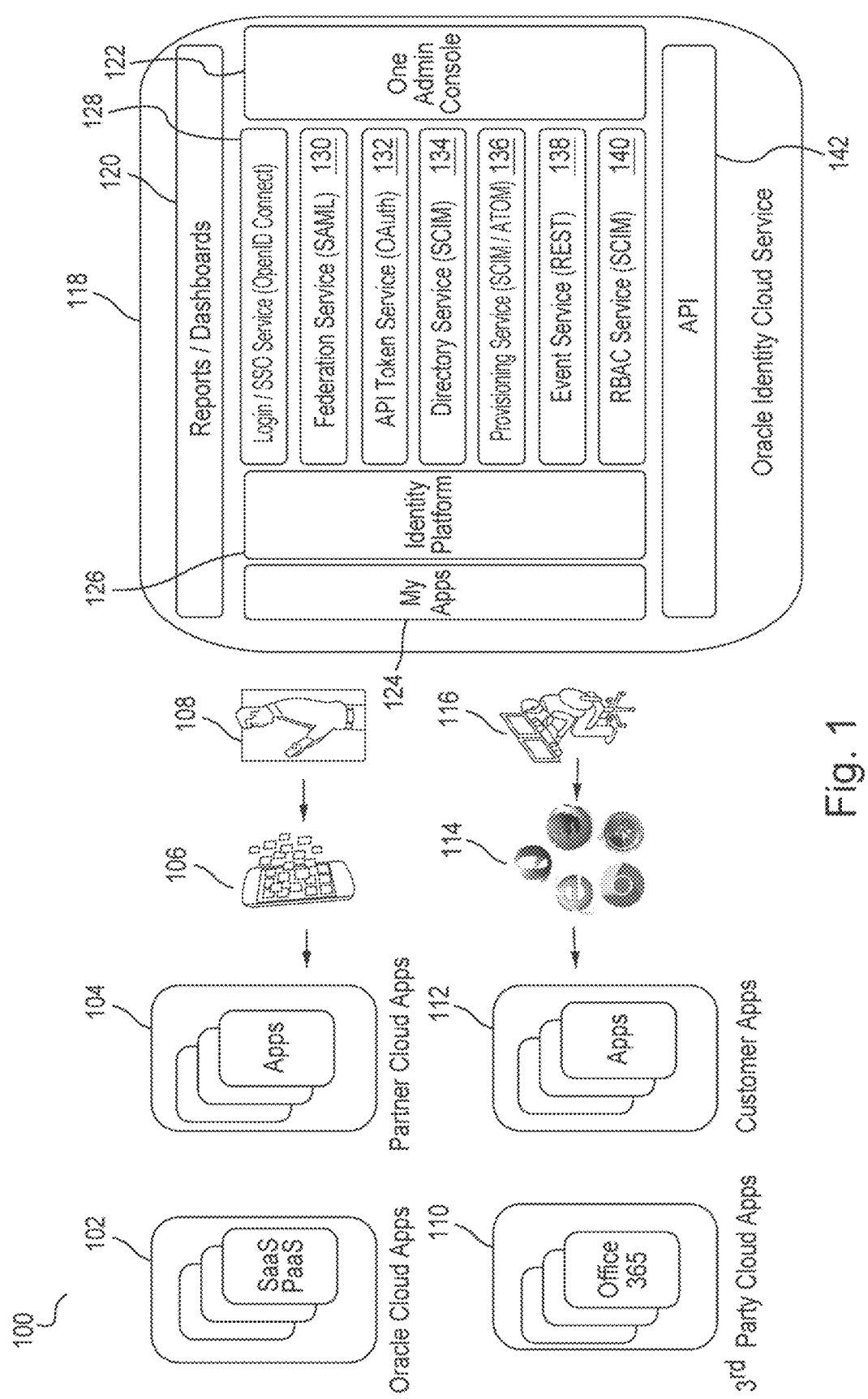
FIGS. 1-5 are block diagrams of example embodiments that provide cloud-based identity management.

Embodiments provide management of applications in a multi-tenant cloud-based system, where each application is based on exactly one application template, and where each application is updated/upgraded as the corresponding template is updated/upgraded.

Embodiments provide an identity cloud service that implements a microservices based architecture and provides multi-tenant identity and data security management and secure access to cloud-based applications.

Embodiments support secure access for hybrid cloud deployments (i.e., cloud deployments which include a combination of a public cloud and a private cloud). Embodiments protect applications and data both in the cloud and on-premise. Embodiments support multi-channel access via web, mobile, and application programming interfaces ("APIs"). Embodiments manage access for different users, such as customers, partners, and employees. Embodiments manage, control, and audit access across the cloud as well as on-premise. Embodiments integrate with new and existing applications and identities. Embodiments are horizontally scalable.

One embodiment is a system that implements a number of microservices in a stateless middle tier environment to provide cloud-based multi-tenant identity and access management services. In one embodiment, each requested identity management service is broken into real-time and near-real-time tasks. The real-time tasks are handled by a microservice in the middle tier, while the near-real-time tasks are offloaded to a message queue. Embodiments implement access tokens that are consumed by a routing tier and a middle tier to enforce a security model for accessing the microservices. Accordingly, embodiments provide a cloud-scale Identity and Access Management ("IAM") platform based on a multi-tenant, microservices architecture.

One embodiment provides an identity cloud service that enables organizations to rapidly develop fast, reliable, and secure services for their new business initiatives. In one embodiment, the identity cloud service provides a number of core services, each of which solving a unique challenge faced by many enterprises. In one embodiment, the identity cloud service supports administrators in, for example, initial on-boarding/importing of users, importing groups with user members, creating/updating/disabling/enabling/deleting users, assigning/un-assigning users into/from groups, creating/updating/deleting groups, resetting passwords, managing policies, sending activation, etc. The identity cloud service also supports end users in, for example, modifying profiles, setting primary/recovery emails, verifying emails, unlocking their accounts, changing passwords, recovering passwords in case of forgotten password, etc.

Unified Security of Access

One embodiment protects applications and data in a cloud environment as well as in an on-premise environment. The embodiment secures access to any application from any device by anyone. The embodiment provides protection across both environments since inconsistencies in security between the two environments may result in higher risks. For example, such inconsistencies may cause a sales person to continue having access to their Customer Relationship Management ("CRM") account even after they have defected to the competition. Accordingly, embodiments extend the security controls provisioned in the on-premise environment into the cloud environment. For example, if a person leaves a company, embodiments ensure that their accounts are disabled both on-premise and in the cloud.

Generally, users may access applications and/or data through many different channels such as web browsers, desktops, mobile phones, tablets, smart watches, other wearables, etc. Accordingly, one embodiment provides secured access across all these channels. For example, a user may use their mobile phone to complete a transaction they started on their desktop.

One embodiment further manages access for various users such as customers, partners, employees, etc. Generally, applications and/or data may be accessed not just by employees but by customers or third parties. Although many known systems take security measures when onboarding employees, they generally do not take the same level of security measures when giving access to customers, third parties, partners, etc., resulting in the possibility of security breaches by parties that are not properly managed. However, embodiments ensure that sufficient security measures are provided for access of each type of user and not just employees.

Identity Cloud Service

Embodiments provide an Identity Cloud Service ("IDCS") that is a multi-tenant, cloud-scale, IAM platform. IDCS provides authentication, authorization, auditing, and federation. IDCS manages access to custom applications and services running on the public cloud, and on-premise systems. In an alternative or additional embodiment, IDCS may also manage access to public cloud services. For example, IDCS can be used to provide Single Sign On ("SSO") functionality across such variety of services/applications/systems.

Embodiments are based on a multi-tenant, microservices architecture for designing, building, and delivering cloud-scale software services. Multi-tenancy refers to having one physical implementation of a service securely supporting multiple customers buying that service. A service is a software functionality or a set of software functionalities (such as the retrieval of specified information or the execution of a set of operations) that can be reused by different clients for different purposes, together with the policies that control its usage (e.g., based on the identity of the client requesting the service). In one embodiment, a service is a mechanism to enable access to one or more capabilities, where the access is provided using a prescribed interface and is exercised consistent with constraints and policies as specified by the service description.

In one embodiment, a microservice is an independently deployable service. In one embodiment, the term microservice contemplates a software architecture design pattern in which complex applications are composed of small, independent processes communicating with each other using language-agnostic APIs. In one embodiment, microservices are small, highly decoupled services and each may focus on doing a small task. In one embodiment, the microservice architectural style is an approach to developing a single application as a suite of small services, each running in its own process and communicating with lightweight mechanisms (e.g., an HTTP resource API). In one embodiment, microservices are easier to replace relative to a monolithic service that performs all or many of the same functions. Moreover, each of the microservices may be updated without adversely affecting the other microservices. In contrast, updates to one portion of a monolithic service may undesirably or unintentionally negatively affect the other portions of the monolithic service. In one embodiment, microservices may be beneficially organized around their capabilities. In one embodiment, the startup time for each of a collection of microservices is much less than the startup time for a single application that collectively performs all the services of those microservices. In some embodiments, the startup time for each of such microservices is about one second or less, while the startup time of such single application may be about a minute, several minutes, or longer.

In one embodiment, microservices architecture refers to a specialization (i.e., separation of tasks within a system) and implementation approach for service oriented architectures ("SOAs") to build flexible, independently deployable software systems. Services in a microservices architecture are processes that communicate with each other over a network in order to fulfill a goal. In one embodiment, these services use technology-agnostic protocols. In one embodiment, the services have a small granularity and use lightweight protocols. In one embodiment, the services are independently deployable. By distributing functionalities of a system into different small services, the cohesion of the system is enhanced and the coupling of the system is decreased. This makes it easier to change the system and add functions and qualities to the system at any time. It also allows the architecture of an individual service to emerge through continuous refactoring, and hence reduces the need for a big up-front design and allows for releasing software early and continuously.

In one embodiment, in the microservices architecture, an application is developed as a collection of services, and each service runs a respective process and uses a lightweight protocol to communicate (e.g., a unique API for each microservice). In the microservices architecture, decomposition of a software into individual services/capabilities can be performed at different levels of granularity depending on the service to be provided. A service is a runtime component/process. Each microservice is a self-contained module that can talk to other modules/microservices. Each microservice has an unnamed universal port that can be contacted by others. In one embodiment, the unnamed universal port of a microservice is a standard communication channel that the microservice exposes by convention (e.g., as a conventional Hypertext Transfer Protocol ("HTTP") port) and that allows any other module/microservice within the same service to talk to it. A microservice or any other self-contained functional module can be generically referred to as a "service".

Embodiments provide multi-tenant identity management services. Embodiments are based on open standards to ensure ease of integration with various applications, delivering IAM capabilities through standards-based services.

Embodiments manage the lifecycle of user identities which entails the determination and enforcement of what an identity can access, who can be given such access, who can manage such access, etc. Embodiments run the identity management workload in the cloud and support security functionality for applications that are not necessarily in the cloud. The identity management services provided by the embodiments may be purchased from the cloud. For example, an enterprise may purchase such services from the cloud to manage their employees' access to their applications.

Embodiments provide system security, massive scalability, end user usability, and application interoperability. Embodiments address the growth of the cloud and the use of identity services by customers. The microservices based foundation addresses horizontal scalability requirements, while careful orchestration of the services addresses the functional requirements. Achieving both goals requires decomposition (wherever possible) of the business logic to achieve statelessness with eventual consistency, while much of the operational logic not subject to real-time processing is shifted to near-real-time by offloading to a highly scalable asynchronous event management system with guaranteed delivery and processing. Embodiments are fully multi-tenant from the web tier to the data tier in order to realize cost efficiencies and ease of system administration.

Embodiments are based on industry standards (e.g., OpenID Connect, OAuth2, Security Assertion Markup Language 2 ("SAML2"), System for Cross-domain Identity Management ("SCIM"), Representational State Transfer ("REST"), etc.) for ease of integration with various applications. One embodiment provides a cloud-scale API platform and implements horizontally scalable microservices for elastic scalability. The embodiment leverages cloud principles and provides a multi-tenant architecture with per-tenant data separation. The embodiment further provides per-tenant customization via tenant self-service. The embodiment is available via APIs for on-demand integration with other identity services, and provides continuous feature release.

One embodiment provides interoperability and leverages investments in identity management ("IDM") functionality in the cloud and on-premise. The embodiment provides automated identity synchronization from on-premise Lightweight Directory Access Protocol ("LDAP") data to cloud data and vice versa. The embodiment provides a SCIM identity bus between the cloud and the enterprise, and allows for different options for hybrid cloud deployments (e.g., identity federation and/or synchronization, SSO agents, user provisioning connectors, etc.).

Accordingly, one embodiment is a system that implements a number of microservices in a stateless middle tier to provide cloud-based multi-tenant identity and access management services. In one embodiment, each requested identity management service is broken into real-time and near-real-time tasks. The real-time tasks are handled by a microservice in the middle tier, while the near-real-time tasks are offloaded to a message queue. Embodiments implement tokens that are consumed by a routing tier to enforce a security model for accessing the microservices. Accordingly, embodiments provide a cloud-scale IAM platform based on a multi-tenant, microservices architecture.

Generally, known systems provide siloed access to applications provided by different environments, e.g., enterprise cloud applications, partner cloud applications, third-party cloud applications, and customer applications. Such siloed access may require multiple passwords, different password policies, different account provisioning and de-provisioning schemes, disparate audit, etc. However, one embodiment implements IDCS to provide unified IAM functionality over such applications. FIG. 1 is a block diagram 100 of an example embodiment with IDCS 118, providing a unified identity platform 126 for onboarding users and applications. The embodiment provides seamless user experience across various applications such as enterprise cloud applications 102, partner cloud applications 104, third-party cloud applications 110, and customer applications 112. Applications 102, 104, 110, 112 may be accessed through different channels, for example, by a mobile phone user 108 via a mobile phone 106, by a desktop computer user 116 via a browser 114, etc. A web browser (commonly referred to as a browser) is a software application for retrieving, presenting, and traversing information resources on the World Wide Web. Examples of web browsers are Mozilla Firefox®, Google Chrome®, Microsoft Internet Explorer®, and Apple Safari®.

IDCS 118 provides a unified view 124 of a user's applications, a unified secure credential across devices and applications (via identity platform 126), and a unified way of administration (via an admin console 122). IDCS services may be obtained by calling IDCS APIs 142. Such services may include, for example, login/SSO services 128 (e.g., OpenID Connect), federation services 130 (e.g., SAML), token services 132 (e.g., OAuth), directory services 134 (e.g., SCIM), provisioning services 136 (e.g., SCIM or Any Transport over Multiprotocol ("AToM")), event services 138 (e.g., REST), and authorization services 140 (e.g., SCIM). IDCS 118 may further provide reports and dashboards 120 related to the offered services.

Integration Tools

Generally, it is common for large corporations to have an IAM system in place to secure access to their on-premise applications. Business practices are usually matured and standardized around an in-house IAM system such as "Oracle IAM Suite" from Oracle Corp. Even small to medium organizations usually have their business processes designed around managing user access through a simple directory solution such as Microsoft Active Directory ("AD"). To enable on-premise integration, embodiments provide tools that allow customers to integrate their applications with IDCS.

Figure 2:
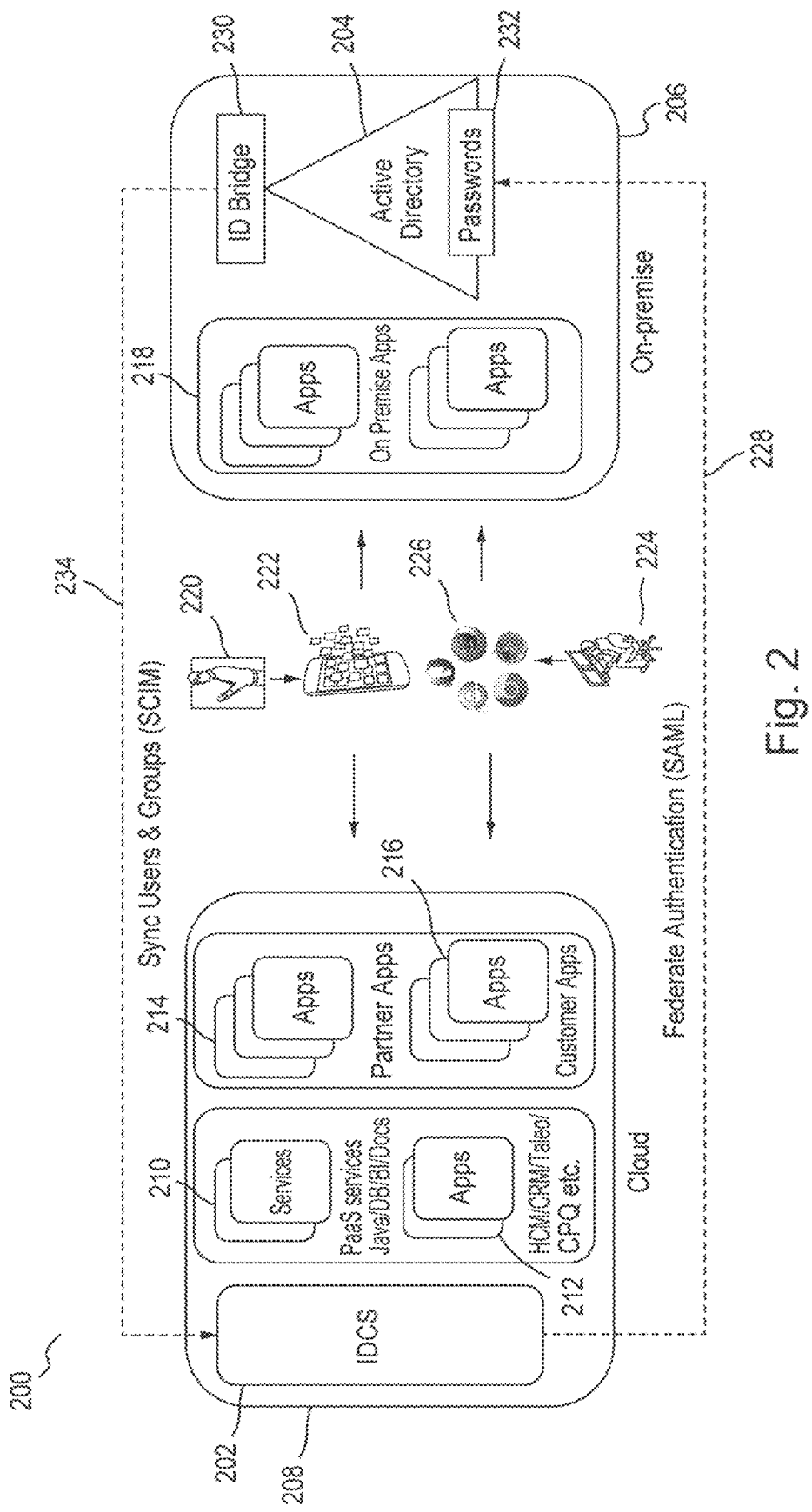

FIG. 2 is a block diagram 200 of an example embodiment with IDCS 202 in a cloud environment 208, providing integration with an AD 204 that is on-premise 206. The embodiment provides seamless user experience across all applications including on-premise and third-party applications, for example, on-premise applications 218 and various applications/services in cloud 208 such as cloud services 210, cloud applications 212, partner applications 214, and customer applications 216. Cloud applications 212 may include, for example, Human Capital Management ("HCM"), CRM, talent acquisition (e.g., Oracle Taleo cloud service from Oracle Corp.), Configure Price and Quote ("CPQ"), etc. Cloud services 210 may include, for example, Platform as a Service ("PaaS"), Java, database, business intelligence ("BI"), documents, etc.

Applications 210, 212, 214, 216, 218, may be accessed through different channels, for example, by a mobile phone user 220 via a mobile phone 222, by a desktop computer user 224 via a browser 226, etc. The embodiment provides automated identity synchronization from on-premise AD data to cloud data via a SCIM identity bus 234 between cloud 208 and the enterprise 206. The embodiment further provides a SAML bus 228 for federating authentication from cloud 208 to on-premise AD 204 (e.g., using passwords 232).

Generally, an identity bus is a service bus for identity related services. A service bus provides a platform for communicating messages from one system to another system. It is a controlled mechanism for exchanging information between trusted systems, for example, in a service oriented architecture ("SOA"). An identity bus is a logical bus built according to standard HTTP based mechanisms such as web service, web server proxies, etc. The communication in an identity bus may be performed according to a respective protocol (e.g., SCIM, SAML, OpenID Connect, etc.). For example, a SAML bus is an HTTP based connection between two systems for communicating messages for SAML services. Similarly, a SCIM bus is used to communicate SCIM messages according to the SCIM protocol.

The embodiment of FIG. 2 implements an identity ("ID") bridge 230 that is a small binary (e.g., 1 MB in size) that can be downloaded and installed on-premise 206 alongside a customer's AD 204. ID Bridge 230 listens to users and groups (e.g., groups of users) from the organizational units ("OUs") chosen by the customer and synchronizes those users to cloud 208. In one embodiment, users' passwords 232 are not synchronized to cloud 208. Customers can manage application access for users by mapping IDCS users' groups to cloud applications managed in IDCS 208. Whenever the users' group membership is changed on-premise 206, their corresponding cloud application access changes automatically.

For example, an employee moving from engineering to sales can get near instantaneous access to the sales cloud and lose access to the developer cloud. When this change is reflected in on-premise AD 204, cloud application access change is accomplished in near-real-time. Similarly, access to cloud applications managed in IDCS 208 is revoked for users leaving the company. For full automation, customers may set up SSO between on-premise AD 204 and IDCS 208 through, e.g., AD federation service ("AD/FS", or some other mechanism that implements SAML federation) so that end users can get access to cloud applications 210, 212, 214, 216, and on-premise applications 218 with a single corporate password 332.

Figure 3:
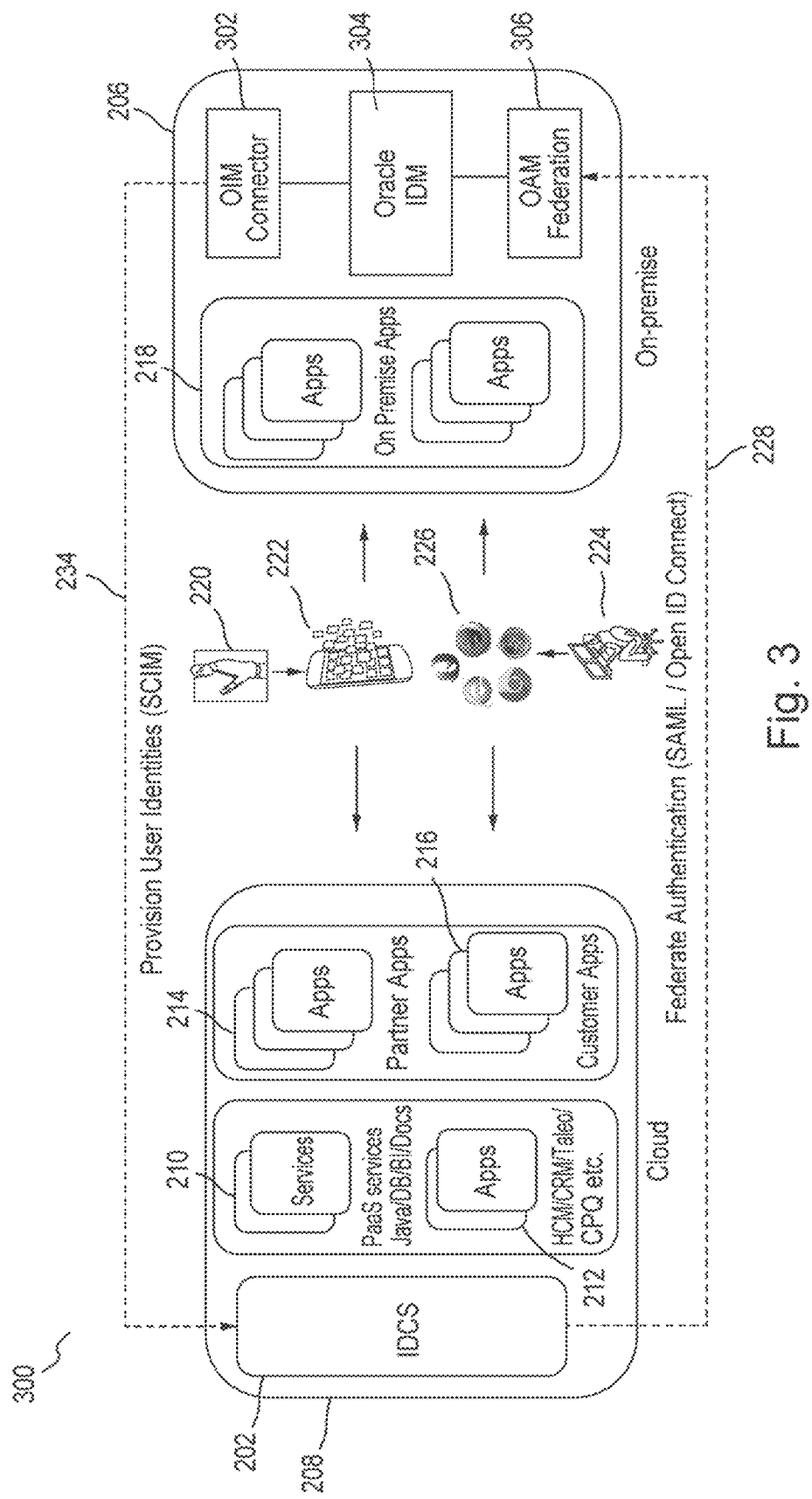

FIG. 3 is a block diagram 300 of an example embodiment that includes the same components 202, 206, 208, 210, 212, 214, 216, 218, 220, 222, 224, 226, 228, 234 as in FIG. 2. However, in the embodiment of FIG. 3, IDCS 202 provides integration with an on-premise IDM 304 such as Oracle IDM. Oracle IDM 304 is a software suite from Oracle Corp. for providing IAM functionality. The embodiment provides seamless user experience across all applications including on-premise and third-party applications. The embodiment provisions user identities from on-premise IDM 304 to IDCS 208 via SCIM identity bus 234 between cloud 202 and enterprise 206. The embodiment further provides SAML bus 228 (or an OpenID Connect bus) for federating authentication from cloud 208 to on-premise 206.

In the embodiment of FIG. 3, an Oracle Identity Manager ("OIM") Connector 302 from Oracle Corp., and an Oracle Access Manager ("OAM") federation module 306 from Oracle Corp., are implemented as extension modules of Oracle IDM 304. A connector is a module that has physical awareness about how to talk to a system. OIM is an application configured to manage user identities (e.g., manage user accounts in different systems based on what a user should and should not have access to). OAM is a security application that provides access management functionality such as web SSO; identity context, authentication and authorization; policy administration; testing; logging; auditing; etc. OAM has built-in support for SAML. If a user has an account in IDCS 202, OIM connector 302 and OAM federation 306 can be used with Oracle IDM 304 to create/delete that account and manage access from that account.

Figure 4:
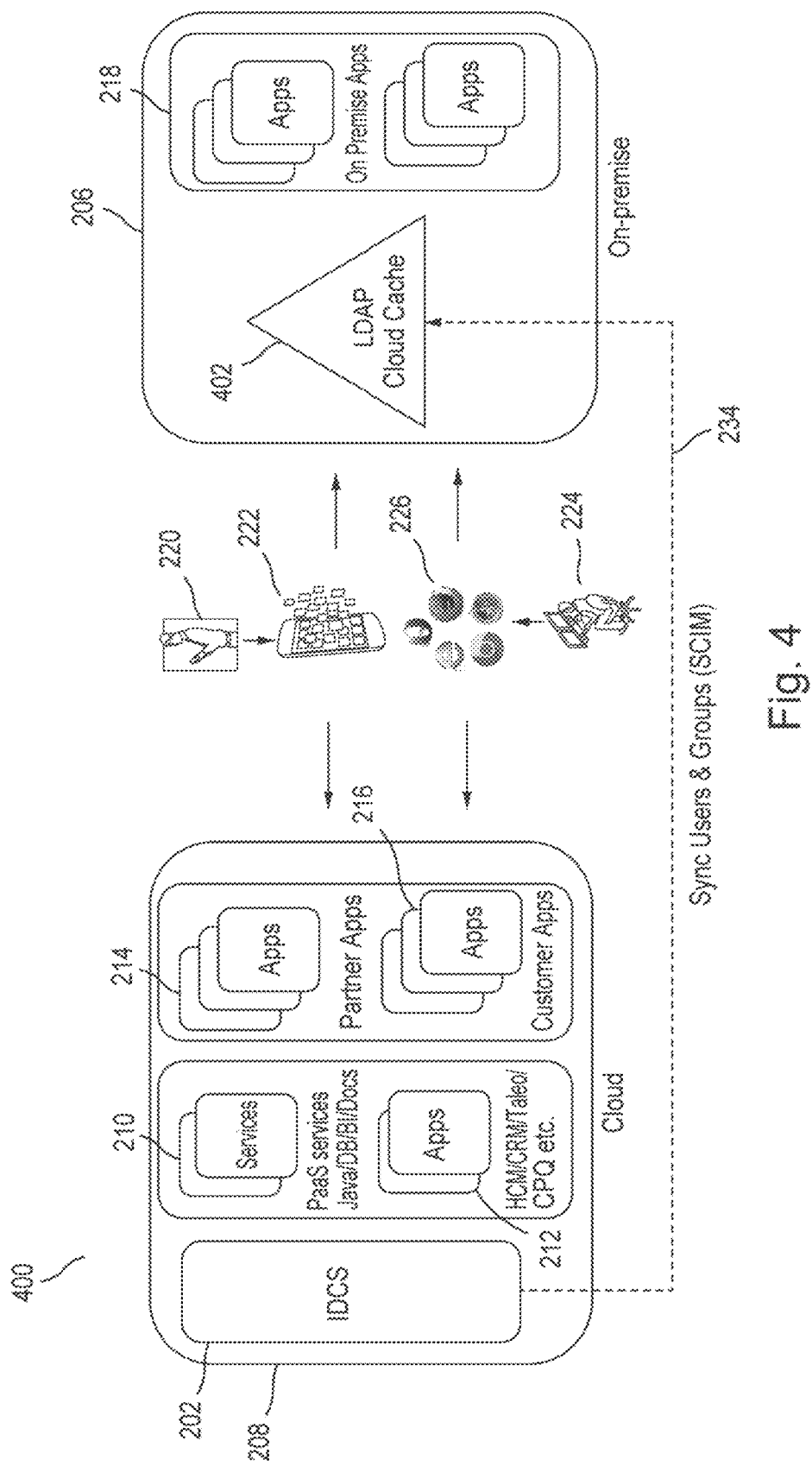

FIG. 4 is a block diagram 400 of an example embodiment that includes the same components 202, 206, 208, 210, 212, 214, 216, 218, 220, 222, 224, 226, 234 as in FIGS. 2 and 3. However, in the embodiment of FIG. 3, IDCS 202 provides functionality to extend cloud identities to on-premise applications 218. The embodiment provides seamless view of the identity across all applications including on-premise and third-party applications. In the embodiment of FIG. 4, SCIM identity bus 234 is used to synchronize data in IDCS 202 with on-premise LDAP data called "Cloud Cache" 402. Cloud Cache 402 is disclosed in more detail below.

Generally, an application that is configured to communicate based on LDAP needs an LDAP connection. An LDAP connection may not be established by such application through a URL (unlike, e.g., "www.google.com" that makes a connection to Google) since the LDAP needs to be on a local network. In the embodiment of FIG. 4, an LDAP-based application 218 makes a connection to Cloud Cache 402, and Cloud Cache 402 establishes a connection to IDCS 202 and then pulls data from IDCS 202 as it is being requested. The communication between IDCS 202 and Cloud Cache 402 may be implemented according to the SCIM protocol. For example, Cloud Cache 402 may use SCIM bus 234 to send a SCIM request to IDCS 202 and receive corresponding data in return.

Generally, fully implementing an application includes building a consumer portal, running marketing campaigns on the external user population, supporting web and mobile channels, and dealing with user authentication, sessions, user profiles, user groups, application roles, password policies, self-service/registration, social integration, identity federation, etc. Generally, application developers are not identity/security experts. Therefore, on-demand identity management services are desired.

Figure 5:
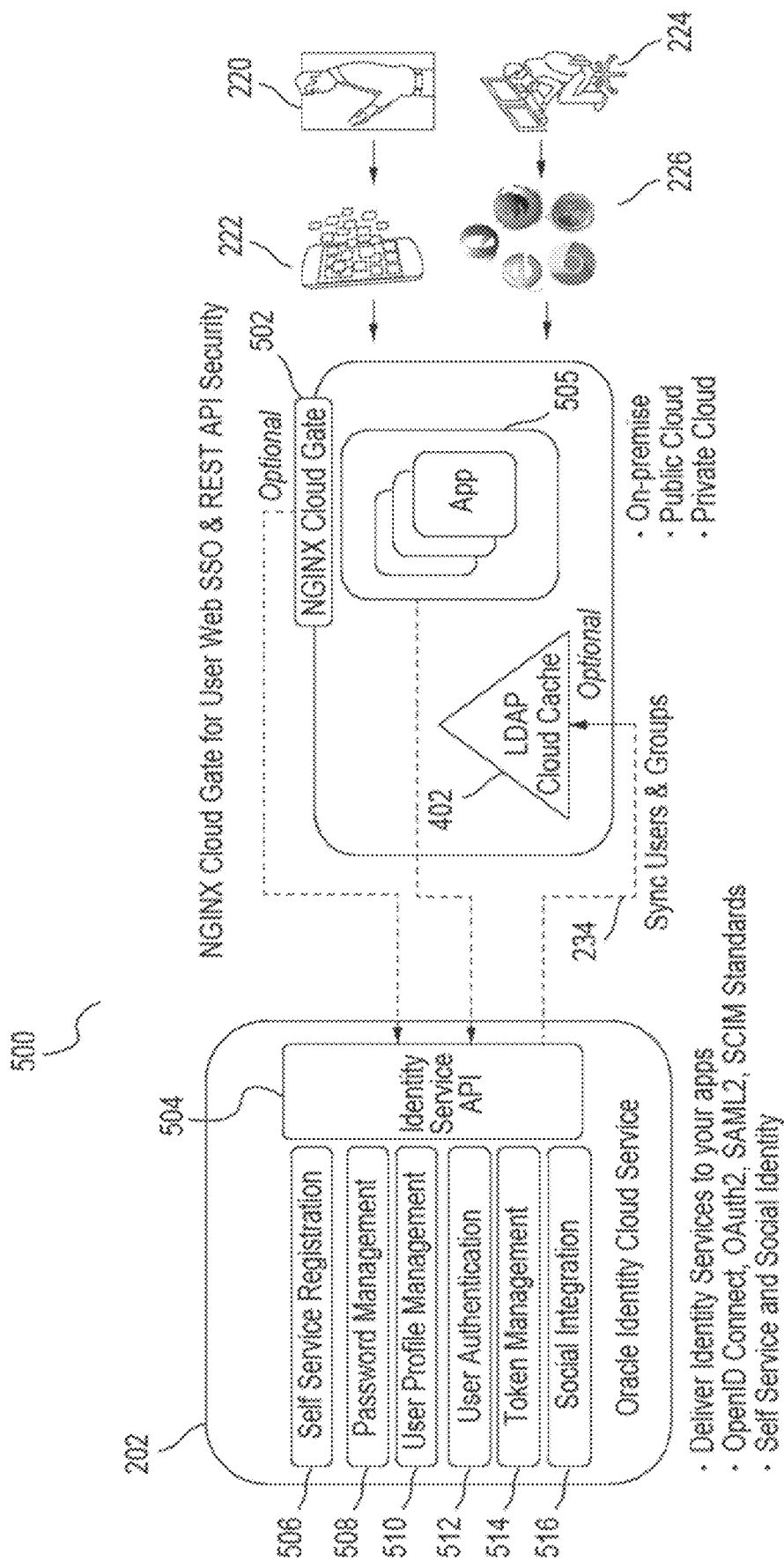

FIG. 5 is a block diagram 500 of an example embodiment that includes the same components 202, 220, 222, 224, 226, 234, 402, as in FIGS. 2-4. However, in the embodiment of FIG. 5, IDCS 202 provides secure identity management on demand. The embodiment provides on demand integration with identity services of IDCS 202 (e.g., based on standards such as OpenID Connect, OAuth2, SAML2, or SCIM). Applications 505 (which may be on-premise, in a public cloud, or in a private cloud) may call identity service APIs 504 in IDCS 202. The services provided by IDCS 202 may include, for example, self-service registration 506, password management 508, user profile management 510, user authentication 512, token management 514, social integration 516, etc.

In this embodiment, SCIM identity bus 234 is used to synchronize data in IDCS 202 with data in on-premise LDAP Cloud Cache 402. Further, a "Cloud Gate" 502 running on a web server/proxy (e.g., NGINX, Apache, etc.) may be used by applications 505 to obtain user web SSO and REST API security from IDCS 202. Cloud Gate 502 is a component that secures access to multi-tenant IDCS microservices by ensuring that client applications provide valid access tokens, and/or users successfully authenticate in order to establish SSO sessions. Cloud Gate 502 is further disclosed below. Cloud Gate 502 (enforcement point similar to webgate/webagent) enables applications running behind supported web servers to participate in SSO.

One embodiment provides SSO and cloud SSO functionality. A general point of entry for both on-premise IAM and IDCS in many organizations is SSO. Cloud SSO enables users to access multiple cloud resources with a single user sign-in. Often, organizations will want to federate their on-premise identities. Accordingly, embodiments utilize open standards to allow for integration with existing SSO to preserve and extend investment (e.g., until a complete, eventual transition to an identity cloud service approach is made).

One embodiment may provide the following functionalities:
  maintain an identity store to track user accounts, ownership, access, and permissions that have been authorized,
  integrate with workflow to facilitate various approvals (e.g., management, IT, human resources, legal, and compliance) needed for applications access,
  provision SaaS user accounts for selective devices (e.g., mobile and personal computer ("PC")) with access to user portal containing many private and public cloud resources, and
  facilitate periodic management attestation review for compliance with regulations and current job responsibilities.

In addition to these functions, embodiments may further provide:
  cloud account provisioning to manage account life cycle in cloud applications,
  more robust multifactor authentication ("MFA") integration,
  extensive mobile security capabilities, and
  dynamic authentication options.

One embodiment provides adaptive authentication and MFA. Generally, passwords and challenge questions have been seen as inadequate and susceptible to common attacks such as phishing. Most business entities today are looking at some form of MFA to reduce risk. To be successfully deployed, however, solutions need to be easily provisioned, maintained, and understood by the end user, as end users usually resist anything that interferes with their digital experience. Companies are looking for ways to securely incorporate bring your own device ("BYOD"), social identities, remote users, customers, and contractors, while making MFA an almost transparent component of a seamless user access experience. Within an MFA deployment, industry standards such as OAuth and OpenID Connect are essential to ensure integration of existing multifactor solutions and the incorporation of newer, adaptive authentication technology. Accordingly, embodiments define dynamic (or adaptive) authentication as the evaluation of available information (i.e., IP address, location, time of day, and biometrics) to prove an identity after a user session has been initiated. With the appropriate standards (e.g., open authentication ("OATH") and fast identity online ("FIDO")) integration and extensible identity management framework, embodiments provide MFA solutions that can be adopted, upgraded, and integrated easily within an IT organization as part of an end-to-end secure IAM deployment. When considering MFA and adaptive policies, organizations must implement consistent policies across on-premise and cloud resources, which in a hybrid IDCS and on-premise IAM environment requires integration between systems.

One embodiment provides user provisioning and certification. Generally, the fundamental function of an IAM solution is to enable and support the entire user provisioning life cycle. This includes providing users with the application access appropriate for their identity and role within the organization, certifying that they have the correct ongoing access permissions (e.g., as their role or the tasks or applications used within their role change over time), and promptly de-provisioning them as their departure from the organization may require. This is important not only for meeting various compliance requirements but also because inappropriate insider access is a major source of security breaches and attacks. An automated user provisioning capability within an identity cloud solution can be important not only in its own right but also as part of a hybrid IAM solution whereby IDCS provisioning may provide greater flexibility than an on-premise solution for transitions as a company downsizes, upsizes, merges, or looks to integrate existing systems with IaaS/PaaS/SaaS environments. An IDCS approach can save time and effort in one-off upgrades and ensure appropriate integration among necessary departments, divisions, and systems. The need to scale this technology often sneaks up on corporations, and the ability to deliver a scalable IDCS capability immediately across the enterprise can provide benefits in flexibility, cost, and control.

Generally, an employee is granted additional privileges (i.e., "privilege creep") over the years as her/his job changes. Companies that are lightly regulated generally lack an "attestation" process that requires managers to regularly audit their employees' privileges (e.g., access to networks, servers, applications, and data) to halt or slow the privilege creep that results in over-privileged accounts. Accordingly, one embodiment may provide a regularly conducted (at least once a year) attestation process. Further, with mergers and acquisitions, the need for these tools and services increases exponentially as users are on SaaS systems, on-premise, span different departments, and/or are being de-provisioned or re-allocated. The move to cloud can further complicate this situation, and the process can quickly escalate beyond existing, often manually managed, certification methods. Accordingly, one embodiment automates these functions and applies sophisticated analytics to user profiles, access history, provisioning/de-provisioning, and fine-grained entitlements.

One embodiment provides identity analytics. Generally, the ability to integrate identity analytics with the IAM engine for comprehensive certification and attestation can be critical to securing an organization's risk profile. Properly deployed identity analytics can demand total internal policy enforcement. Identity analytics that provide a unified single management view across cloud and on-premise are much needed in a proactive governance, risk, and compliance ("GRC") enterprise environment, and can aid in providing a closed-loop process for reducing risk and meeting compliance regulations. Accordingly, one embodiment provides identity analytics that are easily customizable by the client to accommodate specific industry demands and government regulations for reports and analysis required by managers, executives, and auditors.

One embodiment provides self-service and access request functionality to improve the experience and efficiency of the end user and to reduce costs from help desk calls. Generally, while a number of companies deploy on-premise self-service access request for their employees, many have not extended these systems adequately outside the formal corporate walls. Beyond employee use, a positive digital customer experience increases business credibility and ultimately contributes to revenue increase, and companies not only save on customer help desk calls and costs but also improve customer satisfaction. Accordingly, one embodiment provides an identity cloud service environment that is based on open standards and seamlessly integrates with existing access control software and MFA mechanisms when necessary. The SaaS delivery model saves time and effort formerly devoted to systems upgrades and maintenance, freeing professional IT staff to focus on more core business applications.

One embodiment provides privileged account management ("PAM"). Generally, every organization, whether using SaaS, PaaS, IaaS, or on-premise applications, is vulnerable to unauthorized privileged account abuse by insiders with super-user access credentials such as system administrators, executives, HR officers, contractors, systems integrators, etc. Moreover, outside threats typically first breach a low-level user account to eventually reach and exploit privileged user access controls within the enterprise system. Accordingly, one embodiment provides PAM to prevent such unauthorized insider account use. The main component of a PAM solution is a password vault which may be delivered in various ways, e.g., as software to be installed on an enterprise server, as a virtual appliance also on an enterprise server, as a packaged hardware/software appliance, or as part of a cloud service. PAM functionality is similar to a physical safe used to store passwords kept in an envelope and changed periodically, with a manifest for signing them in and out. One embodiment allows for a password checkout as well as setting time limits, forcing periodic changes, automatically tracking checkout, and reporting on all activities. One embodiment provides a way to connect directly through to a requested resource without the user ever knowing the password. This capability also paves the way for session management and additional functionality.

Generally, most cloud services utilize APIs and administrative interfaces, which provide opportunities for infiltrators to circumvent security. Accordingly, one embodiment accounts for these holes in PAM practices as the move to the cloud presents new challenges for PAM. Many small to medium sized businesses now administer their own SaaS systems (e.g., Office 365), while larger companies increasingly have individual business units spinning up their own SaaS and IaaS services. These customers find themselves with PAM capabilities within the identity cloud service solutions or from their IaaS/PaaS provider but with little experience in handling this responsibility. Moreover, in some cases, many different geographically dispersed business units are trying to segregate administrative responsibilities for the same SaaS applications. Accordingly, one embodiment allows customers in these situations to link existing PAM into the overall identity framework of the identity cloud service and move toward greater security and compliance with the assurance of scaling to cloud load requirements as business needs dictate.

API Platform

Embodiments provide an API platform that exposes a collection of capabilities as services. The APIs are aggregated into microservices and each microservice exposes one or more of the APIs. That is, each microservice may expose different types of APIs. In one embodiment, each microservice communicates only through its APIs. In one embodiment, each API may be a microservice. In one embodiment, multiple APIs are aggregated into a service based on a target capability to be provided by that service (e.g., OAuth, SAML, Admin, etc.). As a result, similar APIs are not exposed as separate runtime processes. The APIs are what is made available to a service consumer to use the services provided by IDCS.

Generally, in the web environment of IDCS, a URL includes three parts: a host, a microservice, and a resource (e.g., host/microservice/resource). In one embodiment, the microservice is characterized by having a specific URL prefix, e.g., "host/oauth/v1" where the actual microservice is "oauth/v1", and under "oauth/v1" there are multiple APIs, e.g., an API to request tokens: "host/oauth/v1/token", an API to authenticate a user: "host/oauth/v1/authorize", etc. That is, the URL implements a microservice, and the resource portion of the URL implements an API. Accordingly, multiple APIs are aggregated under the same microservice. In one embodiment, the host portion of the URL identifies a tenant (e.g., https://tenant3.identity.oraclecloud.com:/oauth/v1/token").

Configuring applications that integrate with external services with the necessary endpoints and keeping that configuration up to date is typically a challenge. To meet this challenge, embodiments expose a public discovery API at a well-known location from where applications can discover the information about IDCS they need in order to consume IDCS APIs. In one embodiment, two discovery documents are supported: IDCS Configuration (which includes IDCS, SAML, SCIM, OAuth, and OpenID Connect configuration, at e.g., <IDCS-URL>/.well-known/idcs-configuration), and Industry-standard OpenID Connect Configuration (at, e.g., <IDCS-URL>/.well-known/openid-configuration). Applications can retrieve discovery documents by being configured with a single IDCS URL.

Figure 6:
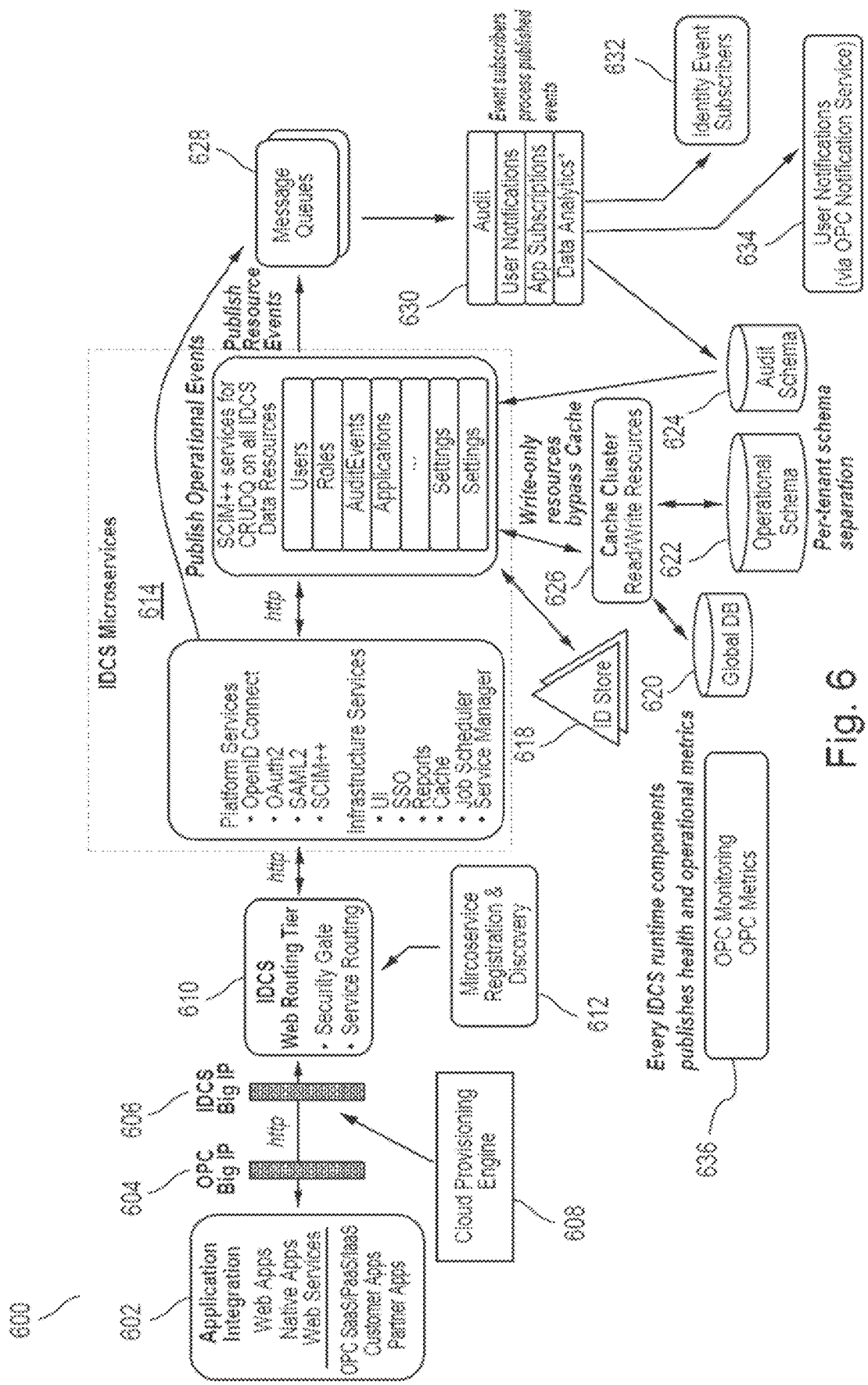
FIG. 6 is a block diagram providing a system view of an embodiment.

FIG. 6 is a block diagram providing a system view 600 of IDCS in one embodiment. In FIG. 6, any one of a variety of applications/services 602 may make HTTP calls to IDCS APIs to use IDCS services. Examples of such applications/services 602 are web applications, native applications (e.g., applications that are built to run on a specific operating system, such as Windows applications, iOS applications, Android applications, etc.), web services, customer applications, partner applications, or any services provided by a public cloud, such as Software as a Service ("SaaS"), PaaS, and Infrastructure as a Service ("IaaS").

In one embodiment, the HTTP requests of applications/services 602 that require IDCS services go through an Oracle Public Cloud BIG-IP appliance 604 and an IDCS BIG-IP appliance 606 (or similar technologies such as a Load Balancer, or a component called a Cloud Load Balancer as a Service ("LBaaS") that implements appropriate security rules to protect the traffic). However, the requests can be received in any manner. At IDCS BIG-IP appliance 606 (or, as applicable, a similar technology such as a Load Balancer or a Cloud LBaaS), a cloud provisioning engine 608 performs tenant and service orchestration. In one embodiment, cloud provisioning engine 608 manages internal security artifacts associated with a new tenant being on-boarded into the cloud or a new service instance purchased by a customer.

The HTTP requests are then received by an IDCS web routing tier 610 that implements a security gate (i.e., Cloud Gate) and provides service routing and microservices registration and discovery 612. Depending on the service requested, the HTTP request is forwarded to an IDCS microservice in the IDCS middle tier 614. IDCS microservices process external and internal HTTP requests. IDCS microservices implement platform services and infrastructure services. IDCS platform services are separately deployed Java-based runtime services implementing the business of IDCS. IDCS infrastructure services are separately deployed runtime services providing infrastructure support for IDCS. IDCS further includes infrastructure libraries that are common code packaged as shared libraries used by IDCS services and shared libraries. Infrastructure services and libraries provide supporting capabilities as required by platform services for implementing their functionality.

Platform Services

In one embodiment, IDCS supports standard authentication protocols, hence IDCS microservices include platform services such as OpenID Connect, OAuth, SAML2, System for Cross-domain Identity Management++ ("SCIM++"), etc.

The OpenID Connect platform service implements standard OpenID Connect Login/Logout flows. Interactive web-based and native applications leverage standard browser-based OpenID Connect flow to request user authentication, receiving standard identity tokens that are JavaScript Object Notation ("JSON") Web Tokens ("JWTs") conveying the user's authenticated identity. Internally, the runtime authentication model is stateless, maintaining the user's authentication/session state in the form of a host HTTP cookie (including the JWT identity token). The authentication interaction initiated via the OpenID Connect protocol is delegated to a trusted SSO service that implements the user login/logout ceremonies for local and federated logins. Further details of this functionality are disclosed below with reference to FIGS. 10 and 11. In one embodiment, OpenID Connect functionality is implemented according to, for example, OpenID Foundation standards.

The OAuth2 platform service provides token authorization services. It provides a rich API infrastructure for creating and validating access tokens conveying user rights to make API calls. It supports a range of useful token grant types, enabling customers to securely connect clients to their services. It implements standard 2-legged and 3-legged OAuth2 token grant types. Support for OpenID Connect ("OIDC") enables compliant applications (OIDC relaying parties ("RP"s)) to integrate with IDCS as the identity provider (OIDC OpenID provider ("OP")). Similarly, the integration of IDCS as OIDC RP with social OIDC OP (e.g., Facebook, Google, etc.) enables customers to allow social identities policy-based access to applications. In one embodiment, OAuth functionality is implemented according to, for example, Internet Engineering Task Force ("IETF"), Request for Comments ("RFC") 6749.

The SAML2 platform service provides identity federation services. It enables customers to set up federation agreements with their partners based on SAML identity provider ("IDP") and SAML service provider ("SP") relationship models. In one embodiment, the SAML2 platform service implements standard SAML2 Browser POST Login and Logout Profiles. In one embodiment, SAML functionality is implemented according to, for example, IETF, RFC 7522.

SCIM is an open standard for automating the exchange of user identity information between identity domains or information technology ("IT") systems, as provided by, e.g., IETF, RFCs 7642, 7643, 7644. The SCIM++ platform service provides identity administration services and enables customers to access IDP features of IDCS. The administration services expose a set of stateless REST interfaces (i.e., APIs) that cover identity lifecycle, password management, group management, etc., exposing such artifacts as web-accessible resources.

All IDCS configuration artifacts are resources, and the APIs of the administration services allow for managing IDCS resources (e.g., users, roles, password policies, applications, SAML/OIDC identity providers, SAML service providers, keys, certifications, notification templates, etc.). Administration services leverage and extend the SCIM standard to implement schema-based REST APIs for Create, Read, Update, Delete, and Query ("CRUDQ") operations on all IDCS resources. Additionally, all internal resources of IDCS used for administration and configuration of IDCS itself are exposed as SCIM-based REST APIs. Access to the identity store 618 is isolated to the SCIM++ API.

In one embodiment, for example, the SCIM standard is implemented to manage the users and groups resources as defined by the SCIM specifications, while SCIM++ is configured to support additional IDCS internal resources (e.g., password policies, roles, settings, etc.) using the language defined by the SCIM standard.

The Administration service supports the SCIM 2.0 standard endpoints with the standard SCIM 2.0 core schemas and schema extensions where needed. In addition, the Administration service supports several SCIM 2.0 compliant endpoint extensions to manage other IDCS resources, for example, Users, Groups, Applications, Settings, etc. The Administration service also supports a set of remote procedure call-style ("RPC-style") REST interfaces that do not perform CRUDQ operations but instead provide a functional service, for example, "UserPasswordGenerator," "UserPasswordValidator," etc.

IDCS Administration APIs use the OAuth2 protocol for authentication and authorization. IDCS supports common OAuth2 scenarios such as scenarios for web server, mobile, and JavaScript applications. Access to IDCS APIs is protected by access tokens. To access IDCS Administration APIs, an application needs to be registered as an OAuth2 client or an IDCS Application (in which case the OAuth2 client is created automatically) through the IDCS Administration console and be granted desired IDCS Administration Roles. When making IDCS Administration API calls, the application first requests an access token from the IDCS OAuth2 Service. After acquiring the token, the application sends the access token to the IDCS API by including it in the HTTP authorization header. Applications can use IDCS Administration REST APIs directly, or use an IDCS Java Client API Library.

Infrastructure Services

The IDCS infrastructure services support the functionality of IDCS platform services. These runtime services include an event processing service (for asynchronously processing user notifications, application subscriptions, and auditing to database); a job scheduler service (for scheduling and executing jobs, e.g., executing immediately or at a configured time long-running tasks that do not require user intervention); a cache management service; a storage management service (for integrating with a public cloud storage service); a reports service (for generating reports and dashboards); an SSO service (for managing internal user authentication and SSO); a user interface ("UI") service (for hosting different types of UI clients); and a service manager service. Service manager is an internal interface between the Oracle Public Cloud and IDCS. Service manager manages commands issued by the Oracle Public Cloud, where the commands need to be implemented by IDCS. For example, when a customer signs up for an account in a cloud store before they can buy something, the cloud sends a request to IDCS asking to create a tenant. In this case, service manager implements the cloud specific operations that the cloud expects IDCS to support.

An IDCS microservice may call another IDCS microservice through a network interface (i.e., an HTTP request).

In one embodiment, IDCS may also provide a schema service (or a persistence service) that allows for using a database schema. A schema service allows for delegating the responsibility of managing database schemas to IDCS. Accordingly, a user of IDCS does not need to manage a database since there is an IDCS service that provides that functionality. For example, the user may use the database to persist schemas on a per tenant basis, and when there is no more space in the database, the schema service will manage the functionality of obtaining another database and growing the space so that the users do not have to manage the database themselves.

IDCS further includes data stores which are data repositories required/generated by IDCS, including an identity store 618 (storing users, groups, etc.), a global database 620 (storing configuration data used by IDCS to configure itself), an operational schema 622 (providing per tenant schema separation and storing customer data on a per customer basis), an audit schema 624 (storing audit data), a caching cluster 626 (storing cached objects to speed up performance), etc. All internal and external IDCS consumers integrate with the identity services over standards-based protocols. This enables use of a domain name system ("DNS") to resolve where to route requests, and decouples consuming applications from understanding the internal implementation of identity services.

Real-Time and Near-Real-Time Tasks

IDCS separates the tasks of a requested service into synchronous real-time and asynchronous near-real-time tasks, where real-time tasks include only the operations that are needed for the user to proceed. In one embodiment, a real-time task is a task that is performed with minimal delay, and a near-real-time task is a task that is performed in the background without the user having to wait for it. In one embodiment, a real-time task is a task that is performed with substantially no delay or with negligible delay, and appears to a user as being performed almost instantaneously.

The real-time tasks perform the main business functionality of a specific identity service. For example, when requesting a login service, an application sends a message to authenticate a user's credentials and get a session cookie in return. What the user experiences is logging into the system. However, several other tasks may be performed in connection with the user's logging in, such as validating who the user is, auditing, sending notifications, etc. Accordingly, validating the credentials is a task that is performed in real-time so that the user is given an HTTP cookie to start a session, but the tasks related to notifications (e.g., sending an email to notify the creation of an account), audits (e.g., tracking/recording), etc., are near-real-time tasks that can be performed asynchronously so that the user can proceed with least delay.

When an HTTP request for a microservice is received, the corresponding real-time tasks are performed by the microservice in the middle tier, and the remaining near-real-time tasks such as operational logic/events that are not necessarily subject to real-time processing are offloaded to message queues 628 that support a highly scalable asynchronous event management system 630 with guaranteed delivery and processing. Accordingly, certain behaviors are pushed from the front end to the backend to enable IDCS to provide high level service to the customers by reducing latencies in response times. For example, a login process may include validation of credentials, submission of a log report, updating of the last login time, etc., but these tasks can be offloaded to a message queue and performed in near-real-time as opposed to real-time.

In one example, a system may need to register or create a new user. The system calls an IDCS SCIM API to create a user. The end result is that when the user is created in identity store 618, the user gets a notification email including a link to reset their password. When IDCS receives a request to register or create a new user, the corresponding microservice looks at configuration data in the operational database (located in global database 620 in FIG. 6) and determines that the "create user" operation is marked with a "create user" event which is identified in the configuration data as an asynchronous operation. The microservice returns to the client and indicates that the creation of the user is done successfully, but the actual sending of the notification email is postponed and pushed to the backend. In order to do so, the microservice uses a messaging API 616 to queue the message in queue 628 which is a store.

In order to dequeue queue 628, a messaging microservice, which is an infrastructure microservice, continually runs in the background and scans queue 628 looking for events in queue 628. The events in queue 628 are processed by event subscribers 630 such as audit, user notification, application subscriptions, data analytics, etc. Depending on the task indicated by an event, event subscribers 630 may communicate with, for example, audit schema 624, a user notification service 634, an identity event subscriber 632, etc. For example, when the messaging microservice finds the "create user" event in queue 628, it executes the corresponding notification logic and sends the corresponding email to the user.

In one embodiment, queue 628 queues operational events published by microservices 614 as well as resource events published by APIs 616 that manage IDCS resources.

IDCS uses a real-time caching structure to enhance system performance and user experience. The cache itself may also be provided as a microservice. IDCS implements an elastic cache cluster 626 that grows as the number of customers supported by IDCS scales. Cache cluster 626 may be implemented with a distributed data grid which is disclosed in more detail below. In one embodiment, write-only resources bypass cache.

In one embodiment, IDCS runtime components publish health and operational metrics to a public cloud monitoring module 636 that collects such metrics of a public cloud such as Oracle Public Cloud from Oracle Corp.

In one embodiment, IDCS may be used to create a user. For example, a client application 602 may issue a REST API call to create a user. Admin service (a platform service in 614 shown as SCIM++ services for CRUDQ) delegates the call to a user manager (an infrastructure library/service in 614), which in turn creates the user in the tenant-specific ID store stripe in ID store 618. On "User Create Success", the user manager audits the operation to the audit table in audit schema 624, and publishes an "identity.user.create.success" event to message queue 628. Identity subscriber 632 picks up the event and sends a "Welcome" email to the newly created user, including newly created login details.

In one embodiment, IDCS may be used to grant a role to a user, resulting in a user provisioning action. For example, a client application 602 may issue a REST API call to grant a user a role. Admin service (a platform service in 614) delegates the call to a role manager (an infrastructure library/service in 614), who grants the user a role in the tenant-specific ID store stripe in ID store 618. On "Role Grant Success", the role manager audits the operations to the audit table in audit schema 624, and publishes an "identity.user.role.grant.success" event to message queue 628. Identity subscriber 632 picks up the event and evaluates the provisioning grant policy. If there is an active application grant on the role being granted, a provisioning subscriber performs some validation, initiates account creation, calls out the target system, creates an account on the target system, and marks the account creation as successful. Each of these functionalities may result in publishing of corresponding events, such as "prov.account.create.initiate", "prov.target.create.initiate", "prov.target.create.success", or "prov.account.create.success". These events may have their own business metrics aggregating number of accounts created in the target system over the last N days.

In one embodiment, IDCS may be used for a user to log in. For example, a client application 602 may use one of the supported authentication flows to request a login for a user. IDCS authenticates the user, and upon success, audits the operation to the audit table in audit schema 624. Upon failure, IDCS audits the failure in audit schema 624, and publishes "login.user.login.failure" event in message queue 628. A login subscriber picks up the event, updates its metrics for the user, and determines if additional analytics on the user's access history need to be performed.

Accordingly, by implementing "inversion of control" functionality (e.g., changing the flow of execution to schedule the execution of an operation at a later time so that the operation is under the control of another system), embodiments enable additional event queues and subscribers to be added dynamically to test new features on a small user sample before deploying to broader user base, or to process specific events for specific internal or external customers.

Stateless Functionality

IDCS microservices are stateless, meaning the microservices themselves do not maintain state. "State" refers to the data that an application uses in order to perform its capabilities. IDCS provides multi-tenant functionality by persisting all state into tenant specific repositories in the IDCS data tier. The middle tier (i.e., the code that processes the requests) does not have data stored in the same location as the application code. Accordingly, IDCS is highly scalable, both horizontally and vertically.

To scale vertically (or scale up/down) means to add resources to (or remove resources from) a single node in a system, typically involving the addition of CPUs or memory to a single computer. Vertical scalability allows an application to scale up to the limits of its hardware. To scale horizontally (or scale out/in) means to add more nodes to (or remove nodes from) a system, such as adding a new computer to a distributed software application. Horizontal scalability allows an application to scale almost infinitely, bound only by the amount of bandwidth provided by the network.

Stateless-ness of the middle tier of IDCS makes it horizontally scalable just by adding more CPUs, and the IDCS components that perform the work of the application do not need to have a designated physical infrastructure where a particular application is running. Stateless-ness of the IDCS middle tier makes IDCS highly available, even when providing identity services to a very large number of customers/tenants. Each pass through an IDCS application/service is focused on CPU usage only to perform the application transaction itself but not use hardware to store data. Scaling is accomplished by adding more slices when the application is running, while data for the transaction is stored at a persistence layer where more copies can be added when needed.

The IDCS web tier, middle tier, and data tier can each scale independently and separately. The web tier can be scaled to handle more HTTP requests. The middle tier can be scaled to support more service functionality. The data tier can be scaled to support more tenants.

IDCS Functional View

Figure 6A:
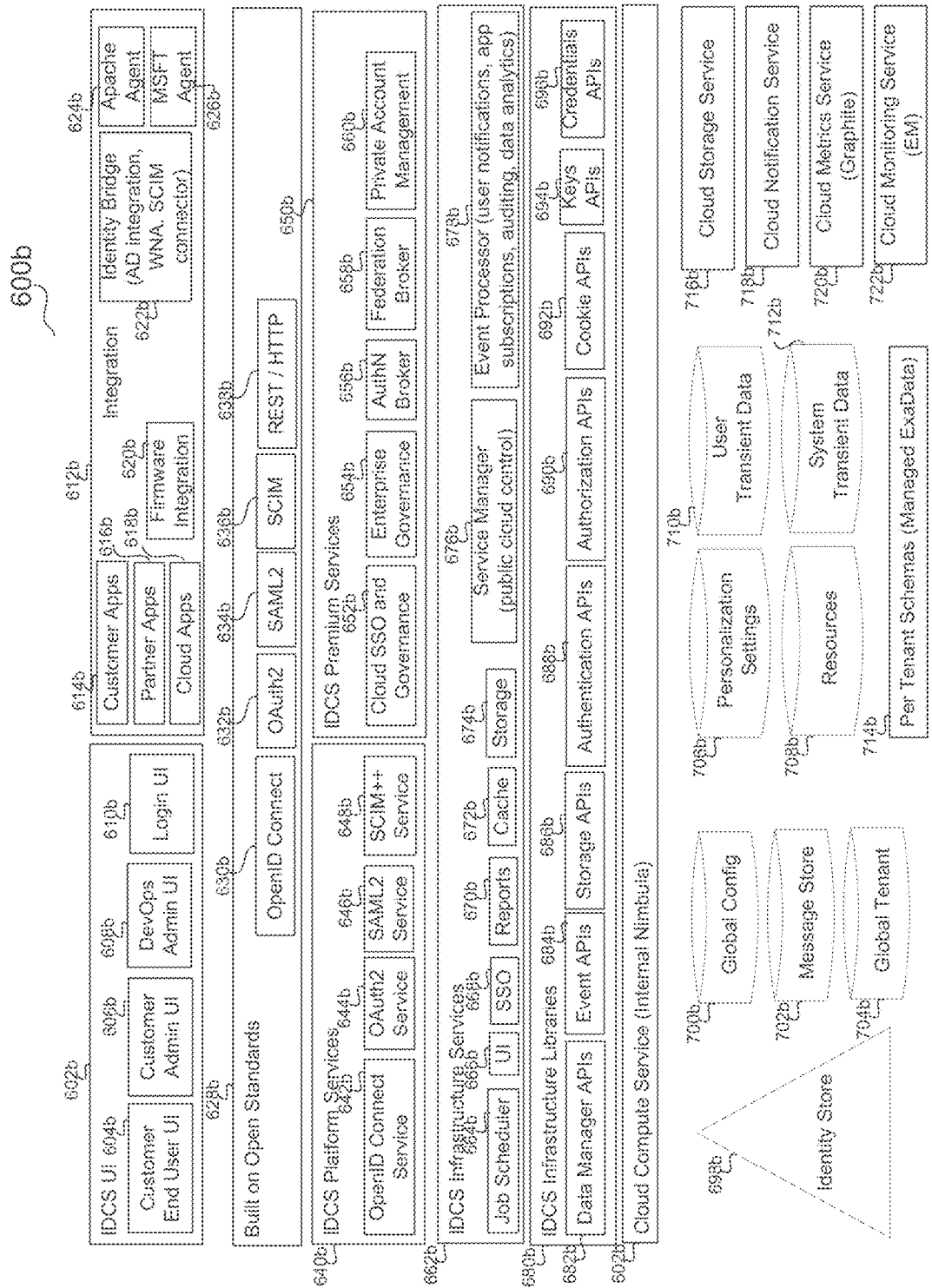
FIG. 6A is a block diagram providing a functional view of an embodiment.

FIG. 6A is an example block diagram 600b of a functional view of IDCS in one embodiment. In block diagram 600b, the IDCS functional stack includes services, shared libraries, and data stores. The services include IDCS platform services 640b, IDCS premium services 650b, and IDCS infrastructure services 662b. In one embodiment, IDCS platform services 640b and IDCS premium services 650b are separately deployed Java-based runtime services implementing the business of IDCS, and IDCS infrastructure services 662b are separately deployed runtime services providing infrastructure support for IDCS. The shared libraries include IDCS infrastructure libraries 680b which are common code packaged as shared libraries used by IDCS services and shared libraries. The data stores are data repositories required/generated by IDCS, including identity store 698b, global configuration 700b, message store 702b, global tenant 704b, personalization settings 706b, resources 708b, user transient data 710b, system transient data 712b, per-tenant schemas (managed ExaData) 714b, operational store (not shown), caching store (not shown), etc.

In one embodiment, IDCS platform services 640b include, for example, OpenID Connect service 642b, OAuth2 service 644b, SAML2 service 646b, and SCIM++ service 648b. In one embodiment, IDCS premium services include, for example, cloud SSO and governance 652b, enterprise governance 654b, AuthN broker 656b, federation broker 658b, and private account management 660b.

IDCS infrastructure services 662b and IDCS infrastructure libraries 680b provide supporting capabilities as required by IDCS platform services 640b to do their work. In one embodiment, IDCS infrastructure services 662b include job scheduler 664b, UI 666b, SSO 668b, reports 670b, cache 672b, storage 674b, service manager 676b (public cloud control), and event processor 678b (user notifications, app subscriptions, auditing, data analytics). In one embodiment, IDCS infrastructure libraries 680b include data manager APIs 682b, event APIs 684b, storage APIs 686b, authentication APIs 688b, authorization APIs 690b, cookie APIs 692b, keys APIs 694b, and credentials APIs 696b. In one embodiment, cloud compute service 602b (internal Nimbula) supports the function of IDCS infrastructure services 662b and IDCS infrastructure libraries 680b.

In one embodiment, IDCS provides various UIs 602b for a consumer of IDCS services, such as customer end user UI 604b, customer admin UI 606b, DevOps admin UI 608b, and login UI 610b. In one embodiment, IDCS allows for integration 612b of applications (e.g., customer apps 614b, partner apps 616b, and cloud apps 618b) and firmware integration 620b. In one embodiment, various environments may integrate with IDCS to support their access control needs. Such integration may be provided by, for example, identity bridge 622b (providing AD integration, WNA, and SCIM connector), Apache agent 624b, or MSFT agent 626b.

In one embodiment, internal and external IDCS consumers integrate with the identity services of IDCS over standards-based protocols 628b, such as OpenID Connect 630b, OAuth2 632b, SAML2 634b, SCIM 636b, and REST/HTTP 638b. This enables use of a domain name system ("DNS") to resolve where to route requests, and decouples the consuming applications from understanding internal implementation of the identity services.

The IDCS functional view in FIG. 6A further includes public cloud infrastructure services that provide common functionality that IDCS depends on for user notifications (cloud notification service 718b), file storage (cloud storage service 716b), and metrics/alerting for DevOps (cloud monitoring service (EM) 722b and cloud metrics service (Graphite) 720b).

Cloud Gate

In one embodiment, IDCS implements a "Cloud Gate" in the web tier. Cloud Gate is a web server plugin that enables web applications to externalize user SSO to an identity management system (e.g., IDCS), similar to WebGate or WebAgent technologies that work with enterprise IDM stacks. Cloud Gate acts as a security gatekeeper that secures access to IDCS APIs. In one embodiment, Cloud Gate is implemented by a web/proxy server plugin that provides a web Policy Enforcement Point ("PEP") for protecting HTTP resources based on OAuth.

Figure 7:
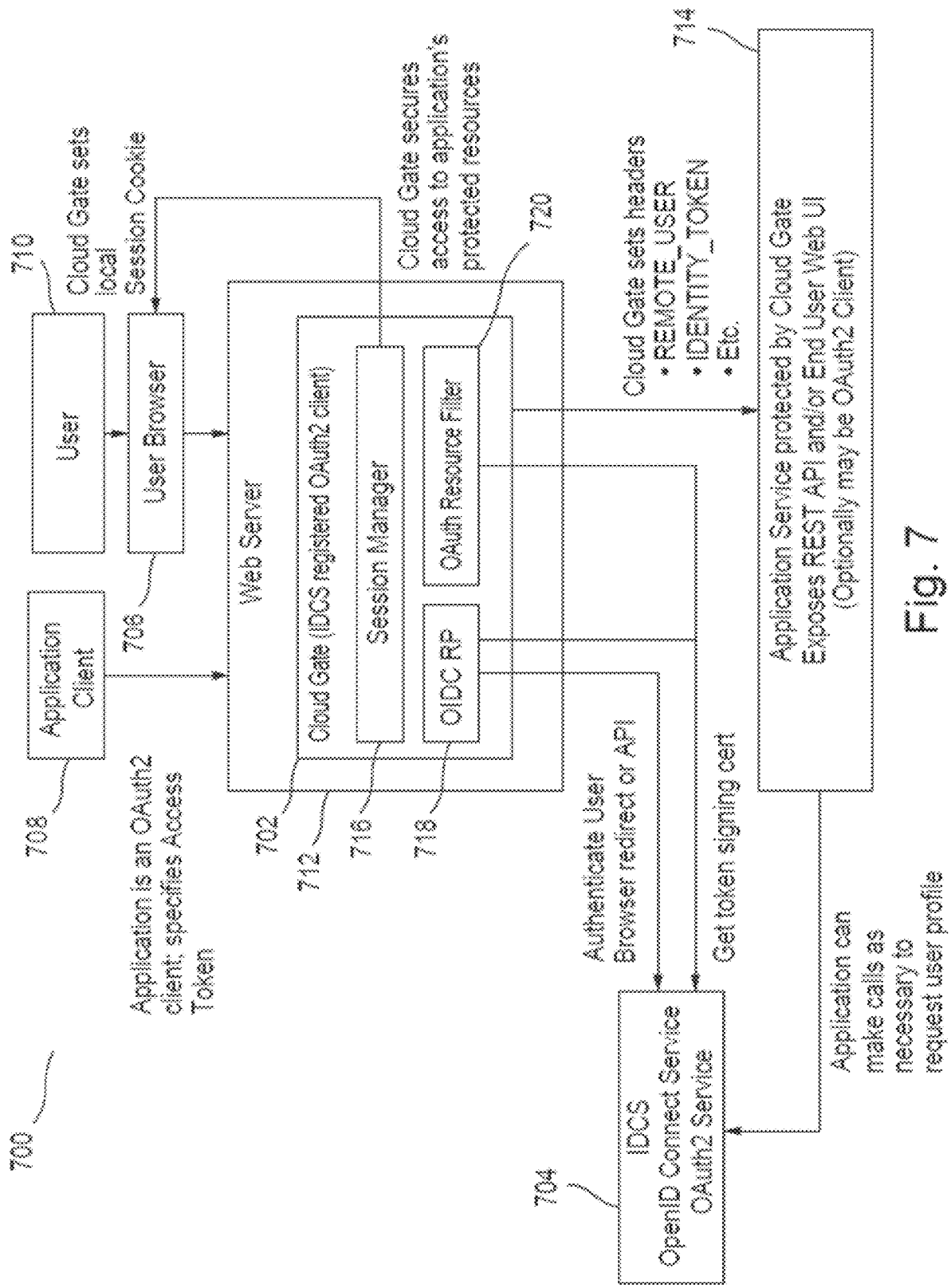
FIG. 7 is a block diagram of an embodiment that implements Cloud Gate.

FIG. 7 is a block diagram 700 of an embodiment that implements a Cloud Gate 702 running in a web server 712 and acting as a Policy Enforcement Point ("PEP") configured to integrate with IDCS Policy Decision Point ("PDP") using open standards (e.g., OAuth2, OpenID Connect, etc.) while securing access to web browser and REST API resources 714 of an application. In some embodiments, the PDP is implemented at OAuth and/or OpenID Connect microservices 704. For example, when a user browser 706 sends a request to IDCS for a login of a user 710, a corresponding IDCS PDP validates the credentials and then decides whether the credentials are sufficient (e.g., whether to request for further credentials such as a second password). In the embodiment of FIG. 7, Cloud Gate 702 may act both as the PEP and as the PDP since it has a local policy.

As part of one-time deployment, Cloud Gate 702 is registered with IDCS as an OAuth2 client, enabling it to request OIDC and OAuth2 operations against IDCS. Thereafter, it maintains configuration information about an application's protected and unprotected resources, subject to request matching rules (how to match URLs, e.g., with wild cards, regular expressions, etc.). Cloud Gate 702 can be deployed to protect different applications having different security policies, and the protected applications can be multi-tenant.

During web browser-based user access, Cloud Gate 702 acts as an OIDC RP 718 initiating a user authentication flow. If user 710 has no valid local user session, Cloud Gate 702 re-directs the user to the SSO microservice and participates in the OIDC "Authorization Code" flow with the SSO microservice. The flow concludes with the delivery of a JWT as an identity token. Cloud Gate 708 validates the JWT (e.g., looks at signature, expiration, destination/audience, etc.) and issues a local session cookie for user 710. It acts as a session manager 716 securing web browser access to protected resources and issuing, updating, and validating the local session cookie. It also provides a logout URL for removal of its local session cookie.

Cloud Gate 702 also acts as an HTTP Basic Auth authenticator, validating HTTP Basic Auth credentials against IDCS. This behavior is supported in both session-less and session-based (local session cookie) modes. No server-side IDCS session is created in this case.

During programmatic access by REST API clients 708, Cloud Gate 702 may act as an OAuth2 resource server/filter 720 for an application's protected REST APIs 714. It checks for the presence of a request with an authorization header and an access token. When client 708 (e.g., mobile, web apps, JavaScript, etc.) presents an access token (issued by IDCS) to use with a protected REST API 714, Cloud Gate 702 validates the access token before allowing access to the API (e.g., signature, expiration, audience, etc.). The original access token is passed along unmodified.

Generally, OAuth is used to generate either a client identity propagation token (e.g., indicating who the client is) or a user identity propagation token (e.g., indicating who the user is). In the embodiments, the implementation of OAuth in Cloud Gate is based on a JWT which defines a format for web tokens, as provided by, e.g., IETF, RFC 7519.

When a user logs in, a JWT is issued. The JWT is signed by IDCS and supports multi-tenant functionality in IDCS. Cloud Gate validates the JWT issued by IDCS to allow for multi-tenant functionality in IDCS. Accordingly, IDCS provides multi-tenancy in the physical structure as well as in the logical business process that underpins the security model.

Tenancy Types

IDCS specifies three types of tenancies: customer tenancy, client tenancy, and user tenancy. Customer or resource tenancy specifies who the customer of IDCS is (i.e., for whom is the work being performed). Client tenancy specifies which client application is trying to access data (i.e., what application is doing the work). User tenancy specifies which user is using the application to access data (i.e., by whom is the work being performed). For example, when a professional services company provides system integration functionality for a warehouse club and uses IDCS for providing identity management for the warehouse club systems, user tenancy corresponds to the professional services company, client tenancy is the application that is used to provide system integration functionality, and customer tenancy is the warehouse club.

Separation and identification of these three tenancies enables multi-tenant functionality in a cloud-based service. Generally, for on-premise software that is installed on a physical machine on-premise, there is no need to specify three different tenancies since a user needs to be physically on the machine to log in. However, in a cloud-based service structure, embodiments use tokens to determine who is using what application to access which resources. The three tenancies are codified by tokens, enforced by Cloud Gate, and used by the business services in the middle tier. In one embodiment, an OAuth server generates the tokens. In various embodiments, the tokens may be used in conjunction with any security protocol other than OAuth.

Decoupling user, client, and resource tenancies provides substantial business advantages for the users of the services provided by IDCS. For example, it allows a service provider that understands the needs of a business (e.g., a healthcare business) and their identity management problems to buy services provided by IDCS, develop their own backend application that consumes the services of IDCS, and provide the backend applications to the target businesses. Accordingly, the service provider may extend the services of IDCS to provide their desired capabilities and offer those to certain target businesses. The service provider does not have to build and run software to provide identity services but can instead extend and customize the services of IDCS to suit the needs of the target businesses.

Some known systems only account for a single tenancy which is customer tenancy. However, such systems are inadequate when dealing with access by a combination of users such as customer users, customer's partners, customer's clients, clients themselves, or clients that customer has delegated access to. Defining and enforcing multiple tenancies in the embodiments facilitates the identity management functionality over such variety of users.

In one embodiment, one entity of IDCS does not belong to multiple tenants at the same time; it belongs to only one tenant, and a "tenancy" is where artifacts live. Generally, there are multiple components that implement certain functions, and these components can belong to tenants or they can belong to infrastructure. When infrastructure needs to act on behalf of tenants, it interacts with an entity service on behalf of the tenant. In that case, infrastructure itself has its own tenancy and customer has its own tenancy. When a request is submitted, there can be multiple tenancies involved in the request.

For example, a client that belongs to "tenant 1" may execute a request to get a token for "tenant 2" specifying a user in "tenant 3." As another example, a user living in "tenant 1" may need to perform an action in an application owned by "tenant 2". Thus, the user needs to go to the resource namespace of "tenant 2" and request a token for themselves. Accordingly, delegation of authority is accomplished by identifying "who" can do "what" to "whom." As yet another example, a first user working for a first organization ("tenant 1") may allow a second user working for a second organization ("tenant 2") to have access to a document hosted by a third organization ("tenant 3").

In one example, a client in "tenant 1" may request an access token for a user in "tenant 2" to access an application in "tenant 3". The client may do so by invoking an OAuth request for the token by going to "http://tenant3/oauth/token". The client identifies itself as a client that lives in "tenant 1" by including a "client assertion" in the request. The client assertion includes a client ID (e.g., "client 1") and the client tenancy "tenant 1". As "client 1" in "tenant 1", the client has the right to invoke a request for a token on "tenant 3", and the client wants the token for a user in "tenant 2". Accordingly, a "user assertion" is also passed as part of the same HTTP request. The access token that is generated will be issued in the context of the target tenancy which is the application tenancy ("tenant 3") and will include the user tenancy ("tenant 2").

Figure 8:
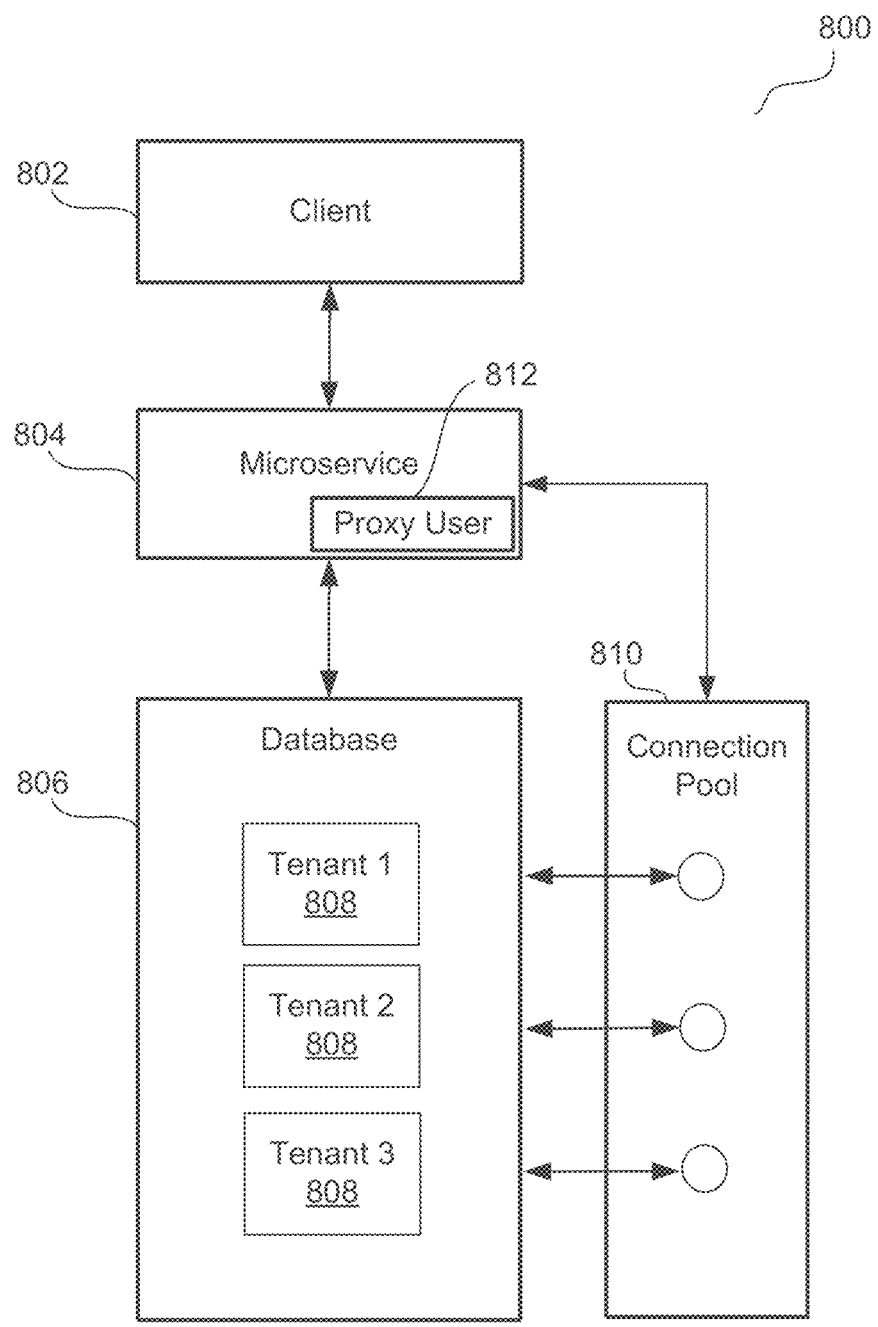
FIG. 8 illustrates an example system that implements multiple tenancies in one embodiment.

In one embodiment, in the data tier, each tenant is implemented as a separate stripe. From a data management perspective, artifacts live in a tenant. From a service perspective, a service knows how to work with different tenants, and the multiple tenancies are different dimensions in the business function of a service. FIG. 8 illustrates an example system 800 implementing multiple tenancies in an embodiment. System 800 includes a client 802 that requests a service provided by a microservice 804 that understands how to work with data in a database 806. The database includes multiple tenants 808 and each tenant includes the artifacts of the corresponding tenancy. In one embodiment, microservice 804 is an OAuth microservice requested through https://tenant3/oauth/token for getting a token. The function of the OAuth microservice is performed in microservice 804 using data from database 806 to verify that the request of client 802 is legitimate, and if it is legitimate, use the data from different tenancies 808 to construct the token. Accordingly, system 800 is multi-tenant in that it can work in a cross-tenant environment by not only supporting services coming into each tenancy, but also supporting services that can act on behalf of different tenants.

System 800 is advantageous since microservice 804 is physically decoupled from the data in database 806, and by replicating the data across locations that are closer to the client, microservice 804 can be provided as a local service to the clients and system 800 can manage the availability of the service and provide it globally.

In one embodiment, microservice 804 is stateless, meaning that the machine that runs microservice 804 does not maintain any markers pointing the service to any specific tenants. Instead, a tenancy may be marked, for example, on the host portion of a URL of a request that comes in. That tenancy points to one of tenants 808 in database 806. When supporting a large number of tenants (e.g., millions of tenants), microservice 804 cannot have the same number of connections to database 806, but instead uses a connection pool 810 which provides the actual physical connections to database 806 in the context of a database user.

Generally, connections are built by supplying an underlying driver or provider with a connection string, which is used to address a specific database or server and to provide instance and user authentication credentials (e.g., "Server=sql_box;Database=Common;User ID=uid; Pwd=password;"). Once a connection has been built, it can be opened and closed, and properties (e.g., the command time-out length, or transaction, if one exists) can be set. The connection string includes a set of key-value pairs, dictated by the data access interface of the data provider. A connection pool is a cache of database connections maintained so that the connections can be reused when future requests to a database are required. In connection pooling, after a connection is created, it is placed in the pool and it is used again so that a new connection does not have to be established. For example, when there needs to be ten connections between microservice 804 and database 808, there will be ten open connections in connection pool 810, all in the context of a database user (e.g., in association with a specific database user, e.g., who is the owner of that connection, whose credentials are being validated, is it a database user, is it a system credential, etc.).

The connections in connection pool 810 are created for a system user that can access anything. Therefore, in order to correctly handle auditing and privileges by microservice 804 processing requests on behalf of a tenant, the database operation is performed in the context of a "proxy user" 812 associated with the schema owner assigned to the specific tenant. This schema owner can access only the tenancy that the schema was created for, and the value of the tenancy is the value of the schema owner. When a request is made for data in database 806, microservice 804 uses the connections in connection pool 810 to provide that data. Accordingly, multi-tenancy is achieved by having stateless, elastic middle tier services process incoming requests in the context of (e.g., in association with) the tenant-specific data store binding established on a per request basis on top of the data connection created in the context of (e.g., in association with) the data store proxy user associated with the resource tenancy, and the database can scale independently of the services.

The following provides an example functionality for implementing proxy user 812:

```
dbOperation = <prepare DB command to execute>
dbConnection = getDBConnectionFromPool( )
dbConnection.setProxyUser (resourceTenant)
result = dbConnection.executeOperation (dbOperation)
```

In this functionality, microservice 804 sets the "Proxy User" setting on the connection pulled from connection pool 810 to the "Tenant," and performs the database operation in the context of the tenant while using the database connection in connection pool 810.

When striping every table to configure different columns in a same database for different tenants, one table may include all tenants' data mixed together. In contrast, one embodiment provides a tenant-driven data tier. The embodiment does not stripe the same database for different tenants, but instead provides a different physical database per tenant. For example, multi-tenancy may be implemented by using a pluggable database (e.g., Oracle Database 12c from Oracle Corp.) where each tenant is allocated a separate partition. At the data tier, a resource manager processes the request and then asks for the data source for the request (separate from metadata). The embodiment performs runtime switch to a respective data source/store per request. By isolating each tenant's data from the other tenants, the embodiment provides improved data security.

In one embodiment, various tokens codify different tenancies. A URL token may identify the tenancy of the application that requests a service. An identity token may codify the identity of a user that is to be authenticated. An access token may identify multiple tenancies. For example, an access token may codify the tenancy that is the target of such access (e.g., an application tenancy) as well as the user tenancy of the user that is given access. A client assertion token may identify a client ID and the client tenancy. A user-assertion token may identify the user and the user tenancy.

In one embodiment, an identity token includes at least a claim/statement indicating the user tenant name (i.e., where the user lives). A "claim" (as used by one of ordinary skill in the security field) in connection with authorization tokens is a statement that one subject makes about itself or another subject. The statement can be about a name, identity, key, group, privilege, or capability, for example. Claims are issued by a provider, and they are given one or more values and then packaged in security tokens that are issued by an issuer, commonly known as a security token service ("STS").

In one embodiment, an access token includes at least a claim/statement indicating the resource tenant name at the time the request for the access token was made (e.g., the customer), a claim indicating the user tenant name, a claim indicating the name of the OAuth client making the request, and a claim indicating the client tenant name. In one embodiment, an access token may be implemented according to the following JSON functionality:

```
{
...
" tok_type " : "AT",
"user_id" : "testuser",
"user_tenantname" : "<value-of-identity-tenant>"
"tenant" : "<value-of-resource-tenant>"
"client_id" : "testclient",
"client_tenantname": "<value-of-client-tenant>"
...
}
```

In one embodiment, a client assertion token includes at least a claim indicating the client tenant name, and a claim indicating the name of the OAuth client making the request.

The tokens and/or multiple tenancies described herein may be implemented in any multi-tenant cloud-based service other than IDCS. For example, the tokens and/or multiple tenancies described herein may be implemented in SaaS or Enterprise Resource Planning ("ERP") services.

Figure 9:
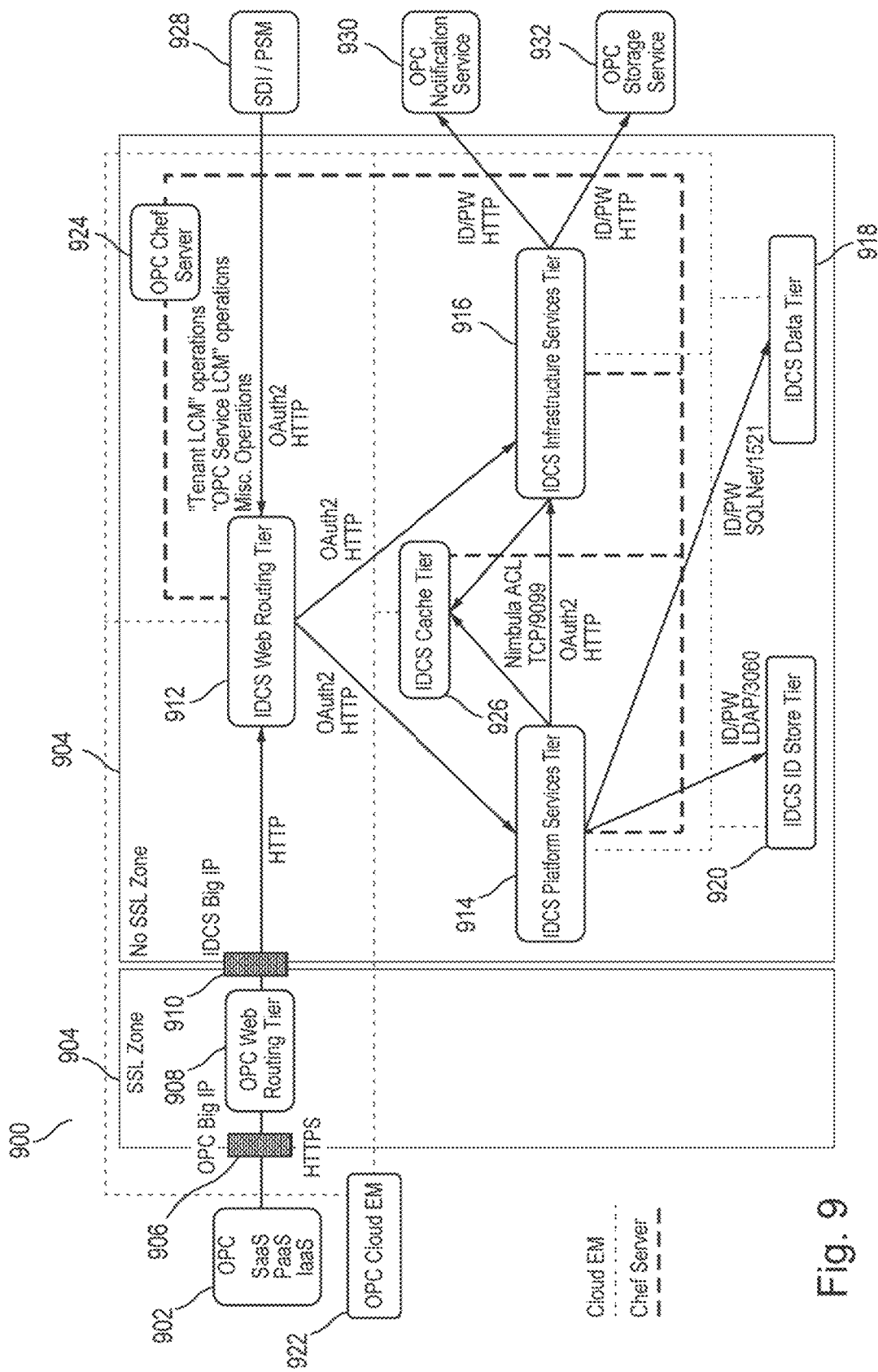
FIG. 9 is a block diagram of a network view of an embodiment.

FIG. 9 is a block diagram of a network view 900 of IDCS in one embodiment. FIG. 9 illustrates network interactions that are performed in one embodiment between application "zones" 904. Applications are broken into zones based on the required level of protection and the implementation of connections to various other systems (e.g., SSL zone, no SSL zone, etc.). Some application zones provide services that require access from the inside of IDCS, while some application zones provide services that require access from the outside of IDCS, and some are open access. Accordingly, a respective level of protection is enforced for each zone.

In the embodiment of FIG. 9, service to service communication is performed using HTTP requests. In one embodiment, IDCS uses the access tokens described herein not only to provide services but also to secure access to and within IDCS itself. In one embodiment, IDCS microservices are exposed through RESTful interfaces and secured by the tokens described herein.

In the embodiment of FIG. 9, any one of a variety of applications/services 902 may make HTTP calls to IDCS APIs to use IDCS services. In one embodiment, the HTTP requests of applications/services 902 go through an Oracle Public Cloud Load Balancing External Virtual IP address ("VIP") 906 (or other similar technologies), a public cloud web routing tier 908, and an IDCS Load Balancing Internal VIP appliance 910 (or other similar technologies), to be received by IDCS web routing tier 912. IDCS web routing tier 912 receives the requests coming in from the outside or from the inside of IDCS and routes them across either an IDCS platform services tier 914 or an IDCS infrastructure services tier 916. IDCS platform services tier 914 includes IDCS microservices that are invoked from the outside of IDCS, such as OpenID Connect, OAuth, SAML, SCIM, etc. IDCS infrastructure services tier 916 includes supporting microservices that are invoked from the inside of IDCS to support the functionality of other IDCS microservices. Examples of IDCS infrastructure microservices are UI, SSO, reports, cache, job scheduler, service manager, functionality for making keys, etc. An IDCS cache tier 926 supports caching functionality for IDCS platform services tier 914 and IDCS infrastructure services tier 916.

By enforcing security both for outside access to IDCS and within IDCS, customers of IDCS can be provided with outstanding security compliance for the applications they run.

In the embodiment of FIG. 9, other than the data tier 918 which communicates based on Structured Query Language ("SQL") and the ID store tier 920 that communicates based on LDAP, OAuth protocol is used to protect the communication among IDCS components (e.g., microservices) within IDCS, and the same tokens that are used for securing access from the outside of IDCS are also used for security within IDCS. That is, web routing tier 912 uses the same tokens and protocols for processing the requests it receives regardless of whether a request is received from the outside of IDCS or from the inside of IDCS. Accordingly, IDCS provides a single consistent security model for protecting the entire system, thereby allowing for outstanding security compliance since the fewer security models implemented in a system, the more secure the system is.

In the IDCS cloud environment, applications communicate by making network calls. The network call may be based on an applicable network protocol such as HTTP, Transmission Control Protocol ("TCP"), User Datagram Protocol ("UDP"), etc. For example, an application "X" may communicate with an application "Y" based on HTTP by exposing application "Y" as an HTTP Uniform Resource Locator ("URL"). In one embodiment, "Y" is an IDCS microservice that exposes a number of resources each corresponding to a capability. When "X" (e.g., another IDCS microservice) needs to call "Y", it constructs a URL that includes "Y" and the resource/capability that needs to be invoked (e.g., https:/host/Y/resource), and makes a corresponding REST call which goes through web routing tier 912 and gets directed to "Y".

In one embodiment, a caller outside the IDCS may not need to know where "Y" is, but web routing tier 912 needs to know where application "Y" is running. In one embodiment, IDCS implements discovery functionality (implemented by an API of OAuth service) to determine where each application is running so that there is no need for the availability of static routing information.

In one embodiment, an enterprise manager ("EM") 922 provides a "single pane of glass" that extends on-premise and cloud-based management to IDCS. In one embodiment, a "Chef" server 924 which is a configuration management tool from Chef Software, Inc., provides configuration management functionality for various IDCS tiers. In one embodiment, a service deployment infrastructure and/or a persistent stored module 928 may send OAuth2 HTTP messages to IDCS web routing tier 912 for tenant lifecycle management operations, public cloud lifecycle management operations, or other operations. In one embodiment, IDCS infrastructure services tier 916 may send ID/password HTTP messages to a public cloud notification service 930 or a public cloud storage service 932.

Cloud Access Control—SSO

One embodiment supports lightweight cloud standards for implementing a cloud scale SSO service. Examples of lightweight cloud standards are HTTP, REST, and any standard that provides access through a browser (since a web browser is lightweight). On the contrary, SOAP is an example of a heavy cloud standard which requires more management, configuration, and tooling to build a client with. The embodiment uses OpenID Connect semantics for applications to request user authentication against IDCS. The embodiment uses lightweight HTTP cookie-based user session tracking to track user's active sessions at IDCS without statefull server-side session support. The embodiment uses JWT-based identity tokens for applications to use in mapping an authenticated identity back to their own local session. The embodiment supports integration with federated identity management systems, and exposes SAML IDP support for enterprise deployments to request user authentication against IDCS.

Figure 10:
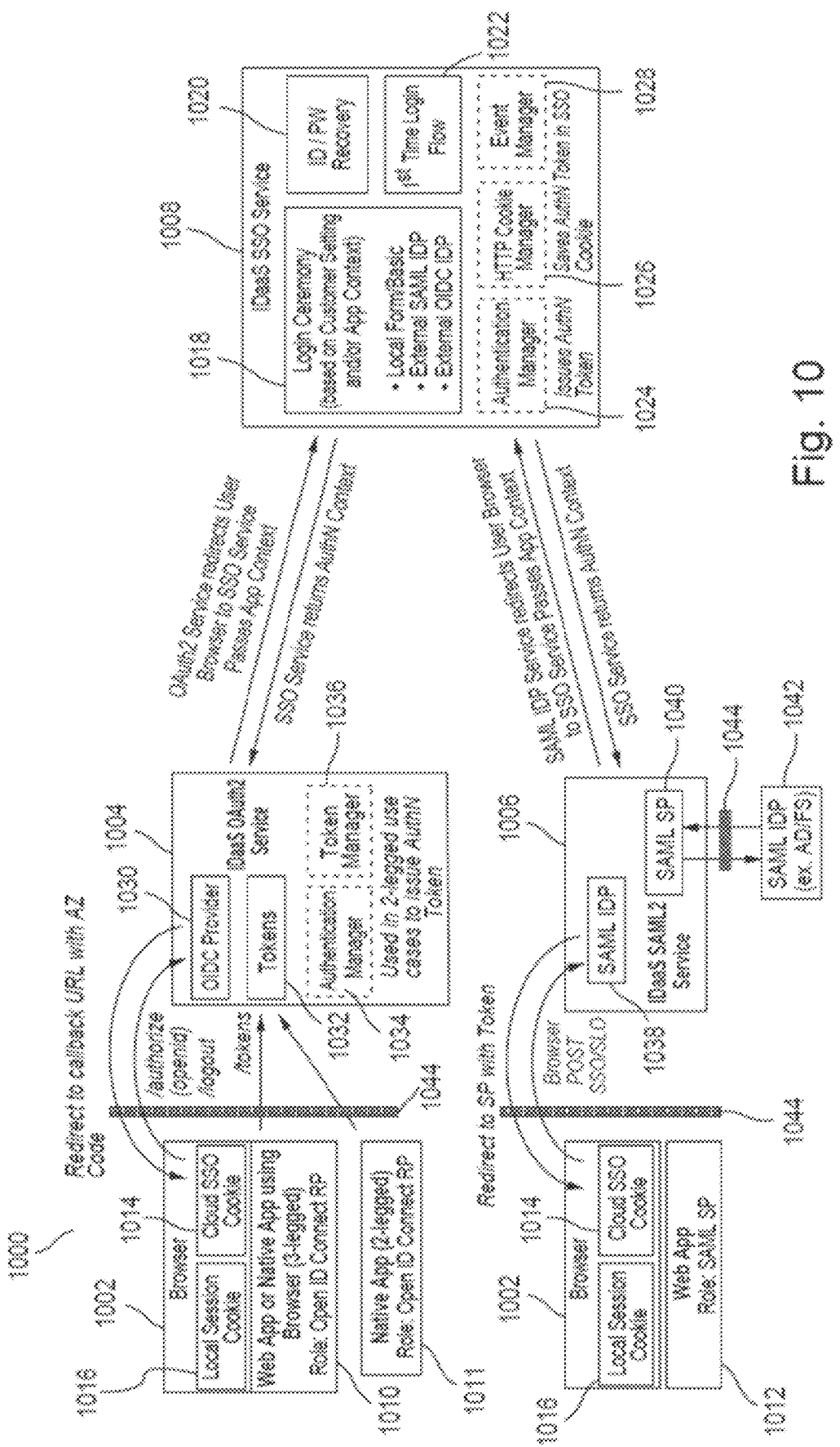
FIG. 10 is a block diagram of a system architecture view of single sign on ("SSO") functionality in one embodiment.

FIG. 10 is a block diagram 1000 of a system architecture view of SSO functionality in IDCS in one embodiment. The embodiment enables client applications to leverage standards-based web protocols to initiate user authentication flows. Applications requiring SSO integration with a cloud system may be located in enterprise data centers, in remote partner data centers, or even operated by a customer on-premise. In one embodiment, different IDCS platform services implement the business of SSO, such as OpenID Connect for processing login/logout requests from connected native applications (i.e., applications utilizing OpenID Connect to integrate with IDCS); SAML IDP service for processing browser-based login/logout requests from connected applications; SAML SP service for orchestrating user authentication against an external SAML IDP; and an internal IDCS SSO service for orchestrating end user login ceremony including local or federated login flows, and for managing IDCS host session cookie. Generally, HTTP works either with a form or without a form. When it works with a form, the form is seen within a browser. When it works without a form, it functions as a client to server communication. Both OpenID Connect and SAML require the ability to render a form, which may be accomplished by presence of a browser or virtually performed by an application that acts as if there is a browser. In one embodiment, an application client implementing user authentication/SSO through IDCS needs to be registered in IDCS as an OAuth2 client and needs to obtain client identifier and credentials (e.g., ID/password, ID/certificate, etc.).

The example embodiment of FIG. 10 includes three components/microservices that collectively provide login capabilities, including two platform microservices: OAuth2 1004 and SAML2 1006, and one infrastructure microservice: SSO 1008. In the embodiment of FIG. 10, IDCS provides an "Identity Metasystem" in which SSO services 1008 are provided over different types of applications, such as browser based web or native applications 1010 requiring 3-legged OAuth flow and acting as an OpenID Connect relaying party ("RP," an application that outsources its user authentication function to an IDP), native applications 1011 requiring 2-legged OAuth flow and acting as an OpenID Connect RP, and web applications 1012 acting as a SAML SP.

Generally, an Identity Metasystem is an interoperable architecture for digital identity, allowing for employing a collection of digital identities based on multiple underlying technologies, implementations, and providers. LDAP, SAML, and OAuth are examples of different security standards that provide identity capability and can be the basis for building applications, and an Identity Metasystem may be configured to provide a unified security system over such applications. The LDAP security model specifies a specific mechanism for handling identity, and all passes through the system are to be strictly protected. SAML was developed to allow one set of applications securely exchange information with another set of applications that belong to a different organization in a different security domain. Since there is no trust between the two applications, SAML was developed to allow for one application to authenticate another application that does not belong to the same organization. OAuth provides OpenID Connect that is a lightweight protocol for performing web based authentication.

In the embodiment of FIG. 10, when an OpenID application 1010 connects to an OpenID server in IDCS, its "channels" request SSO service. Similarly, when a SAML application 1012 connects to a SAML server in IDCS, its "channels" also request SSO service. In IDCS, a respective microservice (e.g., an OpenID microservice 1004 and a SAML microservice 1006) will handle each of the applications, and these microservices request SSO capability from SSO microservice 1008. This architecture can be expanded to support any number of other security protocols by adding a microservice for each protocol and then using SSO microservice 1008 for SSO capability. SSO microservice 1008 issues the sessions (i.e., an SSO cookie 1014 is provided) and is the only system in the architecture that has the authority to issue a session. An IDCS session is realized through the use of SSO cookie 1014 by browser 1002. Browser 1002 also uses a local session cookie 1016 to manage its local session.

In one embodiment, for example, within a browser, a user may use a first application based on SAML and get logged in, and later use a second application built with a different protocol such as OAuth. The user is provided with SSO on the second application within the same browser. Accordingly, the browser is the state or user agent and maintains the cookies.

In one embodiment, SSO microservice 1008 provides login ceremony 1018, ID/password recovery 1020, first time login flow 1022, an authentication manager 1024, an HTTP cookie manager 1026, and an event manager 1028. Login ceremony 1018 implements SSO functionality based on customer settings and/or application context, and may be configured according to a local form (i.e., basic Auth), an external SAML IDP, an external OIDC IDP, etc. ID/password recovery 1020 is used to recover a user's ID and/or password. First time login flow 1022 is implemented when a user logs in for the first time (i.e., an SSO session does not yet exist). Authentication manager 1024 issues authentication tokens upon successful authentication. HTTP cookie manager 1026 saves the authentication token in an SSO cookie. Event manager 1028 publishes events related to SSO functionality.

In one embodiment, interactions between OAuth microservice 1004 and SSO microservice 1008 are based on browser redirects so that SSO microservice 1008 challenges the user using an HTML form, validates credentials, and issues a session cookie.

In one embodiment, for example, OAuth microservice 1004 may receive an authorization request from browser 1002 to authenticate a user of an application according to 3-legged OAuth flow. OAuth microservice 1004 then acts as an OIDC provider 1030, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to OAuth microservice 1004. OAuth microservice 1004 then redirects browser 1002 to a callback URL with an authorization ("AZ") code. Browser 1002 sends the AZ code to OAuth microservice 1004 to request the required tokens 1032. Browser 1002 also includes its client credentials (obtained when registering in IDCS as an OAuth2 client) in the HTTP authorization header. OAuth microservice 1004 in return provides the required tokens 1032 to browser 1002. In one embodiment, tokens 1032 provided to browser 1002 include JW identity and access tokens signed by the IDCS OAuth2 server. Further details of this functionality are disclosed below with reference to FIG. 11.

In one embodiment, for example, OAuth microservice 1004 may receive an authorization request from a native application 1011 to authenticate a user according to a 2-legged OAuth flow. In this case, an authentication manager 1034 in OAuth microservice 1004 performs the corresponding authentication (e.g., based on ID/password received from a client 1011) and a token manager 1036 issues a corresponding access token upon successful authentication.

In one embodiment, for example, SAML microservice 1006 may receive an SSO POST request from a browser to authenticate a user of a web application 1012 that acts as a SAML SP. SAML microservice 1006 then acts as a SAML IDP 1038, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to SAML microservice 1006. SAML microservice then redirects to the SP with required tokens.

In one embodiment, for example, SAML microservice 1006 may act as a SAML SP 1040 and go to a remote SAML IDP 1042 (e.g., an active directory federation service ("ADFS")). One embodiment implements the standard SAML/AD flows. In one embodiment, interactions between SAML microservice 1006 and SSO microservice 1008 are based on browser redirects so that SSO microservice 1008 challenges the user using an HTML form, validates credentials, and issues a session cookie.

In one embodiment, the interactions between a component within IDCS (e.g., 1004, 1006, 1008) and a component outside IDCS (e.g., 1002, 1011, 1042) are performed through firewalls 1044.

Login/Logout Flow

Figure 11:
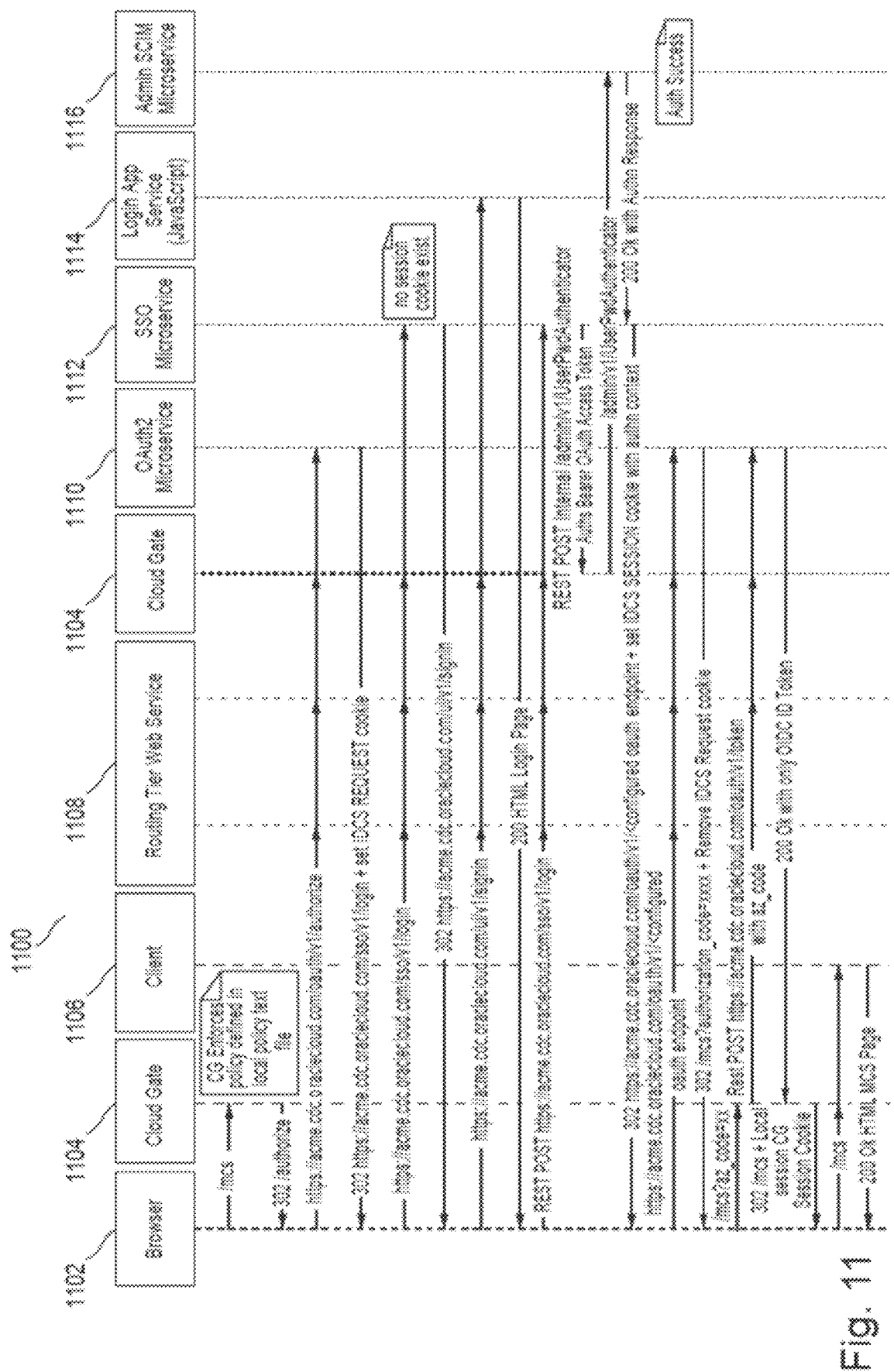
FIG. 11 is a message sequence flow of SSO functionality in one embodiment.

FIG. 11 is a message sequence flow 1100 of SSO functionality provided by IDCS in one embodiment. When a user uses a browser 1102 to access a client 1106 (e.g., a browser-based application or a mobile/native application), Cloud Gate 1104 acts as an application enforcement point and enforces a policy defined in a local policy text file. If Cloud Gate 1104 detects that the user has no local application session, it requires the user to be authenticated. In order to do so, Cloud Gate 1104 redirects browser 1102 to OAuth2 microservice 1110 to initiate OpenID Connect login flow against the OAuth2 microservice 1110 (3-legged AZ Grant flow with scopes="openid profile").

The request of browser 1102 traverses IDCS routing tier web service 1108 and Cloud Gate 1104 and reaches OAuth2 microservice 1110. OAuth2 microservice 1110 constructs the application context (i.e., metadata that describes the application, e.g., identity of the connecting application, client ID, configuration, what the application can do, etc.), and redirects browser 1102 to SSO microservice 1112 to log in.

If the user has a valid SSO session, SSO microservice 1112 validates the existing session without starting a login ceremony. If the user does not have a valid SSO session (i.e., no session cookie exists), the SSO microservice 1112 initiates the user login ceremony in accordance with customer's login preferences (e.g., displaying a branded login page). In order to do so, the SSO microservice 1112 redirects browser 1102 to a login application service 1114 implemented in JavaScript. Login application service 1114 provides a login page in browser 1102. Browser 1102 sends a REST POST to the SSO microservice 1112 including login credentials. The SSO microservice 1112 generates an access token and sends it to Cloud Gate 1104 in a REST POST. Cloud Gate 1104 sends the authentication information to Admin SCIM microservice 1116 to validate the user's password. Admin SCIM microservice 1116 determines successful authentication and sends a corresponding message to SSO microservice 1112.

In one embodiment, during the login ceremony, the login page does not display a consent page, as "login" operation requires no further consent. Instead, a privacy policy is stated on the login page, informing the user about certain profile attributes being exposed to applications. During the login ceremony, the SSO microservice 1112 respects customer's IDP preferences, and if configured, redirects to the IDP for authentication against the configured IDP.

Upon successful authentication or validation, SSO microservice 1112 redirects browser 1102 back to OAuth2 microservice 1110 with the newly created/updated SSO host HTTP cookie (e.g., the cookie that is created in the context of the host indicated by "HOSTURL") containing the user's authentication token. OAuth2 microservice 1110 returns AZ Code (e.g., an OAuth concept) back to browser 1102 and redirects to Cloud Gate 1104. Browser 1102 sends AZ Code to Cloud Gate 1104, and Cloud Gate 1104 sends a REST POST to OAuth2 microservice 1110 to request the access token and the identity token. Both tokens are scoped to OAuth microservice 1110 (indicated by the audience token claim). Cloud Gate 1104 receives the tokens from OAuth2 microservice 1110.

Cloud Gate 1104 uses the identity token to map the user's authenticated identity to its internal account representation, and it may save this mapping in its own HTTP cookie. Cloud Gate 1104 then redirects browser 1102 to client 1106. Browser 1102 then reaches client 1106 and receives a corresponding response from client 1106. From this point on, browser 1102 can access the application (i.e., client 1106) seamlessly for as long as the application's local cookie is valid. Once the local cookie becomes invalid, the authentication process is repeated.

Cloud Gate 1104 further uses the access token received in a request to obtain "userinfo" from OAuth2 microservice 1110 or the SCIM microservice. The access token is sufficient to access the "userinfo" resource for the attributes allowed by the "profile" scope. It is also sufficient to access "/me" resources via the SCIM microservice. In one embodiment, by default, the received access token is only good for user profile attributes that are allowed under the "profile" scope. Access to other profile attributes is authorized based on additional (optional) scopes submitted in the AZ grant login request issued by Cloud Gate 1104.

When the user accesses another OAuth2 integrated connecting application, the same process repeats.

In one embodiment, the SSO integration architecture uses a similar OpenID Connect user authentication flow for browser-based user logouts. In one embodiment, a user with an existing application session accesses Cloud Gate 1104 to initiate a logout. Alternatively, the user may have initiated the logout on the IDCS side. Cloud Gate 1104 terminates the application-specific user session, and initiates OAuth2 OpenID Provider ("OP") logout request against OAuth2 microservice 1110. OAuth2 microservice 1110 redirects to SSO microservice 1112 that kills the user's host SSO cookie. SSO microservice 1112 initiates a set of redirects (OAuth2 OP and SAML IDP) against known logout endpoints as tracked in user's SSO cookie.

In one embodiment, if Cloud Gate 1104 uses SAML protocol to request user authentication (e.g., login), a similar process starts between the SAML microservice and SSO microservice 1112.

Cloud Cache

One embodiment provides a service/capability referred to as Cloud Cache. Cloud Cache is provided in IDCS to support communication with applications that are LDAP based (e.g., email servers, calendar servers, some business applications, etc.) since IDCS does not communicate according to LDAP while such applications are configured to communicate only based on LDAP. Typically, cloud directories are exposed via REST APIs and do not communicate according to the LDAP protocol. Generally, managing LDAP connections across corporate firewalls requires special configurations that are difficult to set up and manage.

To support LDAP based applications, Cloud Cache translates LDAP communications to a protocol suitable for communication with a cloud system. Generally, an LDAP based application uses a database via LDAP. An application may be alternatively configured to use a database via a different protocol such as SQL. However, LDAP provides a hierarchical representation of resources in tree structures, while SQL represents data as tables and fields. Accordingly, LDAP may be more desirable for searching functionality, while SQL may be more desirable for transactional functionality.

In one embodiment, services provided by IDCS may be used in an LDAP based application to, for example, authenticate a user of the applications (i.e., an identity service) or enforce a security policy for the application (i.e., a security service). In one embodiment, the interface with IDCS is through a firewall and based on HTTP (e.g., REST). Typically, corporate firewalls do not allow access to internal LDAP communication even if the communication implements Secure Sockets Layer ("SSL"), and do not allow a TCP port to be exposed through the firewall. However, Cloud Cache translates between LDAP and HTTP to allow LDAP based applications reach services provided by IDCS, and the firewall will be open for HTTP.

Generally, an LDAP directory may be used in a line of business such as marketing and development, and defines users, groups, works, etc. In one example, a marketing and development business may have different targeted customers, and for each customer, may have their own applications, users, groups, works, etc. Another example of a line of business that may run an LDAP cache directory is a wireless service provider. In this case, each call made by a user of the wireless service provider authenticates the user's device against the LDAP directory, and some of the corresponding information in the LDAP directory may be synchronized with a billing system. In these examples, LDAP provides functionality to physically segregate content that is being searched at runtime.

In one example, a wireless service provider may handle its own identity management services for their core business (e.g., regular calls), while using services provided by IDCS in support of a short term marketing campaign. In this case, Cloud Cache "flattens" LDAP when it has a single set of users and a single set of groups that it runs against the cloud. In one embodiment, any number of Cloud Caches may be implemented in IDCS.

Distributed Data Grid

In one embodiment, the cache cluster in IDCS is implemented based on a distributed data grid, as disclosed, for example, in U.S. Pat. Pub. No. 2016/0092540, the disclosure of which is hereby incorporated by reference. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the Oracle Coherence data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, IDCS implements a distributed data grid such as Coherence so that every microservice can request access to shared cache objects without getting blocked. Coherence is a proprietary Java-based in-memory data grid, designed to have better reliability, scalability, and performance than traditional relational database management systems. Coherence provides a peer to peer (i.e., with no central manager), in-memory, distributed cache.

Figure 12:
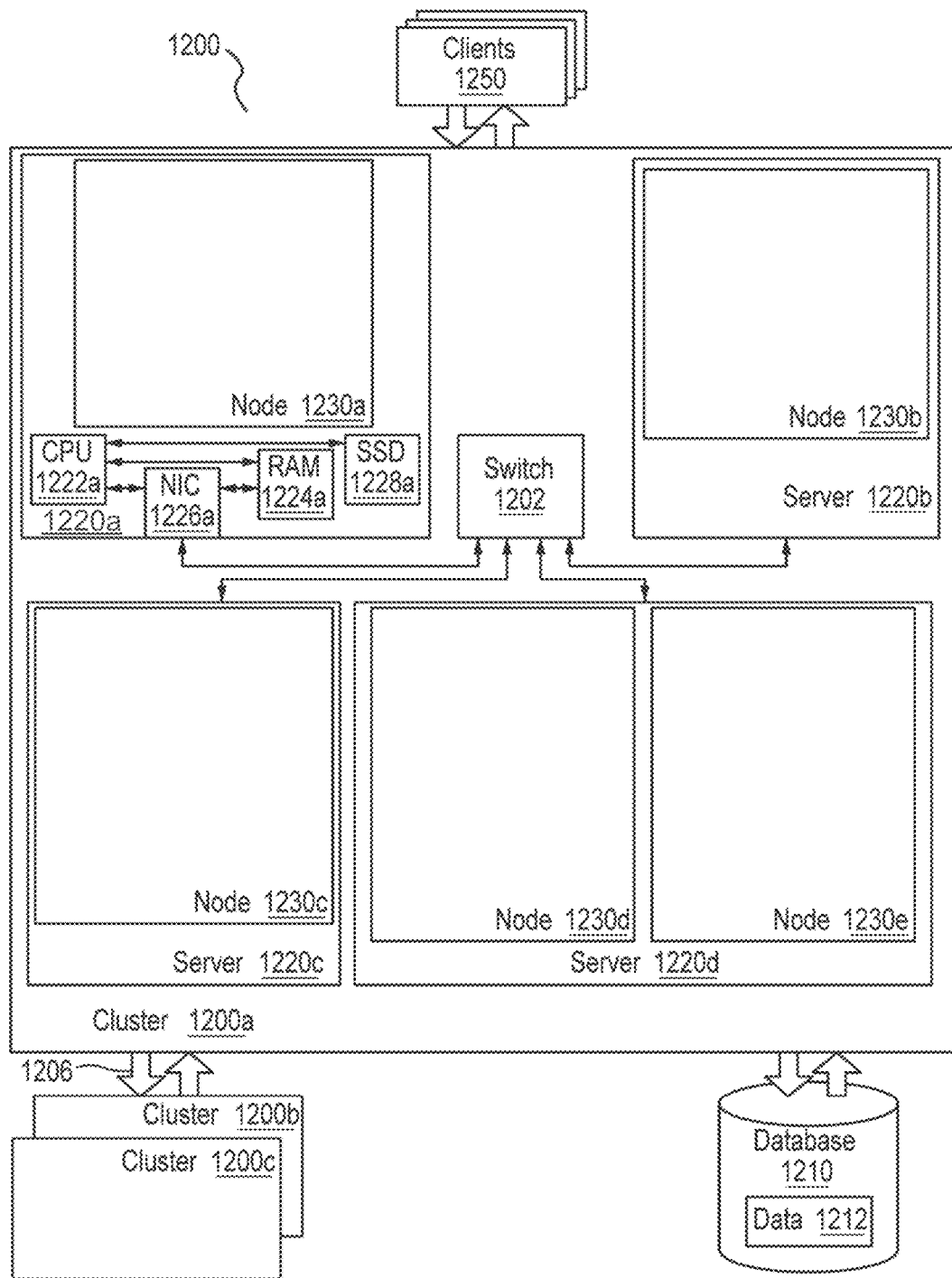
FIG. 12 illustrates an example of a distributed data grid in one embodiment.

FIG. 12 illustrates an example of a distributed data grid 1200 which stores data and provides data access to clients 1250 and implements embodiments of the invention. A "data grid cluster", or "distributed data grid", is a system comprising a plurality of computer servers (e.g., 1220*a*, 1220*b*, 1220*c*, and 1220*d*) which work together in one or more clusters (e.g., 1200*a*, 1200*b*, 1200*c*) to store and manage information and related operations, such as computations, within a distributed or clustered environment. While distributed data grid 1200 is illustrated as comprising four servers

1220a, 1220b, 1220c, 1220d, with five data nodes 1230a, 1230b, 1230c, 1230d, and 1230e in a cluster 1200a, the distributed data grid 1200 may comprise any number of clusters and any number of servers and/or nodes in each cluster. In an embodiment, distributed data grid 1200 implements the present invention.

As illustrated in FIG. 12, a distributed data grid provides data storage and management capabilities by distributing data over a number of servers (e.g., 1220a, 1220b, 1220c, and 1220d) working together. Each server of the data grid cluster may be a conventional computer system such as, for example, a "commodity x86" server hardware platform with one to two processor sockets and two to four CPU cores per processor socket. Each server (e.g., 1220a, 1220b, 1220c, and 1220d) is configured with one or more CPUs, Network Interface Cards ("NIC"), and memory including, for example, a minimum of 4 GB of RAM up to 64 GB of RAM or more. Server 1220a is illustrated as having CPU 1222a, Memory 1224a, and NIC 1226a (these elements are also present but not shown in the other Servers 1220b, 1220c, 1220d). Optionally, each server may also be provided with flash memory (e.g., SSD 1228a) to provide spillover storage capacity. When provided, the SSD capacity is preferably ten times the size of the RAM. The servers (e.g., 1220a, 1220b, 1220c, 1220d) in a data grid cluster 1200a are connected using high bandwidth NICs (e.g., PCI-X or PCIe) to a high-performance network switch 1220 (for example, gigabit Ethernet or better).

A cluster 1200a preferably contains a minimum of four physical servers to avoid the possibility of data loss during a failure, but a typical installation has many more servers. Failover and failback are more efficient the more servers that are present in each cluster and the impact of a server failure on a cluster is lessened. To minimize communication time between servers, each data grid cluster is ideally confined to a single switch 1202 which provides single hop communication between servers. A cluster may thus be limited by the number of ports on the switch 1202. A typical cluster will therefore include between 4 and 96 physical servers.

In most Wide Area Network ("WAN") configurations of a distributed data grid 1200, each data center in the WAN has independent, but interconnected, data grid clusters (e.g., 1200a, 1200b, and 1200c). A WAN may, for example, include many more clusters than shown in FIG. 12. Additionally, by using interconnected but independent clusters (e.g., 1200a, 1200b, 1200c) and/or locating interconnected, but independent, clusters in data centers that are remote from one another, the distributed data grid can secure data and service to clients 1250 against simultaneous loss of all servers in one cluster caused by a natural disaster, fire, flooding, extended power loss, and the like.

One or more nodes (e.g., 1230a, 1230b, 1230c, 1230d and 1230e) operate on each server (e.g., 1220a, 1220b, 1220c, 1220d) of a cluster 1200a. In a distributed data grid, the nodes may be, for example, software applications, virtual machines, or the like, and the servers may comprise an operating system, hypervisor, or the like (not shown) on which the node operates. In an Oracle Coherence data grid, each node is a Java virtual machine ("JVM"). A number of JVMs/nodes may be provided on each server depending on the CPU processing power and memory available on the server. JVMs/nodes may be added, started, stopped, and deleted as required by the distributed data grid. JVMs that run Oracle Coherence automatically join and cluster when started. JVMs/nodes that join a cluster are called cluster members or cluster nodes.

Each client or server includes a bus or other communication mechanism for communicating information, and a processor coupled to bus for processing information. The processor may be any type of general or specific purpose processor. Each client or server may further include a memory for storing information and instructions to be executed by processor. The memory can be comprised of any combination of random access memory ("RAM"), read only memory ("ROM"), static storage such as a magnetic or optical disk, or any other type of computer readable media. Each client or server may further include a communication device, such as a network interface card, to provide access to a network. Therefore, a user may interface with each client or server directly, or remotely through a network, or any other method.

Computer readable media may be any available media that can be accessed by processor and includes both volatile and non-volatile media, removable and non-removable media, and communication media. Communication media may include computer readable instructions, data structures, program modules, or other data in a modulated data signal such as a carrier wave or other transport mechanism, and includes any information delivery media.

The processor may further be coupled via bus to a display, such as a Liquid Crystal Display ("LCD"). A keyboard and a cursor control device, such as a computer mouse, may be further coupled to bus to enable a user to interface with each client or server.

In one embodiment, the memory stores software modules that provide functionality when executed by the processor. The modules include an operating system that provides operating system functionality each client or server. The modules may further include a cloud identity management module for providing cloud identity management functionality, and all other functionality disclosed herein.

The clients may access a web service such as a cloud service. The web service may be implemented on a WebLogic Server from Oracle Corp. in one embodiment. In other embodiments, other implementations of a web service can be used. The web service accesses a database which stores cloud data.

Application Management

As disclosed above, embodiments of IDCS function as a platform for application security. One embodiment provides an application management functionality that unifies the various artifacts or various configuration points of an application under a single umbrella. The single umbrella functions as a "single pane of glass" or UI that can be used by a single administrator to unify administration policies, enforcement points, and business policies. In information technology, a single pane of glass refers to a unified management dashboard/console/display that provides integrated information related to various environments/applications/etc.

Embodiments of application management in IDCS provide a novel method of managing integration between applications (also referred to as "apps") and the identity management ("IDM") services that the applications depend on. With known systems, each discrete functional stack (e.g., SSO, Federation, Risk, Identity, Roles, etc.) generally has its own administrative interface through which the configuration used by the underlying identity management component is managed. For each functional component in known systems, an administrator has to define the configuration required by the functional component. Such style of data management creates administration silos that are difficult to work with. Such style may also lead to redundant UI experiences and often redundant data artifacts, such as duplicate session timeouts, duplicate signing keys, duplicate mapping, etc., which often lead to administrative issues in known systems.

In contrast, embodiments provide an integrated data model to ensure that all of the IDCS run-time services operate on the same copy of the data (i.e., each run-time service holds data pointed by the Application Management model), and also expose a single pane of glass (e.g., a unified console) through which administrators manage the IDM configuration as required by applications they need to manage. Administrators are able, in one embodiment, to use a single IDCS UI to:

Manage IDM artifacts required by the applications they build; and

Manage integration with the applications they need to integrate into their deployments.

Generally, applications have spanned a wide range of categories (e.g., web apps, mobile apps, on premise apps, SaaS apps, Java apps, Database apps, etc.) and have evolved from large applications to very small applications (e.g., from mainframe, to minis, to client/server, to web, to mobile, to wearable). However, in one embodiment, regardless of what an application is used for, how it is built, and where it runs, any application may have the following four traits:

Resources: indicating what resources the application is exposing
This is referring to managing user entitlements.
Users: indicating who is using the application, who can the application be granted to, who has what application granted, etc.
This is referring to managing user access to applications.
Devices: indicating where the application is being used or is being accessed from
This is referring to managing trusted devices.
Policies: indicating what users can do with resources of the application while accessing the application from devices
This is referring to context-based security.

Embodiments use an abstraction of an application and divide it into logical facets. An application may consume or generate resources. An application as a whole may be turned on or turned off. Further, individual facets may be turned on or turned off while being configured. An application includes roles regarding who can administer the application. The roles include a global role ("appadministator") which can administer all applications, and a local role for particular applications. Each application is an entity to which an end-user can sign onto. Each application may have multiple facets, and each facet may be configured conditionally.

In one embodiment, application management functions as a bridge between application developers and actual customers (i.e., tenants). Applications can consume cloud services (i.e., consume APIs). The IDCS cloud service exposes its own APIs. Whenever a tenant is created, at least the IDCS APIs are exposed, and other applications can expose their own APIs.

Each application in embodiments represents a customer's access to an application or service for which IDCS provides run-time services (e.g., authorization/identify services for the application). The application entity provides a "single pane of glass" (i.e., a converged representation) through which administrators can view or manage everything that IDCS knows about a particular application or service. This is in contrast to known enterprise products, such as OIM, OAM, and Oracle Identity Federation ("OIF"), in which each product has a separate representation of each application or service. In IDCS, each application is represented once and has a number of optional facets, each of which describing a particular aspect of application behavior. For example, an application may act as an OAuth client, as an OAuth resource, and also as an "AppIDUser". More specific examples include an OAuth client that uses the OAuth protocol to access resources of an OAuth resource server; an OAuth resource server that defines as "scopes" the sets of resources that it allows OAuth clients to access; and a login target that is one into which IDCS can single-sign-on (i.e., log in automatically) a user. In general, each facet contains the information that an application needs in order to perform a specific role when interacting with the run-time service of IDCS.

An application in embodiments represents a construct through which the underlying identity/security needs of the application are administered. In one embodiment, an application fits in either a managed or an unmanaged category. Managed applications expect IDCS to manage the lifecycle of identities of users with access to the application including provisioning of user entitlements in the application. This is a traditional tightly-coupled governance-based model where IDM is in control of "Who has Access to What", uses "User Provisioning" connectors to manage the lifecycle of user identity including account and privilege management, and keeps necessary and sufficient user footprint to implement the former. An entitlement is a privilege in an application (e.g., used to determine authorization in that application). For managed applications, any account attribute may be an entitlement. For unmanaged applications, "AppRoles" represents these privileges. In one embodiment, AppRoles are defined only for unmanaged Apps and define a set of privileges in respective Apps. An AppRole does not relate to access in IDCS, but defines a set of functions the user with this AppRole can do in the corresponding App.

Unmanaged applications do not expect IDCS to automatically/authoritatively manage user entitlements in application-specific repositories. These applications rely on administrative actions performed in the identity store and/or in their own policy stores for managing "Who has Access to What" in their applications. Such applications may rely on users, user groups, or user application roles to model internal policies, and do not expect IDCS to provide account provisioning capabilities. IDCS manages the footprint of users, user groups, and user application roles in the identity store, and how these entities are consumed by the application is unknown to IDCS, and consequently IDCS does not take any additional responsibility as far as the needs beyond what is in the identity store.

An IDCS tenant may have defined both unmanaged and managed applications. A tenant user may have access to both unmanaged and managed applications at the same time, with different types of applications showing up in a "My Apps" portal. As described, the difference between managed and unmanaged applications with respect to identity services is in the way the user entitlements are managed.

In general, in order to accommodate the "single pane of glass" concept, embodiments provide functionality to extend the application indefinitely by adding a facet to describe each specific type of behavior. Each application can have any number of facets. Each facet is a set of attributes that describe one aspect of the behavior of the application, often with respect to run-time services of IDCS.

Each application includes a template ("AppTemplate") in one embodiment. Each template represents a particular type of application or service—for example, GoogleApps or Salesforce or Office365. Every application is based on a particular template—a corresponding attribute ("basedOnTemplate") is required when an administrator creates an application. The template contains metadata, used mainly to generate default values for the attributes of the application. The application schema contains the attributes that the respective "AppTemplate" has, and may also optionally include some additional attributes.

At the top level, an application has an ID, a name, and a reference to the template on which it is based. An Application also has several Boolean flags, each of which representing a capability or facet of behavior that the application may support. If any of these Boolean flags is set to True, then the application exposes a reference to the appropriate segment of configuration information. Each application can have a number of facets. Each facet is a set of attributes that describe one aspect of the application's behavior, often with respect to run-time services of IDCS. Each facet leads to its own extension schema.

Figure 13:
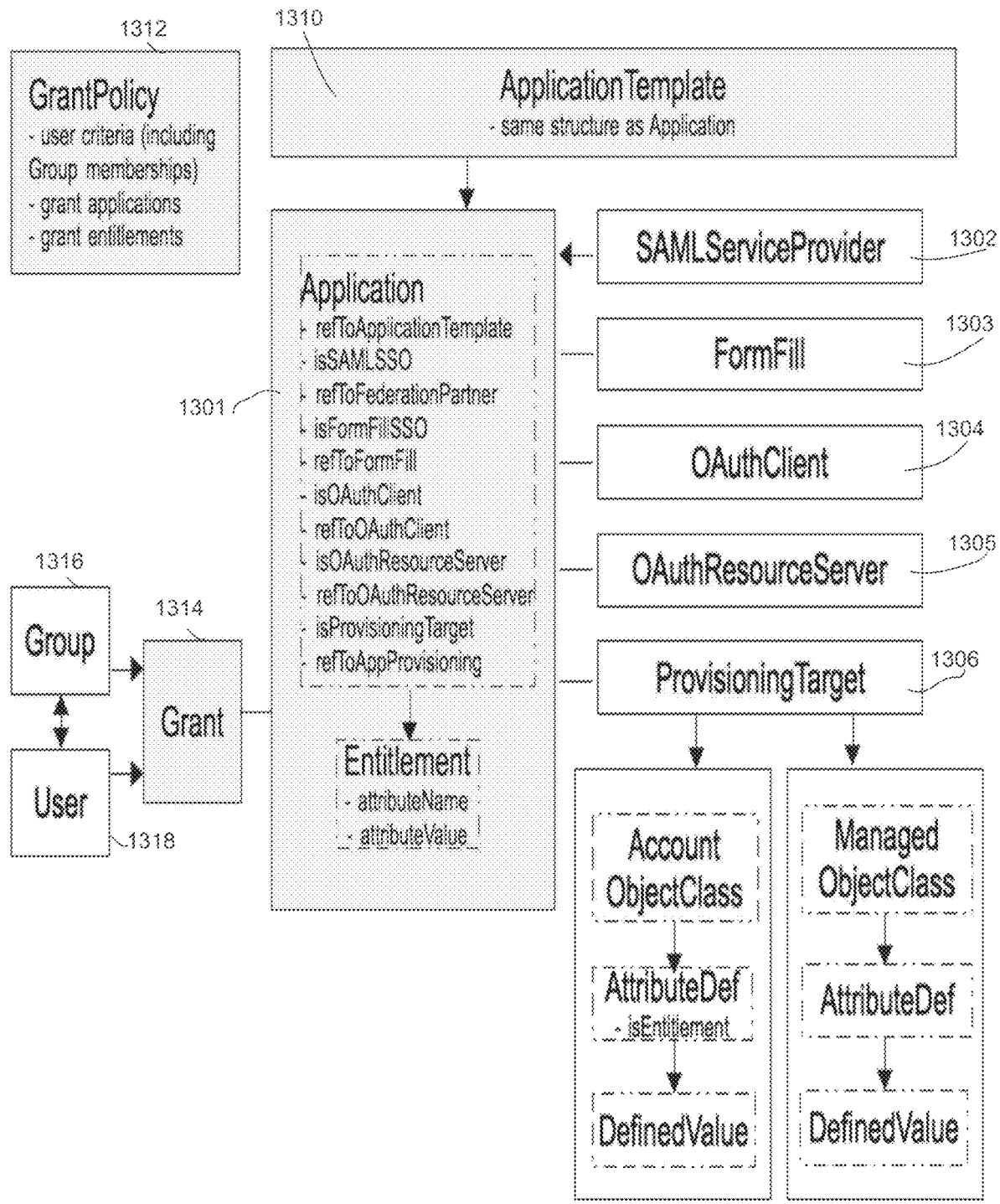
FIG. 13 is a block diagram illustrating elements of multi-facet application in accordance with an embodiment.

FIG. 13 is a block diagram illustrating elements of an application (or App) in accordance with embodiments of the invention. Each application 1301 is a software entity to which an end-user 1318 can sign onto. Each application 1301 has multiple facets and an application template 1310. Each facet can be configured conditionally. FIG. 13, which is a high-level entity-relationship diagram, shows a segment for each facet of the application 1301 (the various ways application 1301 may behave with respect to other entities): SAML service provider facet 1302 (application 1301 behaving as a target for federated SSO), form fill facet 1303 (application 1301 behaving as a target for form-fill SSO), OAuth client facet 1304, OAuth resource server facet 1305, and provisioning target facet 1306. Only some of the possible facets of application 1301 are shown in FIG. 13, as a set of facets for an application can be extended to support new behaviors.

In the embodiment of FIG. 13, application 1301 holds an optional reference to each facet (e.g., SAML service provider facet 1302, form fill facet 1303, OAuth client facet 1304, OAuth resource server facet 1305, and provisioning target facet 1306). In an alternative embodiment, this schema is denormalized by integrating each of those facets with the application. In this alternative embodiment, the attributes of each facet (which was originally a separate entity) are now attributes of the application itself. Schema namespaces are used to group together the attributes related to a specific facet (i.e., aspect of behavior). Conflating (i.e., combining or merging) these resources into a single resource can optimize performance and simplify call patterns, while the functional behavior is the same as the embodiment of FIG. 13.

In one embodiment, the attributes defined for a "Base Application" (i.e., the attributes common to all applications) include (1) ID; (2) display name; (3) "basedOnTemplate"; (4) name; (5) description; (6) active; (7) icon; (8) "isAliasApp"; (9) "aliasApps"; (10) "attrRenderingMetadata"; (11) "serviceParams"; and (12) grants. In the above, "ID" is a generated, immutable (unchanging over time), required "physical" GUID that uniquely identifies the SCIM resource within IDCS that represents the application. "Display name" is a mutable (changeable), user-friendly identifier of the application. "basedOnTemplate" indicates which template the application is based on. "Name" (also part of "OAuthClient"/"AppIDUser" facet described below) is a unique, mutable, optional identifier of the application. The value of "name" also serves as "Client ID" in OAuth-protocol flows. "Description" provides a description of the application. "Active" indicates whether this application template is active. If true, then Apps can be created based on this template. Otherwise, no App can be created based on this template. If true, this App is able to participate in runtime services, such as automatic-login, OAuth, and SAML. If false, all runtime services are disabled for this App, and only administrative operations can be performed. "isAliasApp" (Boolean indicating whether there are aliasApps), "aliasApps" (appLinks: when main application is granted to user, AccountMgmtInfo ("AMI" will have foot-print of aliasApps), "attrRenderingMetadata" serves as hints to IDCS UI or to any other client associated with the application. "Grants" are computed based on grants 1314 of each application. AccountMgmtInfo schema or endPoint is used to manage information for an account that is granted to a user. The AccountMgmtInfo endpoint keeps track of various pieces of information such as the owner of the account, the application in which the account is granted, when the account was last accessed, whether the account is a favorite of the user and other attributes such as when and by whom the account was granted or modified. AccountMgmtInfo is the base entity on top of which/MyApps and/UserApps endpoints have been implemented to retrieve Apps granted to a user using various search criteria.

An administrator can grant 1314 (give) or revoke (take away) access to an App (either basic access or a specific entitlement within an App) to/from Users 1318, Groups 1316, and other Apps. In one embodiment, granting an unmanaged application (e.g., public cloud applications) requires granting AppRole (privilege) as well which is not required for other types of applications (e.g., managed applications). A grantee is the entity to whom the App/AppRole is granted. It can be a user, group, App, etc. A grantor is the entity who is granting the App/AppRole. It can be a user, App, group (in case of Group based grants), etc. There are various ways in which grant can occur, e.g., "IMPORT_APPROLE_MEMBERS", "ADMINISTRATOR_TO_USER", "ADMINISTRATOR_TO_GROUP", "SERVICE_MANAGER_TO_USER", "ADMINISTRATOR_TO_APP", "SERVICE_MANAGER_TO_APP", "OPC_INFRA_TO_APP", "GROUP_MEMBERSHIP", "IMPORT_GRANTS", "SYNC_TO_USER", "ACCESS_REQUEST", etc.

Embodiments provide functionality for grant fulfillment. An App grant to a user is synchronous. For a managed App, grant fulfillment is performed by POST on dynamic endPoint (AccountManagerImpl/create) which makes ICF Call and Creates AMI footprint. For an unmanaged App (AppRole) grant fulfillment includes: create AMI (if does not exist already), PATCH AppRole.members with userId, Grant.isFulfilled=true, and Users.appRoles is computed based on AppRole.members. Fulfillment of App grants to a Group is asynchronous (GrantEventSubscriber listening to events (admin.grant.create.success:*, admin.grant.delete.success:*) and includes: loop through members of the group and grant the App to each member/user (Bulk), and once all grants are successful for group grant, PATCH/Grants with isFulfilled=true. In case of GroupMembership changes, when a user is added to a group that has App(s) granted, the user get such apps. This is also Asynchronous (GroupMembershipChangeEventSubscriber listening to events (admin.group.*:*)) and includes: loop through Apps granted to group and such Apps are granted to user. Similarly, when a group is unassigned from a user, the apps granted to such groups are taken away from user. One embodiment implements a GrantEvaluation Job that keeps Grants and AMI in synchronization, for example, 0 0*1/1*?*43 At second :00 of minute :00 of every hour, every day starting on the 1st, every month (https://www.freeformatter.com/cron-expression-generator-quartz.html).

In one embodiment, the following Boolean attributes on the application schema represent different facets: "isLoginTarget" (If "isLoginTarget:true, this indicates that IDCS supports SSO to the service instance that the application represents. In one embodiment, there is no extension schema for this facet, and the attributes are part of base/main schema), "isSamlServiceProvider" (The attributes that describe the application's behavior as a Service Provider in the SAML protocol), "isOPCService" (whether the application represents public cloud services), "isMobileTarget", "isUnmanagedApp" (If true, IDCS identity is used for login to this application, e.g., public cloud Services), "isOAuthClient" (OAuthClient facet describes how the target-service-instance behaves as a Client in OAuth protocol flows and defines "allowedScopes", "allowedTags", "auidiance"), "isOAuthResource (OAuthResource facet describes how the target-service-instance behaves as a Client in OAuth protocol flows and defines "Scopes", "tags"), "isWebTierPolicy", "isManagedApp" (If true, it means an account in IDCS (and not IDCS user/identity) is used for login to this application. Managed applications have an ICF based connector). Identity Connector Framework ("ICF") connectors are components developed to link IDCS with external stores of applications, directories, and databases. Identity connectors allow IDCS to carry out user provisioning and reconciliation operations on target systems in the enterprise. ICF decouples any calling application, such as IDCS, from the implementation of the connector. ICF also decouples the implementation of the connector from the calling application. The same connector implementation can work with several different calling applications.

In one embodiment, facet-specific attributes are in each corresponding extension schema (except for the attributes that are common). An application extension schema is used to hold the attributes pertaining to each corresponding facet. The application extension schemas may include, for example, managedapp:App, formFillApp:App, samlServiceProvider:App, opcService:App, kerberosRealm:App, requestable:App, and webTierPolicy:App. In one embodiment, isUnmanagedApp=false does not mean isManagedApp=true.

The OAuth client facet 1304 allows an application to act as an OAuth client in OAuth protocol flows. An "AppIdUser" attribute allows an application to authenticate as an "Application-Identity" within the Oracle Public Cloud ("OPC") infrastructure. The OAuth client facet 1304 includes attributes that are part of the base schema for the application. The attributes include: (1) "isOAuthClient"; (2) name; (3) "clientSecret"; (4) "migrated"; (5) "clientType"; (6) redirectURIs; (7) allUrlSchemesAllowed; (8) logoutUri; (9) postLogoutRedirectUris; (10) allowedGrants; (11) allowedOperations; (12) allowedScopes; (13) certificates; and (14) grantedAppRoles. In the above, "isOAuthClient" enables or disables the ability of the application to act as an OAuth client in the IDCS OAuth run-time service. "Name" is the name of the application and also serves as "Client ID" in OAuth protocol flows. "clientSecret" is the client secret or password in OAuth protocol flows. "migrated" is an attribute that if true means that the App was migrated from an earlier version of Oracle Public Cloud infrastructure (and may therefore require special handling from runtime services such as OAuth or SAML); if false, the App requires no special handling from runtime services, and it and applies to OAuth client, OAuth resource and possibly to SAML as well. "clientType" indicates the type of the client and the type of access that the App has when it acts as an OAuthClient. It can be "confidential", "public", or "trusted". "redirectURIs" indicates redirect URIs of the application; each value is a URI within the App. This attribute is required when this App acts as an OAuthClient and is involved in three-legged flows (authorization-code flows). "allUrlSchemesAllowed" is an attribute that, if true, indicates that the system should allow all URL-schemes within each value of the 'redirectUris' attribute; also indicates that the system should not attempt to confirm that each value of the 'redirectUris' attribute is a valid URI. In particular, the system should not confirm that the domain component of the URI is a top-level domain and the system should not confirm that the hostname portion is a valid system that is reachable over the network. "logoutUri" indicates the logout URI of the application. "postLogoutRedirectUris" is an attribute where each value is the URI of a landing page within the App. It is used only when the App, acting as an OAuthClient, initiates the logout flow and wants to be redirected back to one of its landing pages. "allowedGrants" indicates the allowed grants 1314 of the application. "allowedOperations" is an attribute required only when the App acts as an OAuthClient. Supported values are 'introspect' and 'onBehalfOfUser'. The value 'introspect' allows the client to look inside the access-token. The value 'onBehalfOf User' overrides how the client's privileges are combined with the privileges of the Subject User. Ordinarily, authorization calculates the set of effective privileges as the intersection of the client's privileges and the user's privileges. The value 'onBehalfOf' indicates that authorization should ignore the privileges of the client and use only the user's privileges to calculate the effective privileges. "allowedScopes" indicates the allowed scopes of the application. "certificates" is an attribute where each value represents a certificate that the App uses when it acts as an OAuthClient. "grantedAppRoles" indicates the granted roles of the application because pure OAuth would need only "allowedScopes", but authorization within the OPC infrastructure relies in part on claims of membership in application roles.

The OAuth resource server facet 1305 allows an application to act as an OAuth resource in OAuth protocol flows. The attributes of the OAuth resource server facet 1305 are part of the base schema for the application and include: (1) "isOAuth Resource"; (2) "accessTokenExpiry"; (3) "ref reshTokenExpiry"; (4) "allowOffline"; (5) "callbackServiceUrl"; (6) "audience"; (7) "secondaryAudiences"; (8) "scopes"; (9) "migrated". In the above, "isOAuth Resource" enables or disables the ability of the application to act as an OAuth resource in the IDCS OAuth run-time service; "callbackServiceUrl" indicates the call back service URI; and "migrated" and applies to OAuth client, OAuth resource, and possibly to SAML as well.

The login target facet (not shown in FIG. 13) allows IDCS to log users 1318 into the application automatically. The login target facet includes attributes that are part of the base schema for the application, and the attributes include: (1) "isLoginTarget"; (2) "loginMechanism"; (3) "landingPageUrl"; (4) "isMobileTarget"; (5) "login PageUrl"; (6) "errorPageUrl"; (7) "allowAccessControl"; (8) "showInMyApps"; and (9) "signonPolicy". In the above, "loginMechanism" indicates the login mechanism; "landingPageUrl" indicates the URI of the landing page; "login PageUrl" indicates the login page URI; "errorPageUrl" indicates the error page URI; "allowAccessControl", if true, indicates that any managed App that is based on this template is checked for access control so that access to the app is subject to successful authorization at SSO service, viz. app grants to start with. "showInMyApps" indicates whether to display the application in "MyApps" for each user (there are some login target applications that are not to be displayed); and "signon Policy" is added to refer to the policy that governs sign-on to the application.

The SAML service provider facet 1302 allows an application to act as a SAML SP in run-time flows of the SAML protocol. The SAML service provider facet 1302 includes one attribute in the base schema for application and any attribute that is defined in the extension schema "samlServiceProvider". The attributes include: (1) "isSamlServiceProvider"; (2) "samlServiceProvider"; (3) "migrated"; (4) "metadata"; (5) "partnerProviderId"; (6) "succinctId"; (7) "assertionConsumerUrl"; (8) "logoutRequestUrl"; (9) "logoutResponseUrl"; (10) "nameIdFormat"; (11) "nameIdUserstoreAttribute"; (12) "userAssertionAttributes"; (13) "groupAssertionAttributes"; (14) "signingCertificate"; (15) "encryptionCertificate"; (16) "encryptionAlgorithm"; (17) "encryptionAssertion"; (18) "includeSigningCertlnCertificate"; (19) "sign ResponseOrAssertion"; (20) "logoutBinding"; (21) "logoutEnabled"; and (22) "signatureHashAlgorithm". In the above, "isSamlServiceProvider" is in the base schema for the application; "samlServiceProvider" is in the base schema for the application; and "migrated" and is in the base schema for the application and applies to OAuth client, OAuth resource, and possibly to SAML as well.

The Kerberos realm facet (not shown in FIG. 13) specifies whether and how an application supports the Kerberos protocol. If an application is Kerberos-enabled, IDCS maintains a set of Kerberos realm users associated with each user who has access to the application. That set contains one Kerberos realm user for each realm (associated with each Kerberos-enabled application) to which the user has access. The Kerberos realm facet includes one attribute in the base schema for the application and any attribute that is defined in the extension schema "kerberosRealm". The attributes include: (1) "isKerberosRealm"; (2) "realmName"; (3) "masterKey"; (4) "defaultEncryptionSaltType"; (5) "supported EncryptionSaltTypes"; (6) "ticketFlags"; (7) "maxTicketLife"; and (8) "maxRenewableAge". In the above, "isKerberosRealm" is in the base schema for the application.

The web tier policy facet (not shown in FIG. 13) allows the IDCS Cloud Gate to protect an application. This facet specifies the policy that Cloud Gate should apply for the application. The web tier policy facet includes one attribute in the base schema for the application and any attribute that is defined in the extension schema "webTierPolicy". The attributes include: (1) "isWebTierPolicy" and (2) "webTierPolicyJson". In the above, "isWebTierPolicy" is in the base schema for the application.

In addition to the facet Boolean "isOPCService" (and one lingering facet reference) in the base schema, there are several attributes in the extension schema "OPCService". The attributes include: (1) "isOPCService"; (2) "infrastructure"; (3) "serviceVersion"; (4) and "serviceInstanceIdentifier". In the above, "isOPCService" is in the base schema for the application; and "infrastructure" is in the base schema for the application and is a Boolean that applies only to OPC services "serviceTypeURN".

The unmanaged application facet (not shown in FIG. 13) describes behavior that is specific to an application that accepts the IDCS user as its login identity and exposes as entitlements only memberships in the IDCS application roles that it defines. The following attributes are specific to unmanaged applications: (1) "isUnmanagedApp"; (2) "adminRoles"; and (3) "userRoles". In the above, "isUnmanagedApp" is in the base schema for the application.

The managed application facet (not shown in FIG. 13) indicates an application that relies on its own identity repository. The managed application extension schema and any "child" resources to which those attributes refer describe what IDCS knows about the structure of the account object class. If "connected:true", this indicates that IDCS application management can manage (i.e., create, update, or delete) identities and other managed objects in the identity repository of the application. This requires additional metadata indicating, for example, the "ConnectorBundle" to use, which values to supply as bundle configuration parameters, which provisioning operations should be supported, and so on.

The secure form fill facet 1303 describes behavior that is specific to an application that IDCS can log into using "form-fill"—that is, by pasting username and password into specific fields on a login page of the target service instance. Provisioning target facet 1306 is the external stores of applications, directories, and databases. AccountObjectClass is an entity to manage account object-class configurations for a connected managed app and the REST API for AccountObjectClass is SCIM compliant. IsEntitlement indicates if the value of the attribute being granted is an entitlement that is a privilege in the target system. ManagedObjectClass is an entity used to work with managed object class configurations for a connected managed app and represents the object of target system in IDCS.

Figure 14:
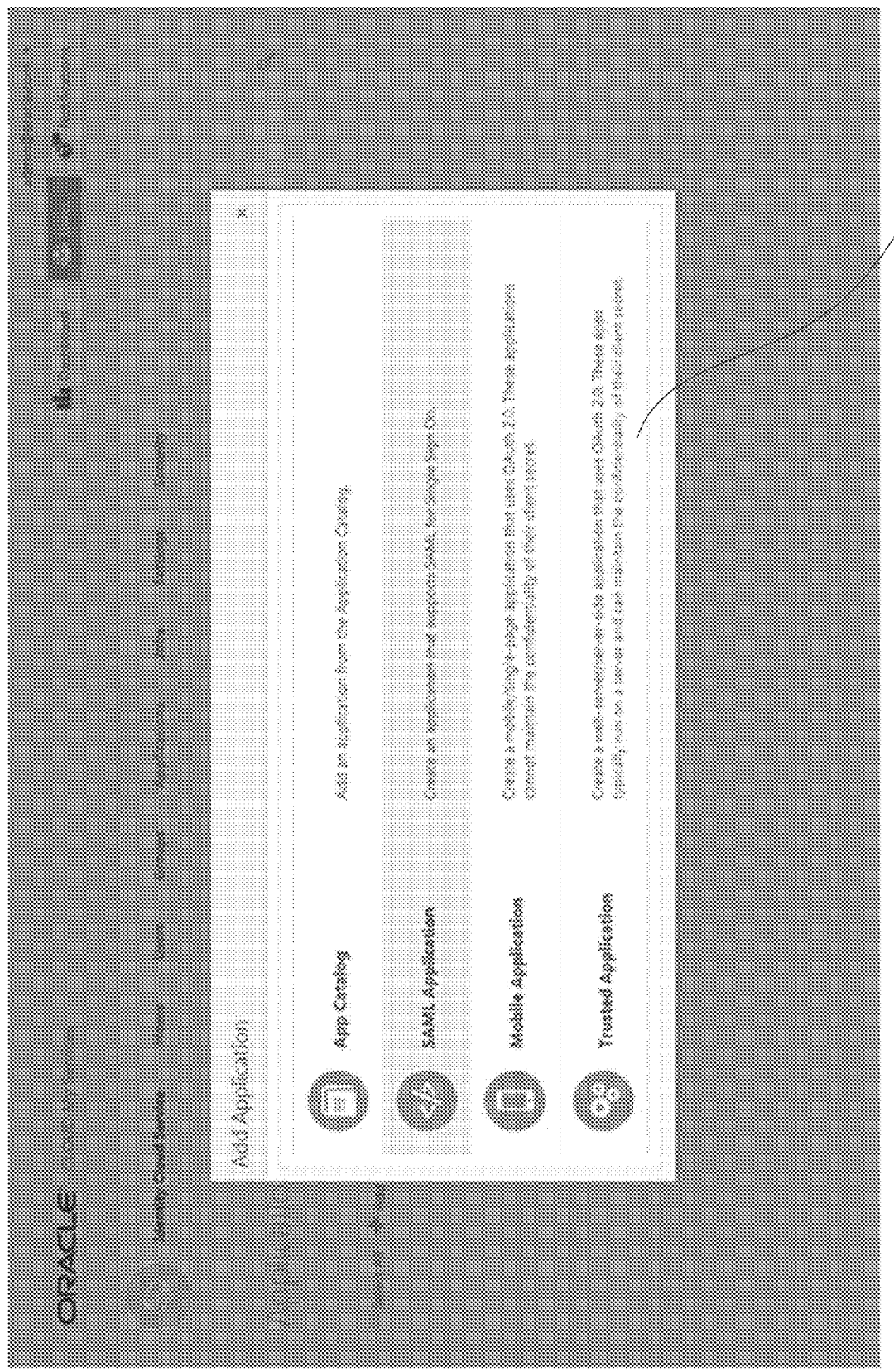
FIGS. 14-18 are screenshots of "single pane of glass" UIs in accordance with embodiments.
Figure 15:
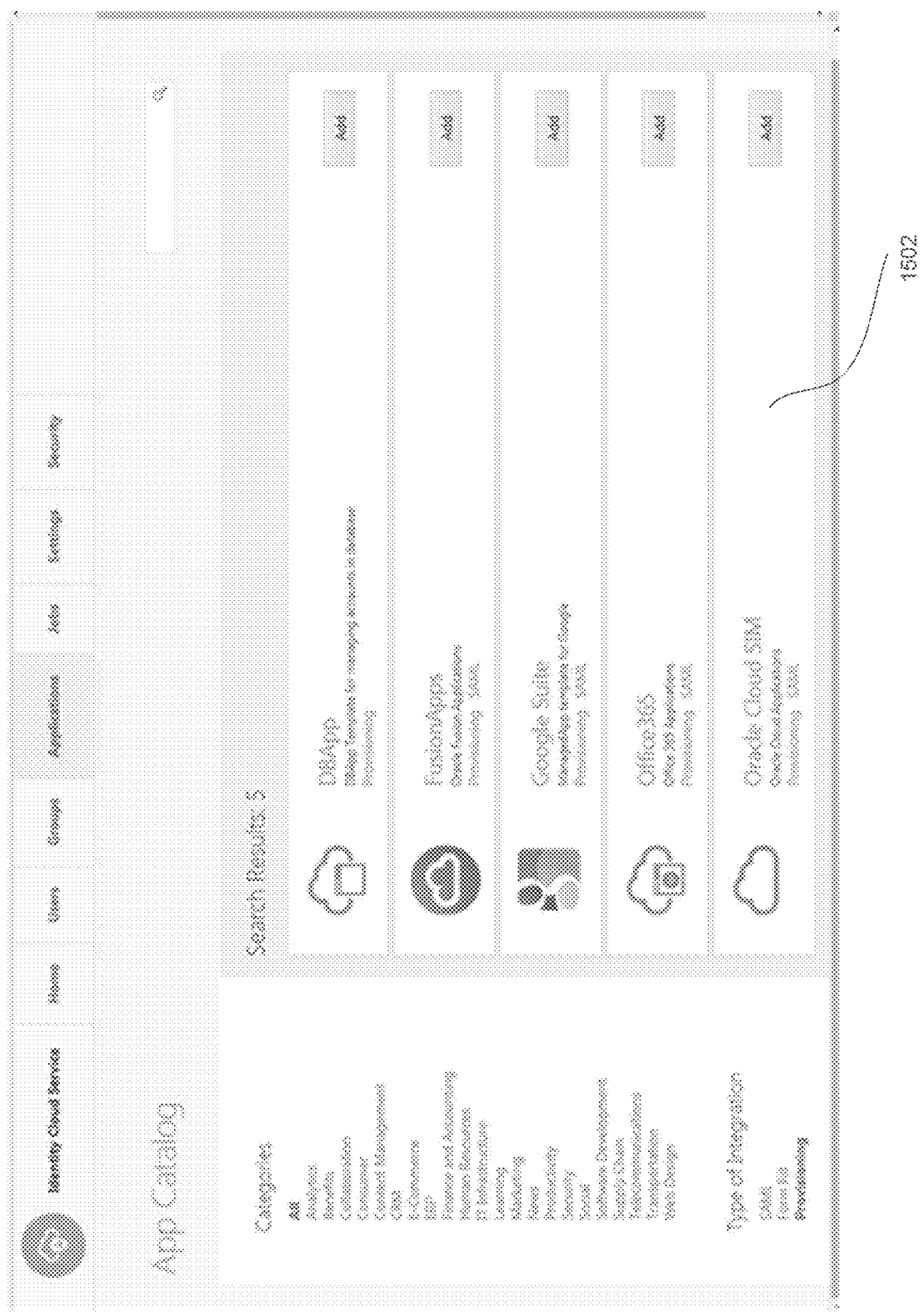
Figure 16:
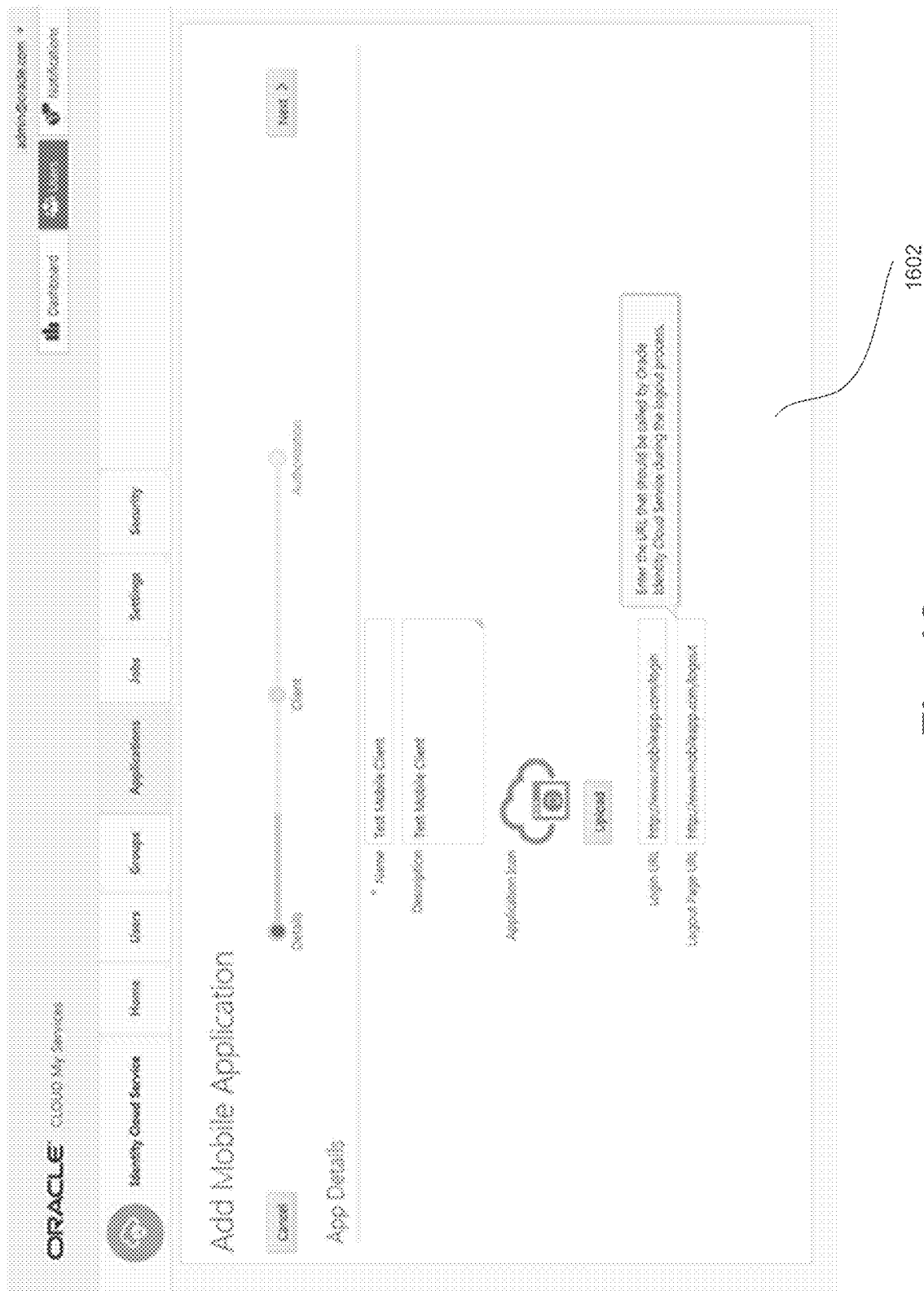
Figure 17:
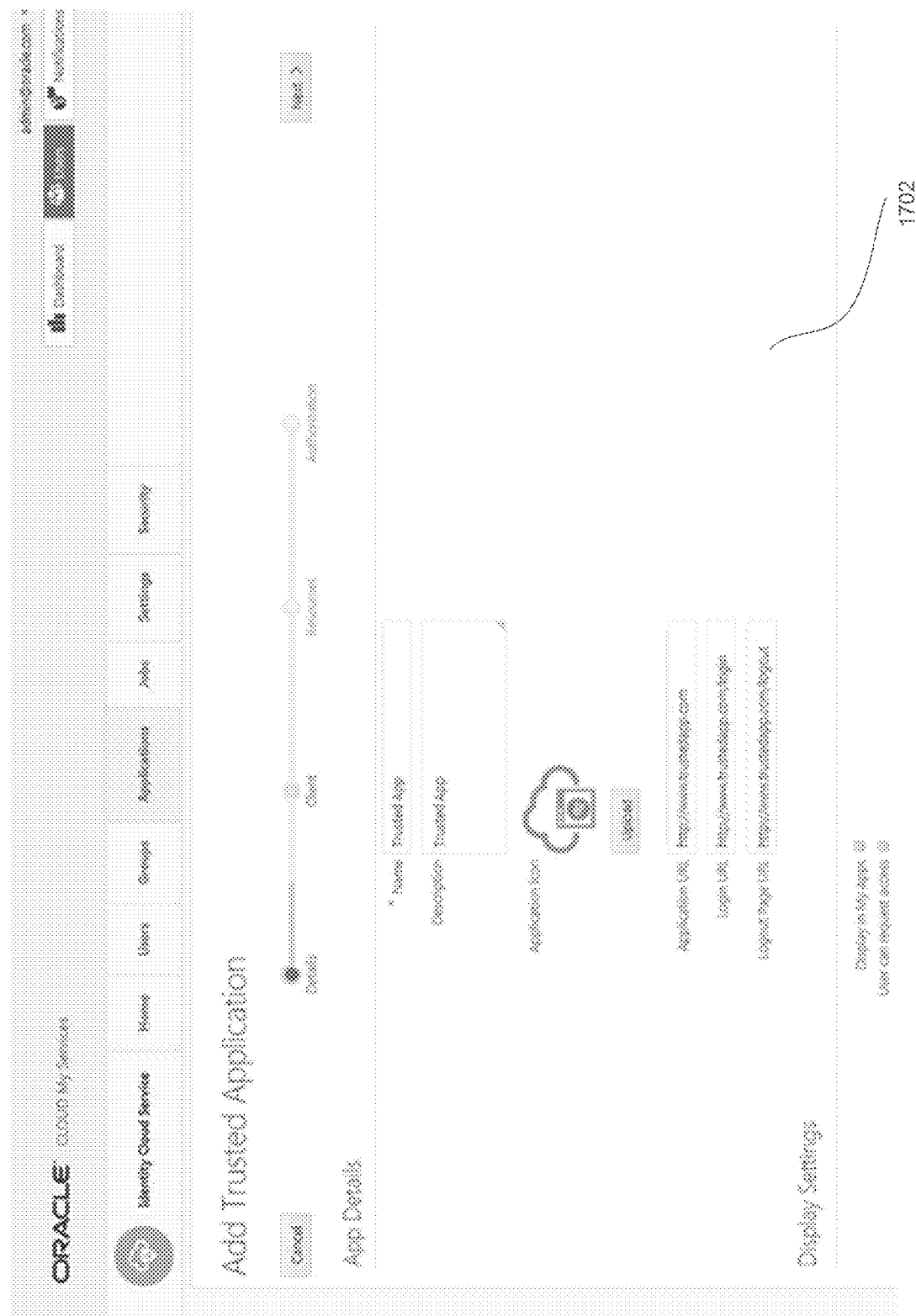
Figure 18:
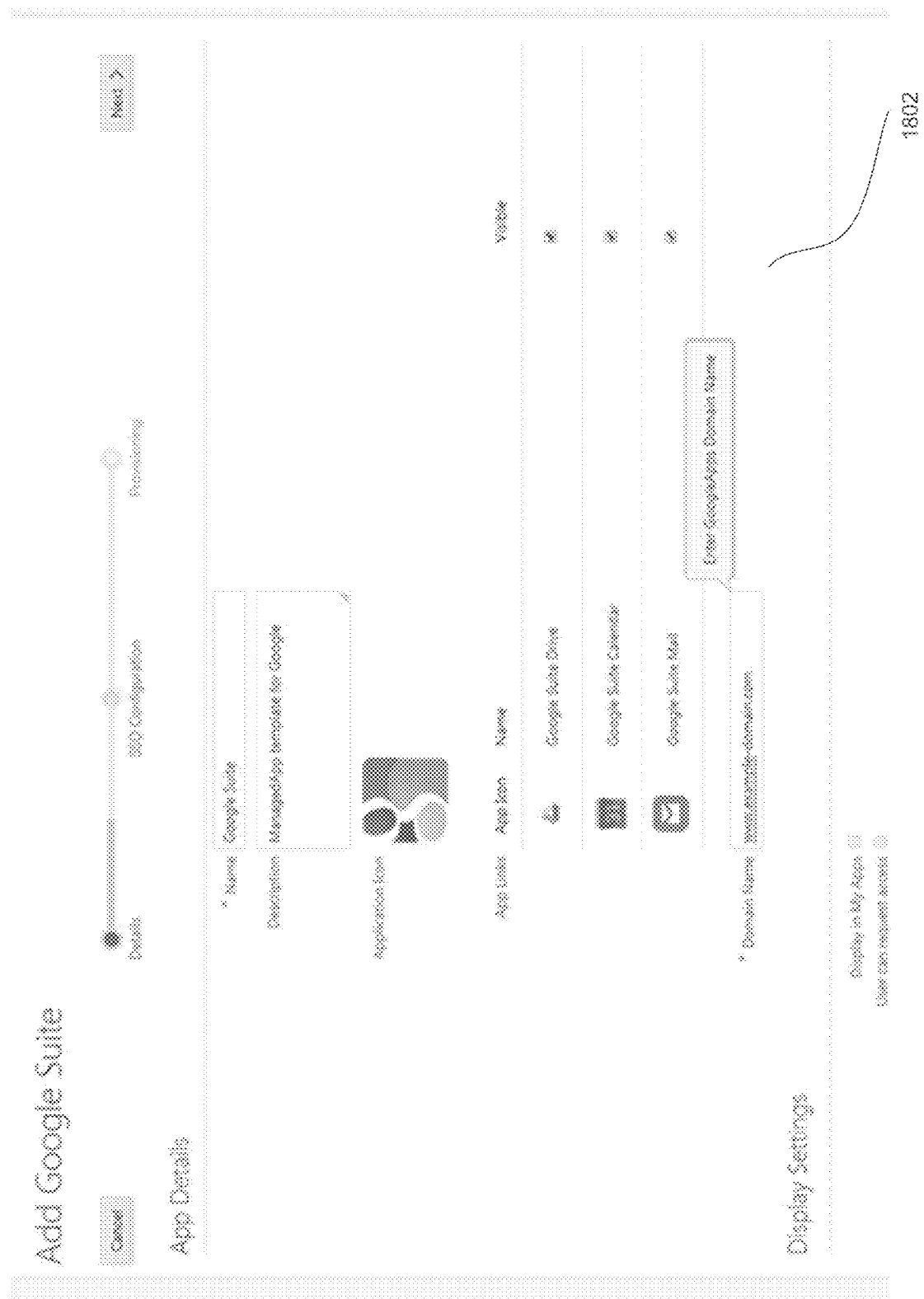

FIGS. 14-18 illustrate some example "single pane of glass" UIs for managing all aspects of each application in one place in accordance with embodiments. FIG. 14 is a screenshot of a UI with a pop-up menu 1402 that provides example categories of applications that can be added in accordance with an embodiment. For example, the application to be added may be selectable from an application catalog, or may be a SAML, mobile, or trusted application. FIG. 15 is a screenshot of a UI with search results 1502 for adding a new SAML application (after selecting the "SAML Application" option from FIG. 14) in accordance with an embodiment. For example, a SAML application may be a database application, a fusion application, a Google suite application, an Office 365 application, or an Oracle cloud application. FIG. 16 is a screenshot of a UI for providing application details 1602 when adding a new mobile application (after selecting the "Mobile Application" option from FIG. 14) in accordance with an embodiment. For example, the application details may include application name, description, icon, login URL, and logout page URL. FIG. 17 is a screenshot of a UI for providing application details 1702 when adding a new trusted application (after selecting the "Trusted Application" option from FIG. 14) in accordance with an embodiment. For example, the application details may include application name, description, and icon, as well as application URL, login URL, and logout page URL. FIG. 18 is a screenshot of a UI for providing application details 1802 when adding a new managed application (a "Google Suite") showing an SSO configuration in accordance with an embodiment. For example, the information may include application name, description, icon, and domain name. The application icon may indicate whether Google suite calendar, drive, or mail is visible.

Application Service

One embodiment provides an application service that is a run-time service that answers questions about "Who (tenants/users) has access to What (applications/accounts/resources)", provided by Admin Services in FIG. 6 (shown as SCIM++ services for CRUDQ. This information is tracked by relationships based on the data model that was previously defined, and used by the provisioning service, by system administration UI to manage the global application catalog, by tenant administration UI to show the application catalog of the tenant, and by "MyApps" UI of the end user to show "available apps" of the user. The administration/configuration life-cycle management ("LCM") side of these relationships involves managing associations between tenants and applications, and between users and applications.

Other IAM properties of an application correspond to IAM capabilities offered to tenants (what they can configure/customize), users (who they are and what they have), and application developers (what IAM patterns they integrate with). The configuration of these relationships is managed through the settings service shown as Admin Services in FIG. 6 based on capabilities exposed by the data model of the application. The application is an instance that exists in a tenant's namespace. For example, assuming there is an application instance to be integrated with the cloud, the application has properties describing its capabilities. The application may be an Oracle PaaS/SaaS service, a customer's/partner's custom application running on Oracle JCS-SX/JaaS, a customer's/partner's custom application running on Amazon web services ("AWS"), a customer's packaged application running on-premise and protected by Web Gates, a 3rd party cloud application, etc. The application may have any of the characteristics described below, whose configurations are managed by the settings service.

OAuth Capable Application: This application may be requesting access to resources provided by Oracle Services or by custom applications hosted on Oracle's infrastructure. This means the application has an OAuth profile and is an OAuth client. Hence administration API with full OAuth configuration LCM is used to configure the application. The OAuth service uses this data, and part of the OAuth client configuration indicates if the application is OpenID Connect RP capable (or this may be indicated by an authorized scope).

Provisioning Capable Application: This application may be storing user accounts for internal use. This means that the application has a provisioning profile. Hence administration API with full provisioning configuration LCM is used to configure the application. The provisioning service uses this data.

SAML Capable Application: This application may be exposing itself as a SAML SP. This means that the application has a SAML SP profile. Hence administration API is used to configure the application. The SAML service uses this data when a request is received from the SP.

Form Fill Capable Application: This application may be configured by IDCS Cloud SSO to support form fill. This means that the application has a form fill profile. Hence administration API with form fill configuration LCM is used to configure the application. The Cloud SSO service (or MyApps service) uses this data to process a user's request to access the application.

Policy Capable Application: This application may be configured to have protected resources operated on by the authorization service of Admin Services.

The difference between what the applications service manages and what the settings service manages is that the setting service also manages the tenant's personalization choices, such as (1) What are my IDP's (SAML, OpenID Connect, etc., some of these may come from system configuration); (2) What are my email templates, user synchronization agents, etc.

Since IDCS is multi-tenant at the middle tier's business logic, the data model does not need to specifically call out the tenant. The business logic just assumes a single tenant.

As disclosed, embodiments provide management of applications in a multi-tenant cloud-based system. Each application includes facets that define the behavior of the application. A single administrative interface allows a user to configure all applications and a single integrated data model allows all run-time services to operate on the same copy of data.

Application Templates and Upgrade Framework

Embodiments of IDCS require every application to be based on exactly one application template. Each IDCS application template includes default values that apply to any instance of the corresponding type of service (e.g., Google Apps, Office 365, etc.). When IDCS creates an application, it copies the default values from the specified application template into the application. This greatly reduces the amount of information that an administrator needs to provide when creating an application, and also promotes consistency of definitions and reduces the likelihood of error.

When IDCS updates an application template, it also updates each application that is based on that template. The updates may be performed in three modes: fully automatic, partly automatic/partly opt-in, and fully opt-in, as described below. In one embodiment, the application upgrade process can upgrade an application from one application template to another application template if each of those application templates represent a different version of the same service.

Generally, in known template-based approaches, existing applications are not updated when their template is updated. Instead, the administrator must continue to use the application objects as they are, or the administrator must compare the old and new versions of the template to see what has changed and then apply those changes to each application object manually. However, unlike the existing approaches, embodiments automatically update existing applications when the corresponding templates change. Hence, customers get the benefit of new/updated metadata as automatically as possible. This can prevent an outage because existing applications may have no longer worked without the update (e.g., if updated metadata contains a fix because the target service changed its login page or some other behavior on which the customer depends). Automatically updating existing applications may also improve performance or reliability (e.g., if the updated metadata contains a fix or enhancement to existing function), may offer new behavior (e.g., adding defaults for the SAML facet or the form fill facet if the administrator chooses to enable it), and may reduce the burden on customer's administrators.

Embodiments support multiple modes of update: fully automatic, partly automatic/partly opt-in, and fully opt-in, (also referred to as automatic, semi-automatic, and manual) as described below. The fully automatic mode is used when (1) changes to an application template can be applied safely to each application that is based on that application template without any need for administrator intervention and (2) the new/changed behavior can be enabled safely without any need for administrator intervention. In the fully automatic mode, the automatic application upgrade process updates existing applications and enables new/updated behavior automatically, and nothing requires/solicits the attention of a customer's administrator. Examples of fully automatically upgradable apps are FormFill Apps and SAML Apps.

The partly automatic/partly opt-in mode (or semi-automatic mode) is used when changes to an application template can be applied safely to each application that is based on that application template without any need for administrator intervention, but administrator intervention is required in order to enable the new/changed behavior (e.g., because an administrator must supply some service-instance-specific values). In the partly automatic/partly opt-in mode, the background application upgrade process updates existing applications automatically but does not enable the new/updated behavior. Instead, the semi-automatic application upgrade process sets a flag in the application that causes the IDCS administration console to display to customer's administrators an indication that new/updated behavior is available. The customer's administrator may then use the IDCS administration console to update each existing application to enable the new/updated behavior. Examples of semi-automatic upgradable apps are Connected (i.e., ManagedApps).

The fully opt-in mode is used when changes to an application template cannot be applied safely to each application that is based on that application template without administrator intervention (e.g., an upgrade from Release 12 of a service to an incompatible Release 13 of a service). In the fully opt-in mode, the background application upgrade process does not update existing applications automatically. Instead, the background application upgrade process sets a flag in the application that causes the IDCS administration console to display to customer's administrators an indication that new/updated behavior is available. The customer's administrator may then use the IDCS administration console to update each existing application to enable the new/updated behavior. This interactive and optional part of the process updates the application to add/change the behavior.

By supporting the above three different update modes, the application upgrade process can be used for different types of updates. On the contrary, if the application upgrade process supported only fully-automatic updates, then it would have been unable to deliver the benefit of fixes that require administrator intervention, and if it did not support fully automatic updates, then it would have required administrator intervention in order to deliver the benefit of new/updated metadata, which in turn implies administrative costs for customers, a greater likelihood of outage, and longer delays in receiving the benefit of new/updated metadata.

Embodiments can upgrade existing applications from one application template to another application template if each of those application templates represents a different version of the same service. Some services may support concurrently multiple incompatible versions of that service, and may allow a customer to order, subscribe to, and/or create instances of any or all those versions. For example, assume that Release 12 and Release 13 of Service F are incompatible, and that a customer is allowed to buy a new instance of Release 12, a new instance of Release 13, or some of each. Because these versions are incompatible, each version requires a separate application template. When the customer later decides to upgrade an existing application (which represents an existing service instance) from Release 12 to Release 13, IDCS needs to convert the existing application from being based on the application template for Service F Release 12 to being based on the application template for Service F Release 13. If there is an administrative gesture that upgrades the underlying service instance, that administrative gesture (or the automated process that it triggers to upgrade the underlying service instance) can invoke IDCS to update the existing application from being based on the application template for Service F Release 12 to being based on the application template for Service F Release 13. This is different from a conventional development-controlled upgrade process which involves manual intervention from administrators.

The above upgrade functionality is based on the following assumptions:

The release process for application templates is independent from the release process for IDCS.

Application templates live in a separate repository of the version control system (e.g., GIT) than the version control repository for IDCS.

Partners may develop many application templates.

Whoever develops the application template for a particular target service owns all of the content of that application template.

Embodiments create an infrastructure for upgrading application templates and applications such that application templates can be upgraded independently without worrying about upgrade of applications/accounts. That is, upgrade of applications and accounts is not mandatory after application template upgrade. In response to application template changes, IDCS can support upgrades of applications/accounts that fall into any of three categories: completely automatic (i.e., a fix is pushed to applications with no administrator intervention required), partly automatic/partly opt-in (e.g., new default content is added to applications automatically, but an administrator must intervene in order to complete configuration or to enable new behavior or to give permission to upgrade applications/accounts), and completely opt-in (i.e., no change is made to an applications or its accounts until an administrator intervenes).

In one embodiment, for a given target service, the name of the application template remains the same, even if multiple versions of that application template are defined. For most cloud targets, embodiments may need only a single version, that is, a single application template resource that is active in production at any given time. That application template may be modified from time to time, and its version may be incremented as it is fixed or enhanced, but most global services need only a single application template resource. For targets that support multiple incompatible versions, embodiments may need to expose multiple versions, that is, multiple application template resources with the same name and different versions that are active in production. For example, a "Google App" target service may deploy different versions of software for different customers. If those different versions of software have differences in behavior and/or APIs that a single connector bundle version cannot hide, then each incompatible set of target service versions that is supported will require a separate application template. However, embodiments eventually allow a customer to upgrade, migrate, and/or convert an application from one of these versions to another version if and when the underlying target service is upgraded. That is why each of those application template has the same name but a different version.

In one embodiment, an application template author creates the artifacts that need to be seeded with the new template version. That is, it is not a responsibility of the upgrade process to author/edit such artifacts (e.g., rule template, policy template, account object class template, managed application operation template, etc.). The upgrade process just seeds/installs such artifacts in a given IDCS environment. When content of the application template is changed, embodiments will not create a new version of the application template, but update/replace the existing one.

In one embodiment, upgrade of the application template and the application involves 3 steps: (1) upgrade of the application template (and related artifacts such as rule template, policy template, account object class template, managed application operation template, etc.); (2) automatic upgrade of applications/accounts, if any; and (3) optional upgrade of applications/accounts, if any. Automatic upgrade of applications/accounts may include, for example, adding to each application new default content based on the current updated content of the application template on which the application is based. If the application template has been changed to add a new account attribute, then the schema of the dynamic end-point is updated to reflect this. For optional upgrade of applications/accounts, an application administrator may make a UI gesture to initiate the optional upgrade. For example, embodiments allow an application administrator to re-configure the application to enable the managed application facet and provide any configuration values that the facet requires. If the upgraded application changes from "isManagedApp:false" to "isManagedApp:true", the administrator deletes existing Amazon Machine Image ("AMI") entries for the application and starts a full synchronization job.

More specifically, embodiments first upgrade the application template and related artifacts as follows. A new Boolean attribute "isUpgraded" is introduced on the application template schema. This value is updated to "isUpgraded=True" every time the application template is updated. This flag is the hint for the application upgrade command line interface ("CLI") to mark each application that is based on this template to indicate "readyToUpgrade=True". The "isUpgraded" attribute is introduced so that the application template script does not need to iterate through each tenant and each application per tenant that is based on the application template being "upgraded" to update the flag on the application. The application template script does the following: (1) seeds the application template and related artifacts; (2) the seeding logic is "GET" followed by "PUT"; and (3) replaces payload in the application template and uses "appTemplate.isUpgraded=True". In one embodiment, "PUT" is better than "PATCH" as it can use the latest payload (location) to replace the existing payload.

Upgrading the application is performed as follow. A new Boolean attribute "readyToUpgrade" is introduced on the application schema. This attribute indicates if application upgrade requires a UI gesture. Upgrading the application involves two steps: (1) CLI mode for steps that can be automatically executed without any application administrator intervention; and (2) UI mode for steps that need application administrator intervention. The CLI mode iterates over tenants, iterates over applications of each tenant, and performs any automatic upgrade logic for each application of each tenant (for example, adds new default content from the application template into the application). In one embodiment, for example, if any white-listed attributes are changed on the application template, the embodiment always overwrites the attributes on the application with the white-listed attributes. The white-listed attributes will be read-only on the application. For non-white-listed attributes on the application, the embodiment overwrites these attributes using application template values only if the existing value on the application attribute is null (i.e., it does not exist). One embodiment confirms with small form factor ("SFF")/SAML team the list of attributes to be white-listed for corresponding extension schema.

For managed application schema, attributes such as "connected", "enableSync", "adminConsentGranted", etc., are not a part of the application template schema. Therefore, there is nothing to update on the application. Attributes such as "isThreeLeggedOAuthEnabled" and "threeLeggedOAuthProviderName" are overwritten on the application. For "connectorBundle" attribute, "ConnectorBundle.ID" is copied from the application template. For "bundleConfigurationProperties", embodiments make the following assumptions:

"name", "icfType" (identity connector framework ("ICF") type), and "confidential" attributes are marked as immutable attributes and are overwritten on the application.

"displayName", "value", "order", "helpMessage", and "required" are properties that are marked read/write, which means the application administrator can change them. Hence, they are not overwritten.

If bulk copy program ("BCP") attribute is added/removed, then it will be added/removed from the application.

For "objectClasses" attribute, embodiments compare the "AOCT.objectClasses" (AccountObjectClassTemplate) with "AOC.objectClasses" (AccountObjectClass). Attributes marked as read only/immutable on AOC schema can be overwritten, such as "name", "container", "lifeCycleEvents", "schema", and "passwordResetRequiresCurrentPassword".

One embodiment identifies immutable attributes and marks them as "idcsInternal=true". One embodiment does not overwrite attributes marked as read/write, such as "idcsUserCorrelationAttribute" (a user attribute that will be used for owner correlation in synchronization), "displayName" (the display name of the attribute), "syncCreateThreshold" (the maximum number of objects created during a sync. If the number of objects being created exceeds the maximum number allowed, the sync job aborts. The maximum number of objects that can be created is an approximate maximum limit, not a precise limit due to the parallel processing of synced objects), "syncDeleteThreshold" (the maximum number of recorded objects deleted during a sync. If the number of recorded objects being deleted exceeds the maximum number allowed (including the deletion detection), the sync job aborts. The maximum number of recorded objects that can be deleted is an approximate maximum limit, not a precise limit due to the parallel processing of synced objects). "syncErrorThreshold" (the maximum number of allowed errors during a sync. If the number of errors exceeds the maximum number allowed, the sync job aborts. The maximum number of errors is an approximate maximum limit, not a precise limit due to the parallel processing of synced objects), and "situation Response" (the situation response configuration for sync).

One embodiment does not perform any upgrade action for attributes available in AOC but not in AOCT, such as "syncToken", "fullSyncJobSchedule", "incrementalSyncJobSchedule", and "resourceType". For reference attributes on AOC, embodiments search for such reference (e.g., using ID). For "supportedOperations" attribute, embodiments search "ManagedAppOperation" for AOC, compare them with "ManagedAppOperationTemplate" for the given AOCT, and then create or delete the attributes. For "attributeValueGenerationPolicy", for a given AOCT, embodiments get "PolicyTemplate.name", get the corresponding policy given the name, and from the policy, get the corresponding rule and replace "Rule.return" with "RuleTemplate.return".

For other attributes on application schema, embodiments overwrite all for "attrRenderingMetadata", add/delete for "serviceParams", add/update/delete for "aliasApps", and always overwrite for "landingPageUrl". If an administrator must intervene (e.g., in order to complete configuration or to permit account upgrade), then the application is marked as "readyToUpgrade=true". If applications from all tenants are processed successfully, a flag is flipped: "appTemplate.isUpgraded=false".

In the UI mode, the UI gesture for upgrading an application is as follows. Application administrator navigates to the applications and can see that some applications can be upgraded. Application administrator navigates to an application and clicks on upgrade. This triggers upgrade of the application. Application administrator is then automatically prompted with screens to enable "Provisioning" and can proceed with configuring other provisioning attributes and enabling the provisioning flag manually. Application administrator is then automatically prompted for performing full re-synchronization.

As described above, an application has a Boolean attribute "readyToUpgrade" which indicates if the application requires an upgrade. In order to process an application upgrade request, embodiments introduce an end-point called "/AppUpgrader". When an application administrator clicks on the upgrade button for a given application, a request is made on "POST/AppUpgrader". As a part of "AppUpgraderManagerImpl/preCreate", embodiments build a payload to patch an application to be upgraded. The following functionalities provide an example resource type definition and a corresponding schema definition:

Resource Type Definition:

```
{
    "description": "A user can use this endpoint to upgrade an App that is ready to upgrade. This
REST API is SCIM compliant.",
    "endpoint": "/AppUpgrader",
    "id": "AppUpgrader",
    "name": "AppUpgrader",
    "schema": "urn:ietf:params:scim:schemas:oracle:idcs:AppUpgrader",
    "schemas": [
        "urn:ietf:params:scim:schemas:core:2.0:ResourceType",
        "urn:ietf:params:scim:schemas:oracle:idcs:extension:idcsResourceType:ResourceType",
"urn:ietf:params:scim:schemas:oracle:idcs:extension:jdbcDataProviderParams:ResourceType"
    ],
    "urn:ietf:params:scim:schemas:oracle:idcs:extension:idcsResourceType:ResourceType": {
        "addedSinceReleaseNumber": "17.4.4",
        "auditable": true,
        "builderClass": "oracle.idaas.application.object.AppUpgrader",
        "dataProviderClass": "oracle.idaas.common.provider.NoOperationProvider",
        "earliestSupportedSchemaVersion": 1,
        "etagSupported": false,
        "internal": false,
        "latestSupportedSchemaVersion": 1,
        "managerClass": "oracle.idaas.application.manager.api.AppUpgraderManager",
        "operations": [
            {
                "analyze": [ ],
                "auditable": [ ]
                "description": "Upgrade an app that is ready to upgrade",
                "metric": [ ],
                "name": "create",
                "notify": [ ],
                "subscribe": [ ]
            },
            {
                "description": "HTTP OPTIONS Method for CORS Support",
                "name": "options"
            }
        ],
        "resourcesManaged": [ "tenant" ],
        "serviceName": "admin",
        "singleton": false,
        "uniqueAttributeNameForDisplay": [ "appId" ]
    }
}
    Schema Definition:
    {
    "attributes": [
    {
    "caseExact": false,
    "description": "Unique identifier of the App.",
    "idcsDisplayName": "appId",
    "idcsSearchable": false,
    "idcsTargetAttributeName": "",
    "idcsValuePersisted": false,
    "multiValued": false,
    "mutability": "readWrite",
    "name": "appId",
    "required": false,
```

```
"returned": "default",
"type": "string",
"uniqueness": "none"
}
],
"description": "Schema for App Upgrader resource.",
"id": "urn:ietf:params:scim:schemas:oracle:idcs:AppUpgrader",
"meta": {
"location": "/V2/Schemas/urn:ietf:params:scim:schemas:oracle:idcs:AppUpgrader",
"resourceType": "Schema"
},
"name": "AppUpgrader",
"schemas": [
"urn:ietf:params:scim:schemas:core:2.0:Schema"
]
}
```

The logic in "AppUpgraderManagerImpl/preCreate" is as follows:
GET/AppTemplates/{app.basedOnTemplate.value}
Build a patch payload for the application to be upgraded based on new application template. This logic compares the default values from the template to the current values in the application resource in order to build a PATCH payload.
"app.readyToUpgrade" is flipped to False for the application to be upgraded.
PATCH/Apps with the patch payload from the previous two steps.
Optimize this processing for upgrading to managed applications by adding conditions. For example, if the application template has "isManagedApp=true" and the existing application has "isManagedApp=false", artifacts related to managed application need to be created. Also, when an application is being upgraded from "isManagedApp=false" to "isManagedApp=true", as a part of PATCH/Apps, embodiments mark "isConnected=false" so that the provisioning operations are not enabled until provisioning configuration is completed.
Since the logic in "AppUpgraderManagerImpl" is generic (same as "AppManager/preCreate" which is generic), it will handle different kinds of template changes and there is no need to compare the old template with the new template to come up with patch payload.
For applications upgraded from "isManagedApp=false" to "isManagedApp=true", once the POST/AppUpgrader is completed successfully, the UI prompts the administrator automatically with a screen to enable "Provisioning", and the application administrator proceeds with configuring other provisioning attributes and enabling the provisioning flag manually (i.e., mark "isConnected=true" for the application) and then the UI prompts for full re-synchronization.
When the application administrator clicks on "Resync" button, it triggers a full re-synchronization job that deletes existing AMI entries and then synchronizes all accounts from the target service. This results in upgrade of accounts which involves running a full synchronization job which is triggered only if the upgraded application is "isManagedApp=true".

Figure 19:
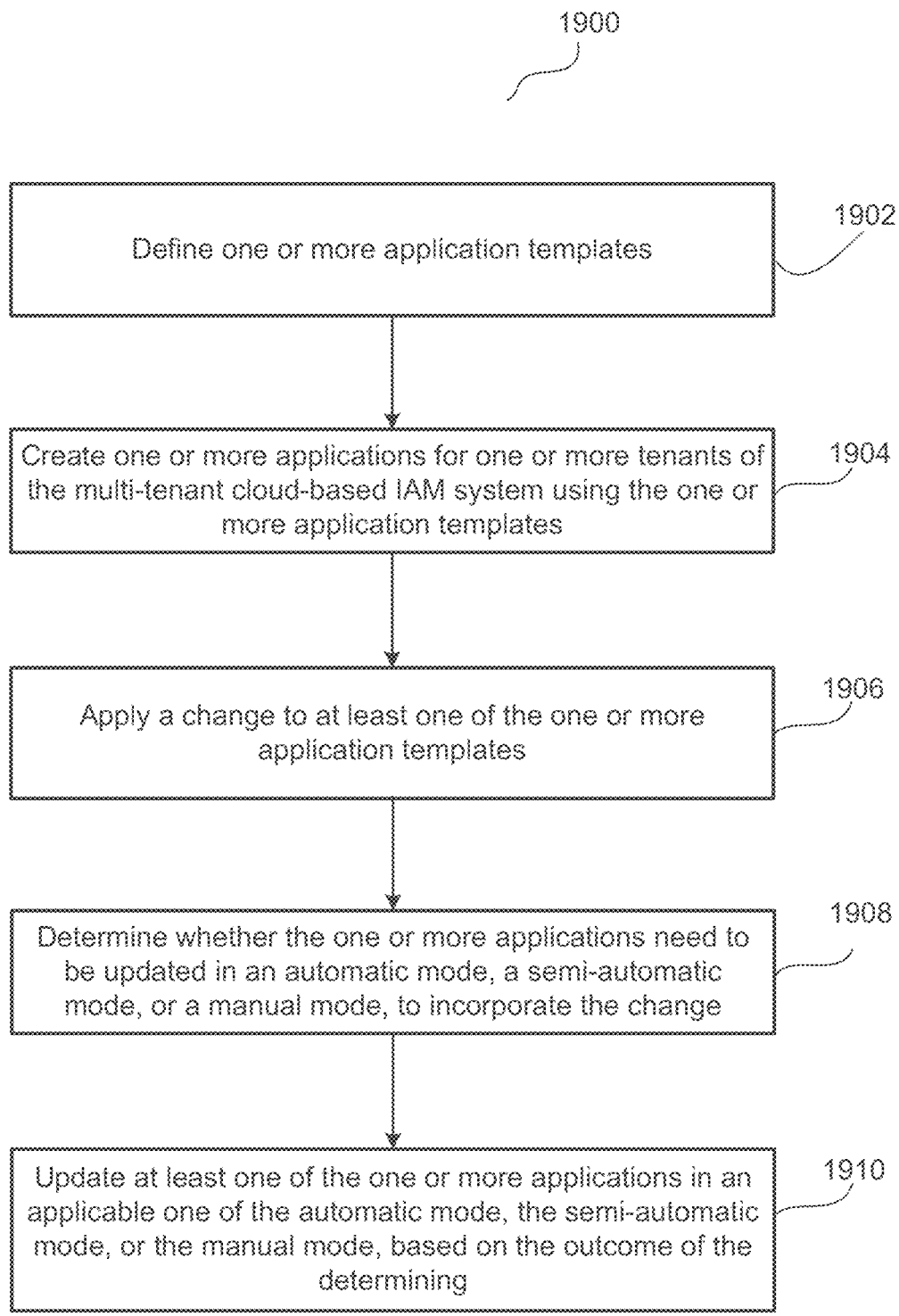
FIG. 19 is a flow diagram of functionality for tenant application upgrade management in accordance with an embodiment.

FIG. 19 is a flow diagram 1900 of functionality for tenant application update management in a multi-tenant cloud-based IAM system in accordance with an embodiment. In one embodiment, the functionality of the flow diagram of FIG. 19 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1902 one or more application templates are defined and at 1904 one or more applications are created for one or more tenants of the multi-tenant cloud-based IAM system using the one or more application templates. The applications are configured using functionality provided by components of the multi-tenant cloud-based IAM system such as any of the IDCS microservices 614 providing cloud-based IAM services to tenants of the multi-tenant cloud-based IAM system as described herein with reference to FIG. 6. In one embodiment, a microservice is a self-contained module that can communicate with other modules/microservices, and each microservice has an unnamed universal port that can be contacted by others. In one embodiment, the microservice is a run-time component/process. In one embodiment, the microservice is stateless and retrieves data from a database to perform an identity management service. In one embodiment, the database and the microservice are configured to scale independently of one another. In one embodiment, the database includes a distributed data grid. In one embodiment, the one or more applications (e.g., any application illustrated at 602 in FIG. 6) implement IAM functionality provided by components of the multi-tenant cloud-based IAM system (e.g., microservices 614 in FIG. 6).

In one embodiment, each tenant application created in the multi-tenant cloud-based IAM system is based on exactly one application template provided by the multi-tenant cloud-based IAM system. In one embodiment, each application template includes default values that are copied to each tenant application that is created based on that application template. In one embodiment, each application template includes metadata to generate default values for tenant applications that are created based on that application template.

At 1906 a change is applied to at least one of the one or more application templates. The change may correspond, for example, to an update in a default value in an application template.

At 1908 it is determined whether the one or more applications need to be updated in an automatic mode, a semi-automatic mode, or a manual mode, to incorporate the change, and at 1910 at least one of the one or more applications is updated in an applicable one of the automatic mode, the semi-automatic mode, or the manual mode, based on the outcome of the determining. In one embodiment, when an application template is updated, each tenant application that is based on the application template is also updated.

In one embodiment, the updating includes upgrading an application from a first application template to a second application template when the first application template and the second application template represent different versions of the same service.

In one embodiment, the automatic mode is used when there is no need for administrator intervention for (1) applying changes of an application template to each application that is based on the application template and (2) enabling the changed behavior.

In one embodiment, the semi-automatic mode is used when there is no need for administrator intervention for applying changes of an application template to each application that is based on the application template but there is a need for administrator intervention for enabling the changed behavior. In this embodiment, the updating includes setting a flag in each application that is updated in the semi-automatic mode, where the flag causes an administration console to display an indication that updated behavior can be enabled for each application that is updated in the semi-automatic mode.

In one embodiment, the manual mode is used when there is a need for administrator intervention for (1) applying changes of an application template to each application that is based on the application template and (2) enabling the changed behavior. In this embodiment, the updating includes setting a flag in each application that needs to be updated in the manual mode, where the flag causes an administration console to display an indication that updates are available for each application that needs to be updated in the manual mode. The change may include an upgrade form a first release of a service to a second release of the service, where the second release is incompatible with the first release.

Figure 20:
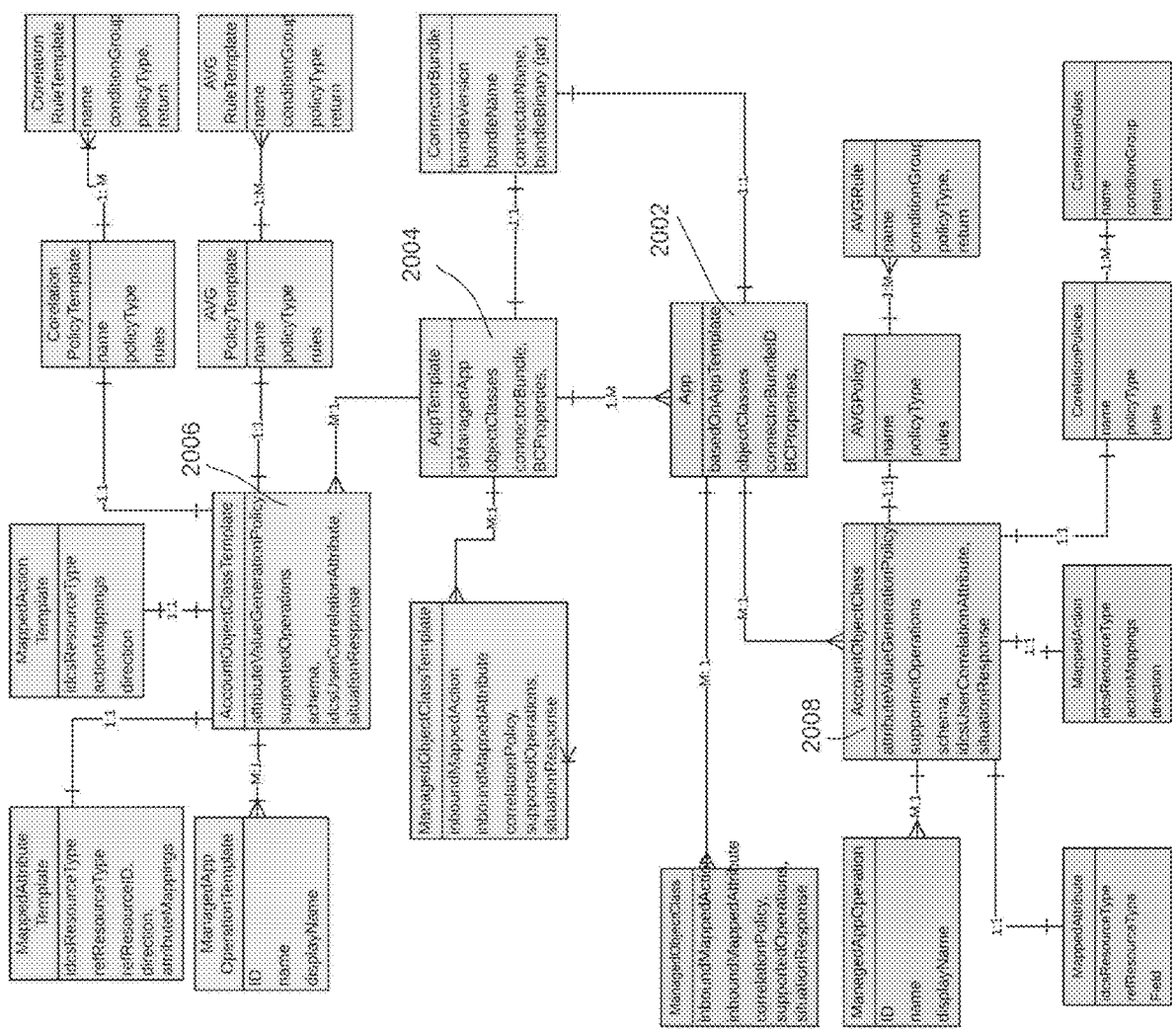
FIG. 20 illustrates how, when an application template is upgraded, data from the application template will flow into the corresponding application in an upgrade in accordance to embodiments of the invention.

FIG. 20 illustrates how, when an application template is upgraded, data from the application template will flow into the corresponding application in an upgrade in accordance to embodiments of the invention. In FIG. 20, Apps 2002 based on AppTemplate 2004 are upgraded so that, for example, the value of newly added attributes in AppTemplate 2004 will get copied into App 2002, or the value of a newly added attribute in AccountObjectClassTemplate 2006 will get copied into AccountObjectClass 2008, etc.

As disclosed, embodiments implement an application upgrade framework where each application is created using a single application template and where the application is updated as the corresponding application template updates. Depending on the need for administrator intervention for applying updates and enabling the changed behavior, the application may be updated in an automatic, a semi-automatic, or a manual mode. Accordingly, embodiments allow for more timely and coherent application updates with less labor requirement.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method for managing tenant application updates in a multi-tenant cloud-based identity and access management (IAM) system, the method comprising:

defining one or more application templates;

creating one or more applications for one or more tenants of the multi-tenant cloud-based IAM system using the one or more application templates;

applying a change to at least one of the one or more application templates;

in response to the change, determining whether to update and enable a first application of the one or more applications automatically; and when the first application is determined to be updated automatically, updating the first application based on the change using an automatic mode comprising automatically updating and enabling changes of the first application, the updating comprising upgrading the first application to a new version by automatically building a payload that comprises updated resource type definitions and corresponding schema definitions.

2. The method of claim 1, wherein each tenant application created in the multi-tenant cloud-based IAM system is based on exactly one application template provided by the multi-tenant cloud-based IAM system.

3. The method of claim 1, wherein each application template includes default values that are copied to each tenant application that is created based on that application template.

4. The method of claim 1, wherein, when an application template is updated, each tenant application that is based on the application template is also updated.

5. The method of claim 1, wherein the updating comprises upgrading an application from a first application template to a second application template when the first application template and the second application template represent different versions of a same service.

6. The method of claim 1, wherein the automatic mode is used when there is no need for administrator intervention for (1) applying changes of an application template to the first application that is based on the application template and (2) enabling a changed behavior of the first application based on the changes.

7. The method of claim 1, wherein a semi-automatic mode is used when it is determined there is no need for administrator intervention for applying changes of an application template to the first application that is based on the application template but there is a need for administrator intervention for enabling a changed behavior of the first application.

8. The method of claim 7, wherein the updating comprises setting a flag in each application that is updated in the semi-automatic mode, wherein the flag causes an administration console to display an indication that updated behavior can be enabled for each application that is updated in the semi-automatic mode.

9. The method of claim 1, wherein a manual mode is used when it is determined that there is a need for administrator intervention for (1) applying changes of an application template to the first application that is based on the application template and (2) enabling a changed behavior based on the changes.

10. The method of claim 9, wherein the updating comprises setting a flag in each application that needs to be updated in the manual mode, wherein the flag causes an administration console to display an indication that updates are available for each application that needs to be updated in the manual mode.

11. The method of claim 9, wherein the change comprises an upgrade from a first release of a service to a second release of the service, wherein the second release is incompatible with the first release.

12. The method of claim 1, wherein each application template comprises metadata to generate default values for tenant applications that are created based on that application template.

13. The method of claim 1, wherein the one or more applications implement IAM functionality provided by components of the multi-tenant cloud-based IAM system.

14. The method of claim 13, wherein the components comprise one or more microservices.

15. A non-transitory computer-readable medium storing instructions that, when executed by a processor, cause the processor to manage tenant application updates in a multi-tenant cloud-based identity and access management (IAM) system, the managing comprising:

defining one or more application templates;

creating one or more applications for one or more tenants of the multi-tenant cloud-based IAM system using the one or more application templates;

applying a change to at least one of the one or more application templates;

in response to the change, determining whether to update and enable a first application of the one or more applications automatically; and when the first application is determined to be updated automatically, updating the first application based on the change using an automatic mode comprising automatically updating and enabling changes of the first application, the updating comprising upgrading the first application to a new version by automatically building a payload that comprises updated resource type definitions and corresponding schema definitions.

16. A system comprising:

a processor; and a computer-readable medium storing instructions that, when executed by the processor, cause the processor to manage tenant application updates in a multi-tenant cloud-based identity and access management (IAM) system, the managing comprising:

defining one or more application templates;

creating one or more applications for one or more tenants of the multi-tenant cloud-based IAM system using the one or more application templates;

applying a change to at least one of the one or more application templates;

in response to the change, determining whether to update and enable a first application of the one or more applications automatically; and when the first application is determined to be updated automatically, updating the first application based on the change using an automatic mode comprising automatically updating and enabling changes of the first application, the updating comprising upgrading the first application to a new version by automatically building a payload that comprises updated resource type definitions and corresponding schema definitions.

17. The system of claim 16, wherein each tenant application created in the multi-tenant cloud-based IAM system is based on exactly one application template provided by the multi-tenant cloud-based IAM system.

18. The system of claim 16, wherein each application template includes default values that are copied to each tenant application that is created based on that application template.

19. The system of claim 16, wherein, when an application template is updated, each tenant application that is based on the application template is also updated.

20. The system of claim 16, wherein the updating comprises upgrading an application from a first application template to a second application template when the first application template and the second application template represent different versions of a same service.

* * * * *